US008717334B2

(12) United States Patent
Murai et al.

(10) Patent No.: US 8,717,334 B2
(45) Date of Patent: May 6, 2014

(54) DISPLAY DEVICE AND DRIVING METHOD FOR DISPLAY DEVICE

(75) Inventors: Atsuhito Murai, Osaka (JP); Yoshiharu Kataoka, Osaka (JP); Takuya Watanabe, Osaka (JP); Hajime Imai, Osaka (JP); Hideki Kitagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 454 days.

(21) Appl. No.: 13/258,868

(22) PCT Filed: Oct. 27, 2009

(86) PCT No.: PCT/JP2009/068410
§ 371 (c)(1),
(2), (4) Date: Sep. 22, 2011

(87) PCT Pub. No.: WO2010/116557
PCT Pub. Date: Oct. 14, 2010

(65) Prior Publication Data
US 2012/0013574 A1  Jan. 19, 2012

(30) Foreign Application Priority Data
Mar. 30, 2009  (JP) ................................. 2009-083498

(51) Int. Cl.
*G06F 3/041* (2006.01)
(52) U.S. Cl.
USPC ....................................................... 345/174
(58) Field of Classification Search
None
See application file for complete search history.

(56) References Cited

U.S. PATENT DOCUMENTS

| 2006/0176266 | A1 | 8/2006 | Pak et al. | |
|---|---|---|---|---|
| 2007/0091013 | A1* | 4/2007 | Pak et al. | ......................... 345/50 |
| 2008/0018581 | A1 | 1/2008 | Park et al. | |
| 2008/0018612 | A1* | 1/2008 | Nakamura et al. | ............ 345/173 |
| 2008/0192001 | A1 | 8/2008 | Choi et al. | |

FOREIGN PATENT DOCUMENTS

| JP | 2001-100916 | 4/2001 |
|---|---|---|
| JP | 2006-189868 | 7/2006 |
| JP | 2007-122733 | 5/2007 |
| JP | 2007-334347 | 12/2007 |
| JP | 2008-27292 | 2/2008 |
| JP | 2008-198180 | 8/2008 |
| WO | WO-2007/145347 | 12/2007 |

OTHER PUBLICATIONS

International Search Report mailed Feb. 9, 2010, directed towards PCT/JP2009/068410; 2 pages.

* cited by examiner

*Primary Examiner* — Srilakshmi K Kumar
*Assistant Examiner* — Damon Treitler
(74) *Attorney, Agent, or Firm* — Keating & Bennett, LLP

(57) ABSTRACT

A display device includes: an optical sensor circuit provided in a display region, the optical sensor circuit including a light-receiving element and detecting intensity of light incident to the light-receiving element; and a pressure detection circuit which detects pressure applied to a display surface of a display panel on a basis of a change of the display surface in a panel thickness direction which change is caused by the pressure, with respect to a region in which the pressure is to be detected, both of the detection of the pressure by the pressure detection circuit and the detection of the intensity of the light by the optical sensor circuit being carried out within a period allocated to acquisition of detection data concerning the pressure in the display region.

28 Claims, 27 Drawing Sheets

F I G. 1
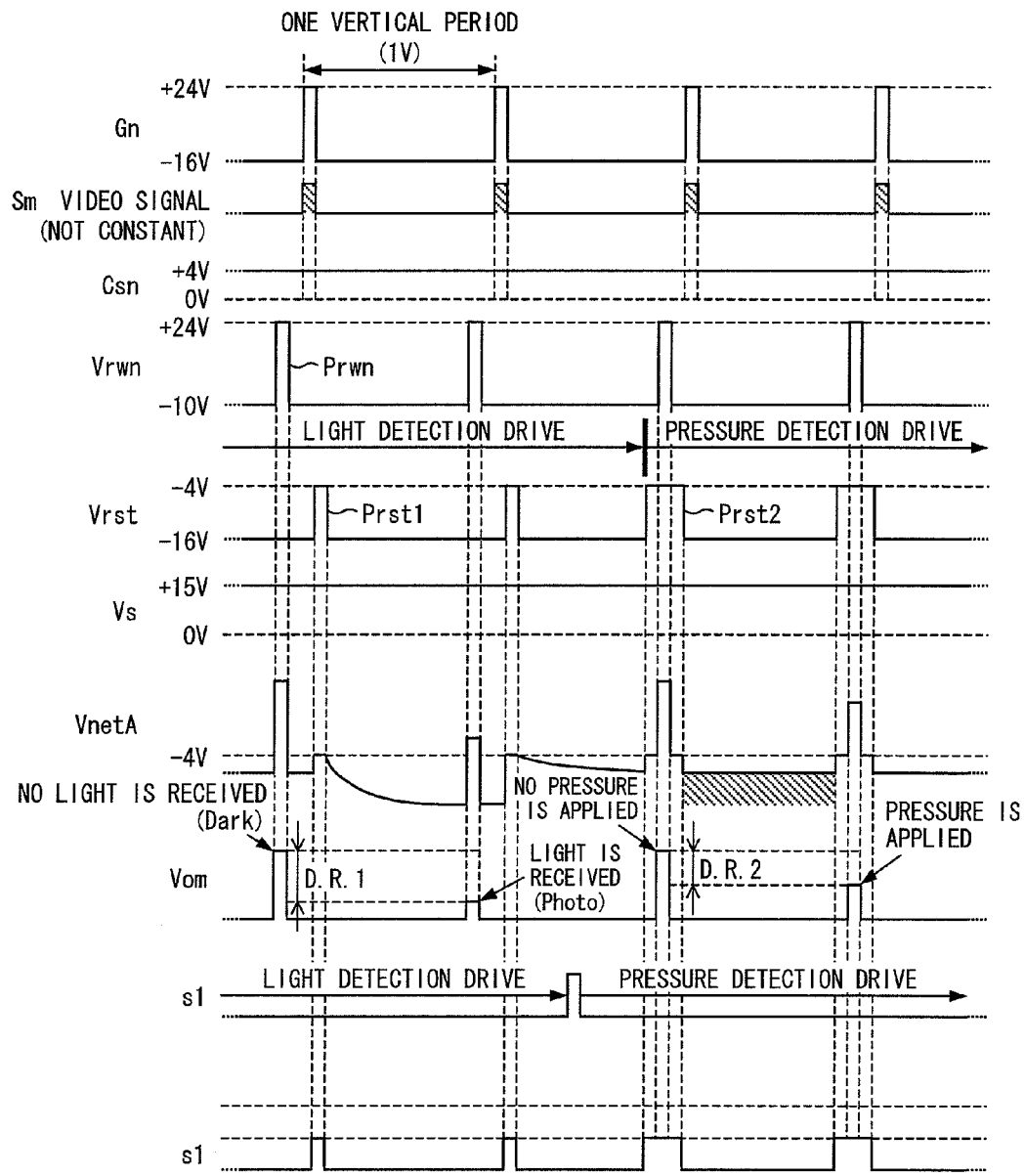

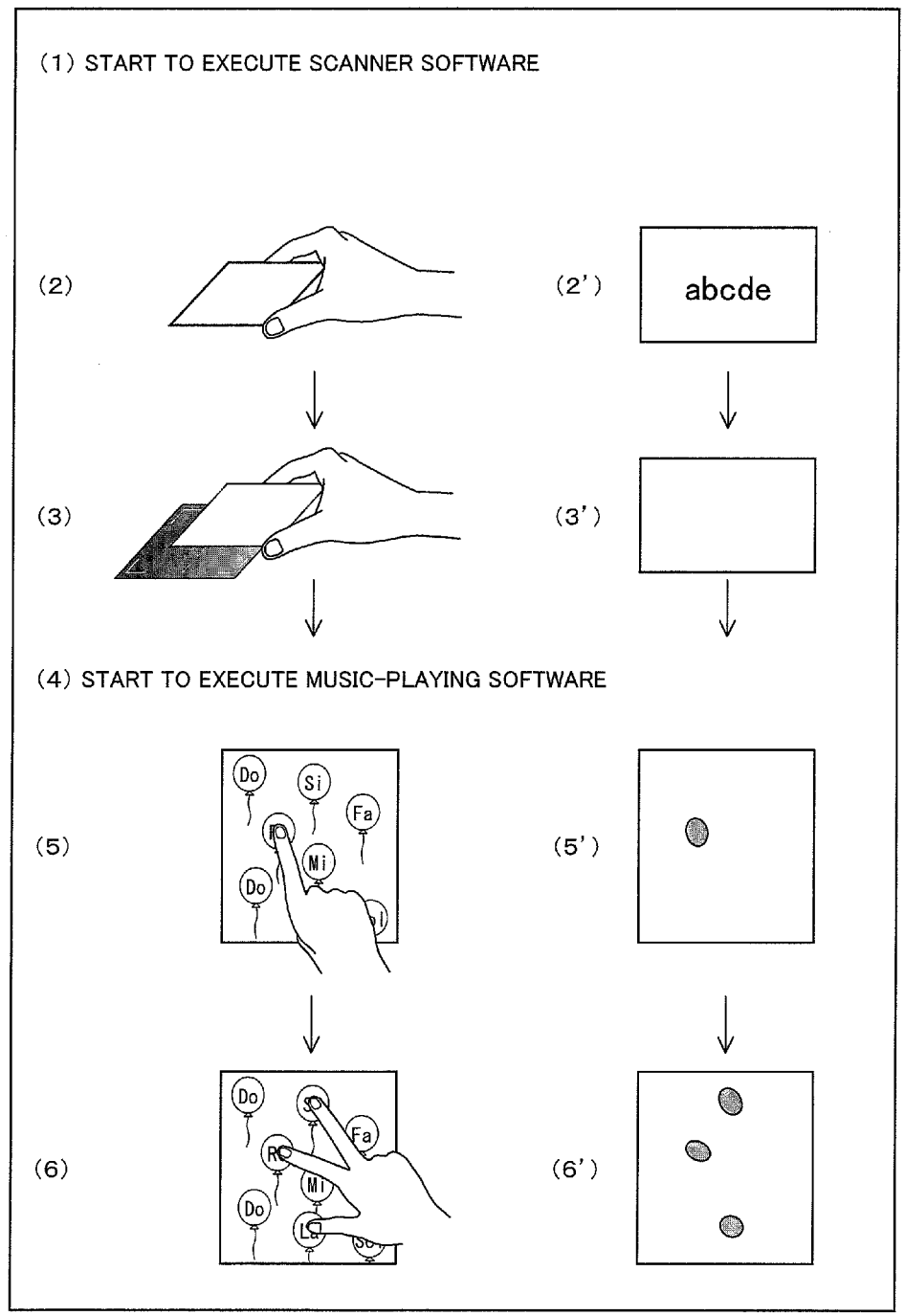

F I G. 7
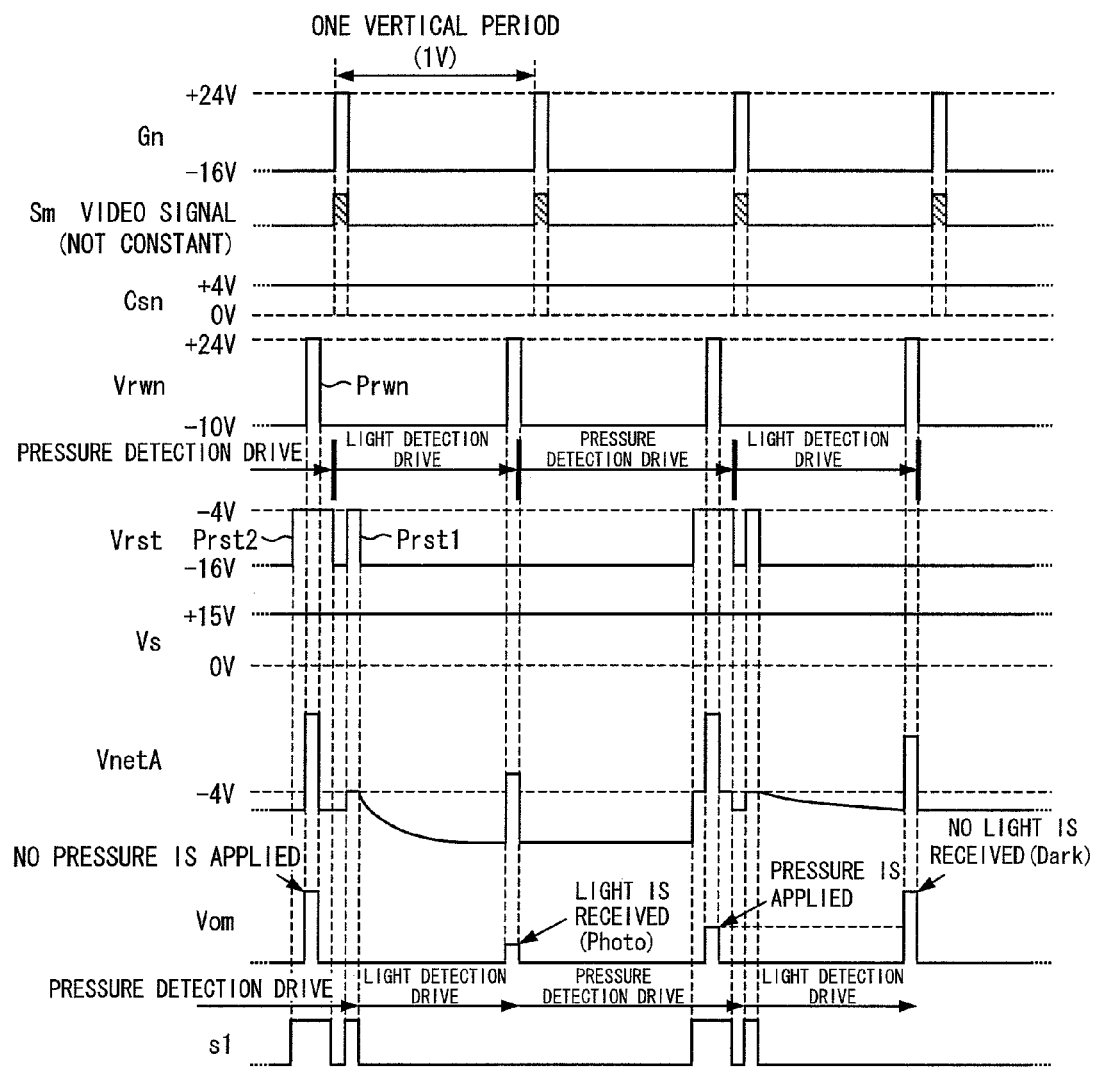

F I G. 1 1
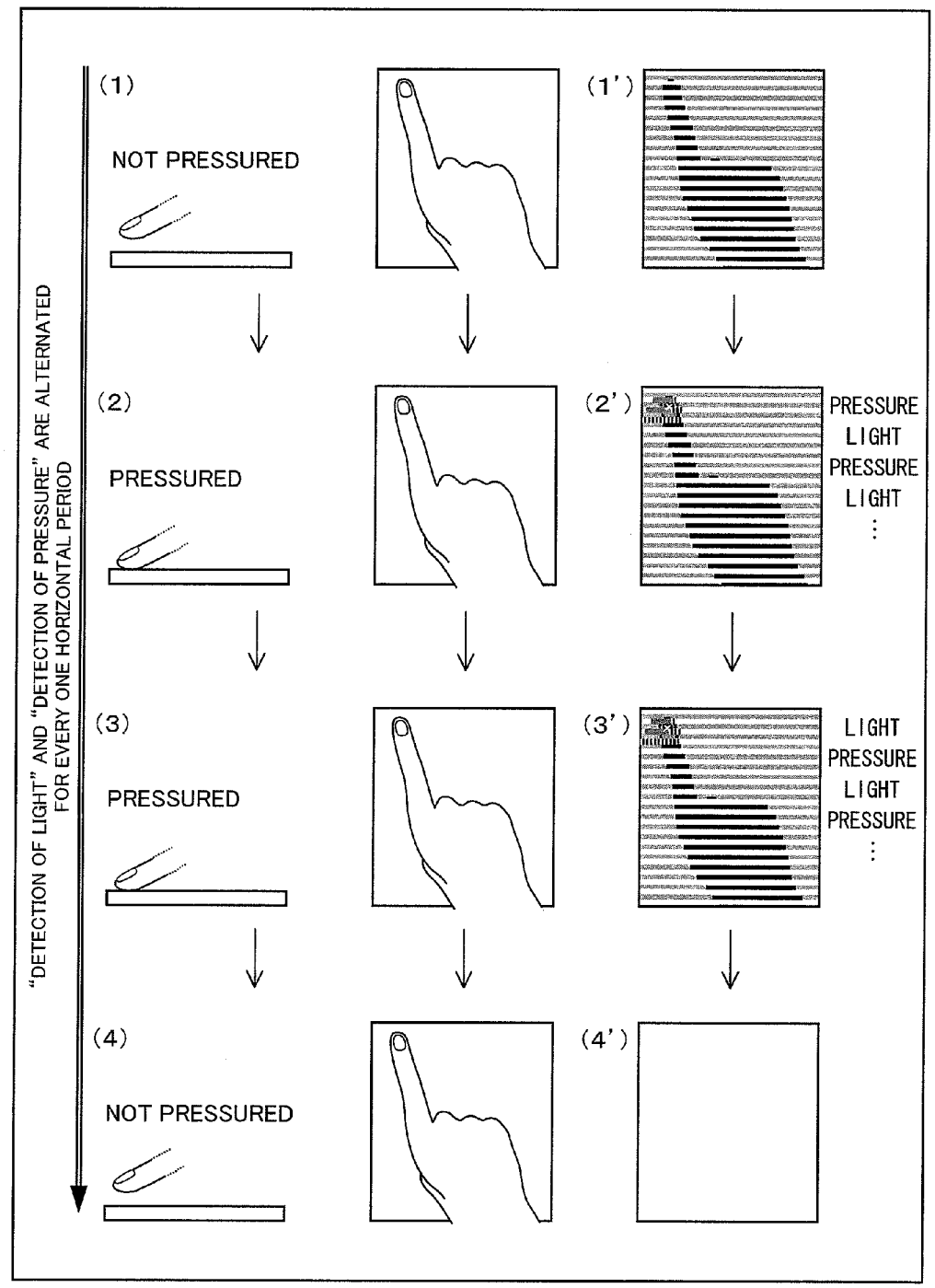

F I G. 2 7
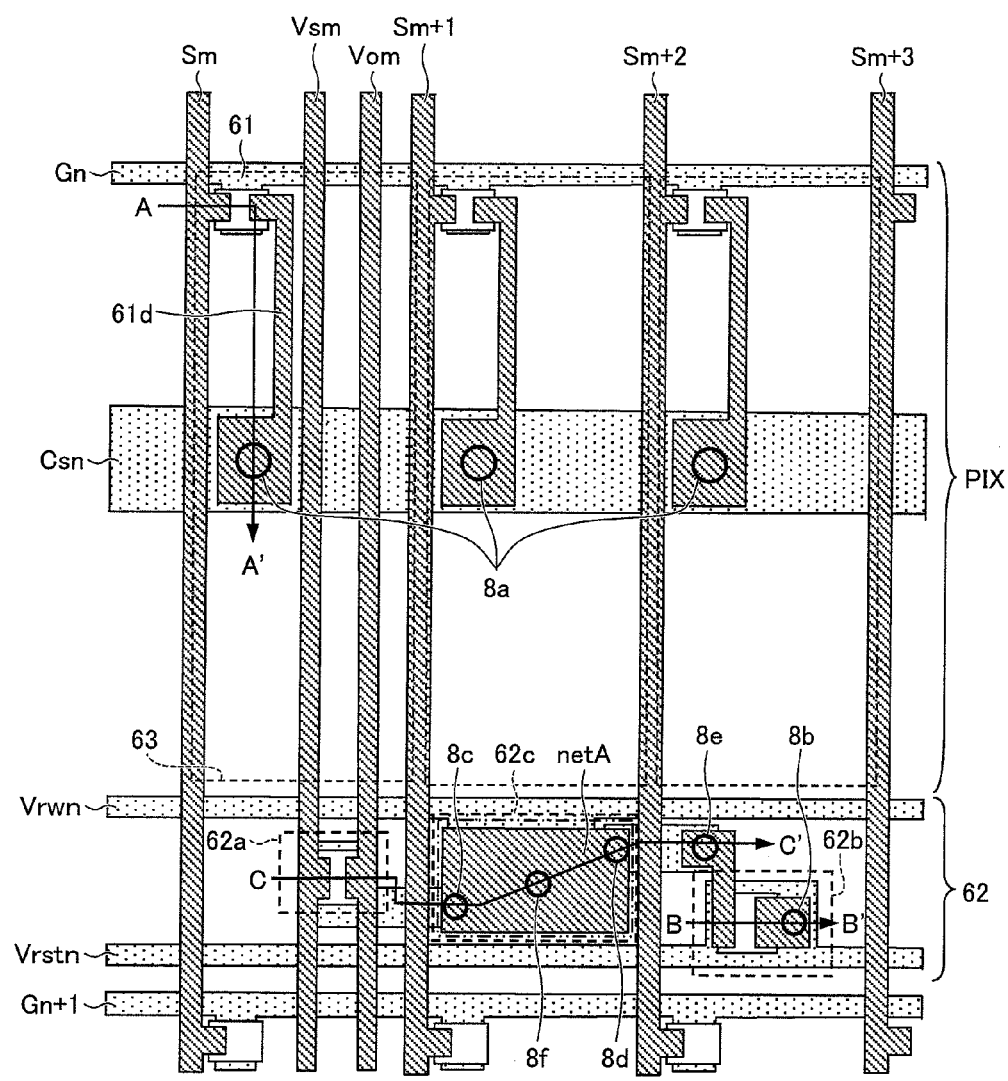

F I G. 3 6
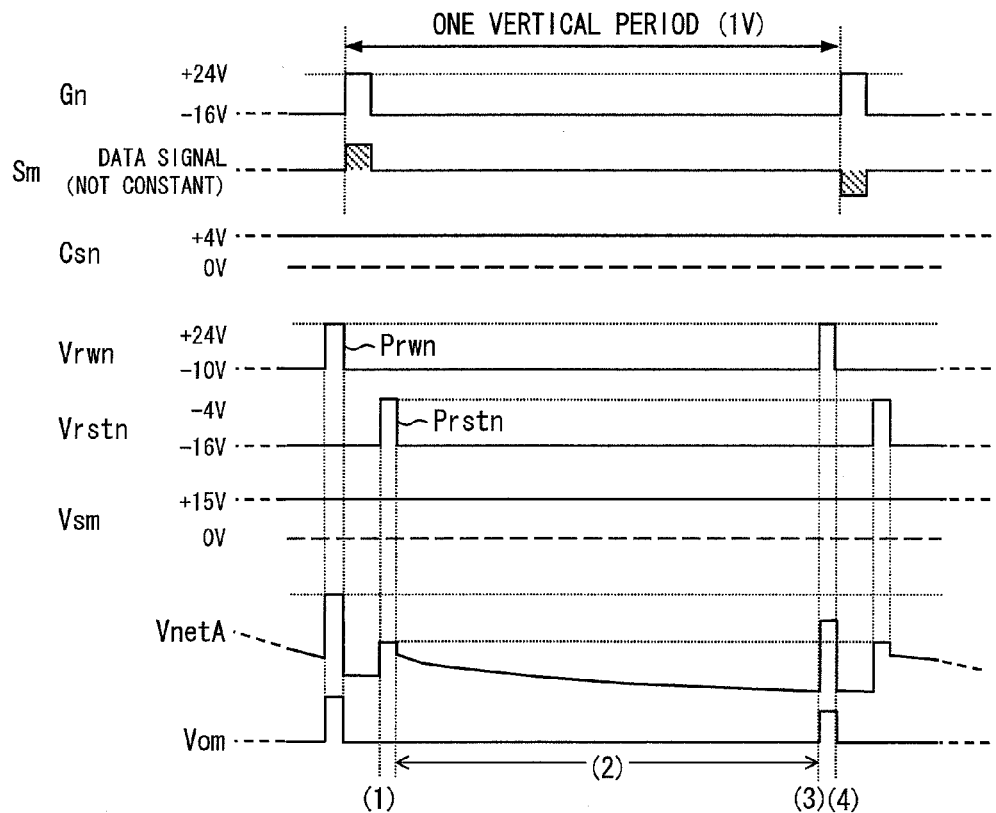
F I G. 3 7
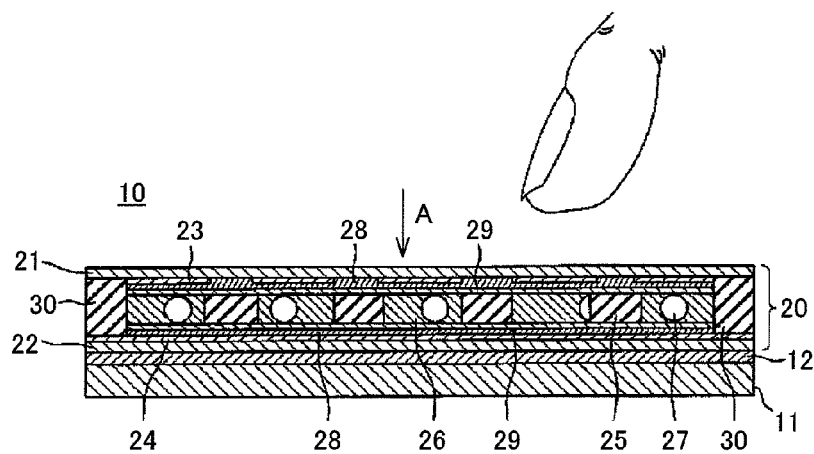

US 8,717,334 B2

DISPLAY DEVICE AND DRIVING METHOD FOR DISPLAY DEVICE

REFERENCE TO RELATED APPLICATIONS

This application is a national stage application under 35 USC 371 of International Application No. PCT/JP2009/068410, filed Oct. 27, 2009, which claims the priority of Japanese Patent Application No. 2009-83498, filed Mar. 30, 2009, the contents of which prior applications are incorporated herein by reference.

TECHNICAL FIELD

The present invention relates to a display device including an optical sensor and a touch sensor in a display region.

BACKGROUND ART

There have been known liquid crystal display devices having optical sensors in picture elements or pixels (see Patent Literature 1 for example). A configuration of such a liquid crystal display device is explained with reference to FIG. 35.

FIG. 35 shows a configuration of an n-th row in a display region of a liquid crystal display panel. The configuration of the n-th row includes a plurality of picture elements PIX comparted by a gate line Gn, source lines S (in the drawing, Sm to Sm+3 are shown) and a retention capacitor line Csn, and at least one optical sensor circuit 102 connected with a reset line Vrstn and a read control line Vrwn. "n" and "m" at the end of a sign indicate a row number and a column number, respectively.

Each picture element PIX includes a TFT 101a serving as a selection element, a liquid crystal capacitor CL, and a retention capacitor CS. A gate of the TFT 101a is connected with the gate line Gn, a source of the TFT 101a is connected with the source line S, and a drain of the TFT 101a is connected with a picture element electrode 103. The liquid crystal capacitor CL is a capacitor formed by positioning a liquid crystal layer between the picture element electrode 103 and a common electrode Com. The retention capacitor CS is a capacitor formed by positioning an insulating film between the picture element electrode 103 or the drain electrode of the TFT 101a and the retention capacitor line Csn. Constant voltages for example are applied to the common electrode Com and the retention capacitor line Csn.

The optical sensor circuit 102 is provided in any number. For example, the optical sensor circuit 102 may be provided with respect to one picture element PIX or one pixel (e.g. a set of picture elements PIX corresponding to R, G, B, respectively). The optical sensor circuit 102 includes a TFT 102a, a photodiode 102b, and a capacitor 102c. A gate of the TFT 102a is connected with an electrode called a node net A, a drain of the TFT 102a is connected with one source line S (here, Sm), and a source of the TFT 102a is connected with another one source line S (here, Sm+1). An anode of the photodiode 102b is connected with the reset line Vrstn and a cathode of the photodiode 102b is connected with the node net A. One end of the capacitor 102c is connected with the node net A and the other end of the capacitor 102c is connected with the read control line Vrwn.

During a period other than a period in which a data signal is written into the picture element PIX, the optical sensor circuit 102 causes a voltage appearing at the node net A in accordance with intensity of light incident to the photodiode 102b to be outputted as a sensor output voltage Vom via the source of the TFT 102a so that the sensor output voltage Vom is outputted via the source line S connected with the source of the TFT 102a (this source line S serves as a sensor output line Vom when detecting light (for convenience of explanation, the sensor output line and the sensor output voltage are given the same reference sign)) to a sensor read circuit outside the display region. At that time, the TFT 102a serves as a source follower. Further, at that time, the source line S connected with the drain of the TFT 102a serves as a power source line Vsm to which a constant voltage is applied when light is detected. Alternatively, the sensor output line Vom and the power source line Vsm may be provided independently of the source lines S as shown by broken lines close to the source lines S.

With reference to FIG. 36, the following details the operation of the optical sensor circuit 102.

During a writing period in which a data signal is written, a gate pulse consisting of +24V High level and −16V Low level is outputted as a scanning signal to the gate line Gn, and data signals are outputted to the source lines S. A constant voltage (e.g. +4V) is applied to the retention capacitor line Csn. This operation is repeated with respect to picture elements PIX in each row per one vertical period (1V). Other than the writing period, the result of light detection by the optical sensor circuit 102 can be outputted to the sensor read circuit.

At a time (1), when a reset pulse Prstn consisting of −4V High level and −16V Low level for example is applied from an outside sensor drive circuit to the reset line Vrstn, the photodiode 102b gets conductive in a forward direction, and a voltage at the node netA is reset to a voltage at the reset line Vrstn. Thereafter, during a period (2), a leakage occurs in accordance with intensity of light incident to the photodiode 102b in a reverse biased state, so that the voltage at the node net A drops at a rate corresponding to the light intensity.

At a time (3), when a read pulse Prwn consisting of +24V High level and −10V Low level for example is applied from the sensor drive circuit to the read control line Vrwn, the voltage at the node netA increases. At that time, the voltage at the node netA goes beyond a threshold voltage of the TFT 102a. The sensor output voltage Vom outputted from the source of the TFT 102a while the read pulse Prwn is applied corresponds to the voltage at the node netA, i.e. corresponds to the light intensity. Accordingly, by the sensor read circuit reading the sensor output voltage Vom via the sensor output line Vom, it is possible to detect the light intensity. The optical sensor circuit 102 ends the output at a time (4), and stops its operation until next reset operation.

CITATION LIST

Patent Literature 1
International Publication No. 2007/145347 (Publication Date: Dec. 21, 2007)
Patent Literature 2
Japanese Patent Application Publication, Tokukai, No. 2001-100916 A (Publication Date: Apr. 13, 2001)

SUMMARY OF INVENTION

Technical Problem

There is a strong demand for a current display device to have not only the optical sensor function but also a touch sensor function. However, if a conventional display device including, in a display region, an optical sensor circuit is designed to optically distinguish a pressed state of a display surface from a non-pressed state of the display surface based on shadows or reflections detected by a light detection function of the optical sensor circuit so as to realize also the touch sensor function, even approaching fingers or styluses make shadows on the display surface, which deteriorates the accuracy in distinguishing the pressed state from the non-pressed state. Further, outside light is likely to cause malfunctions.

In view of this, there is an option to add a touch sensor so as to realize not only the optical sensor function but also the touch sensor function. However, this causes the following problems.

Specifically, in a case where there is a distribution in pressure sensitivity within a panel surface in a touch sensor such as a capacitance change detecting touch sensor or a resistive film touch sensor, accuracy of detecting an applied pressure declines. For example, in a case where, in a liquid crystal display device, a change in a panel thickness direction that is caused by a pressure applied by a user with the use of a finger or a stylus is used in determining whether or not a pressure is applied, a change in a pressed area in a central part of a display section tends to differ from that in an end part of the display section even if the areas are pressed with the same amount of power. This is because upper and lower substrates are bonded to each other with the use of a sealing material in the vicinity of a border between the display section and a frame region of a liquid crystal panel. In the end part of the display section, an area on a frame region side is less liable to change. This causes uneven pressed dents. Such a variation in change causes a variation in capacitance change in the case of a capacitance change detecting touch sensor, and causes a variation in contact resistance of a resistive film in the case of a resistive film touch sensor.

Patent Literature 2 for example discloses a liquid crystal display device including a touch panel. FIG. 37 shows a configuration of a liquid crystal touch panel 10 disclosed in Patent Literature 2. The liquid crystal touch panel 10 includes a liquid crystal display layer 20. The liquid crystal display layer 20 includes substrates 21 and 22 on which electrodes 23 and 24 are respectively provided, and a liquid crystal composition 26 which shows a cholesteric phase in a room temperature and which preserves display in s state in which no electric filed is applied. The liquid crystal display layer 20 is constituted by a number of pixels disposed in a matrix, and displays a desired image by matrix-driving the electrodes 23 and 24. The liquid crystal composition 26 has an electric capacitance which varies depending on a thickness of the liquid crystal layer. In a case where a pressure is applied to the substrate 21 by a finger or the like, an electric capacitance of a pressed pixel changes. The capacitance is detected with the use of the electrodes 23 and 24. Thus, a pressed position can be detected.

As described above, a conventional display device including, in a display region, an optical sensor circuit suffers from a problem that in a case where a touch sensor function is added, accuracy of detection of a touch sensor declines.

The present invention was attained in view of the above conventional problems, and an object of the present invention is to provide a display device which includes, in a display region, an optical sensor circuit and which has a touch sensor function with high detection accuracy and a method for driving the display device.

Solution to Problem

In order to attain the above object, a display device of the present invention includes an optical sensor circuit provided in a display region, the optical sensor circuit including a light-receiving element and detecting intensity of light incident to the light-receiving element; and a pressure detection circuit which detects pressure applied to a display surface of a display panel on a basis of a change of the display surface in a panel thickness direction which change is caused by the pressure, with respect to a region in which the pressure is to be detected, both of the detection of the pressure by the pressure detection circuit and the detection of the intensity of the light by the optical sensor circuit being carried out within a period allocated to acquisition of detection data concerning the pressure in the display region.

According to the invention, the pressure detection circuit has a touch sensor function, and within a period allocated to acquisition of detection data regarding the pressure in the display region, both of the detection of the pressure by the pressure detection circuit and the detection of the intensity of the light are carried out. This makes it possible to detect not only application of pressure to the display surface, but also the intensity of light. Accordingly, even if a pressed area cannot be accurately detected because a change in a panel thickness direction that is caused by pressure applied to the display surface in an end portion of the display region of the display surface is different from that caused in a central portion of the display region, it is possible to accurately detect the pressed area on the basis of the result of the detection by the optical sensor circuit.

This produces an effect that it is possible to provide display device that has a touch sensor function of a high detection accuracy and that includes, in a display region, an optical sensor circuit.

In order to attain the above object, a method of the present invention for driving a display device including (i) an optical sensor circuit provided in a display region, the optical sensor circuit including a light-receiving element and detecting intensity of light incident to the light-receiving element, and (ii) a pressure detection circuit which detects pressure applied to a display surface of a display panel on a basis of a change of the display surface in a panel thickness direction which change is caused by the pressure, is arranged such that with respect to a region in which the pressure is to be detected, both of the detection of the pressure by the pressure detection circuit and the detection of the intensity of the light by the optical sensor circuit being carried out within a period allocated to acquisition of detection data concerning the pressure in the display region.

According to the invention, the pressure detection circuit has a touch sensor function, and within a period allocated to acquisition of detection data regarding the pressure in the display region, both of the detection of the pressure by the pressure detection circuit and the detection of the intensity of the light are carried out. This makes it possible to detect not only application of pressure to the display surface, but also the intensity of light. Accordingly, even if a pressed area cannot be accurately detected because a change in a panel thickness direction that is caused by pressure applied to the display surface in an end portion of the display region of the display surface is different from that caused in a central portion of the display region, it is possible to accurately detect the pressed area on the basis of the result of the detection by the optical sensor circuit.

This produces an effect that it is possible to provide a method for displaying a display device that has a touch sensor function of high detection accuracy and that includes, in a display region, an optical sensor circuit.

Advantageous Effects of Invention

As described above, the display device of the present invention includes an optical sensor circuit provided in a display region, the optical sensor circuit including a light-receiving element and detecting intensity of light incident to the light-receiving element; and a pressure detection circuit which detects pressure applied to a display surface of a display panel on a basis of a change of the display surface in a panel thickness direction which change is caused by the pressure, with respect to a region in which the pressure is to be detected, both of the detection of the pressure by the pressure detection circuit and the detection of the intensity of the light by the optical sensor circuit being carried out within a period allocated to acquisition of detection data concerning the pressure in the display region.

As described above, the method of the present invention for driving a display device including (i) an optical sensor circuit provided in a display region, the optical sensor circuit including a light-receiving element and detecting intensity of light incident to the light-receiving element, and (ii) a pressure detection circuit which detects pressure applied to a display surface of a display panel on a basis of a change of the display surface in a panel thickness direction which change is caused by the pressure, is arranged such that with respect to a region in which the pressure is to be detected, both of the detection of the pressure by the pressure detection circuit and the detection of the intensity of the light by the optical sensor circuit being carried out within a period allocated to acquisition of detection data concerning the pressure in the display region.

It is thus possible to provide a display device which includes, in a display region, an optical sensor circuit and which has a touch sensor function of a high detection accuracy and a method for driving the display device.

BRIEF DESCRIPTION OF DRAWINGS

FIG. 1 is a signal waveform chart showing a method for driving a display device of a first Example in accordance with an embodiment of the present invention.

FIG. 2 is a drawing showing a method for using a display device driven according to the method shown in FIG. 1.

FIG. 7 is a signal waveform chart showing a method for driving a display device of a third Example in accordance with the embodiment of the present invention.

FIG. 11 is a drawing showing a method for using a display device driven according to the method shown in FIG. 10.

FIG. 27 is a plan view showing a third pattern positioning example of a display region in accordance with the embodiment of the present invention.

FIG. 36 is a waveform chart showing an operation of FIG. 35.

FIG. 37 is a cross sectional view showing a conventional display device which detects a pressure.

DESCRIPTION OF EMBODIMENTS

The following explains an embodiment of the present invention with reference to FIGS. 1-34.

Figure 14:
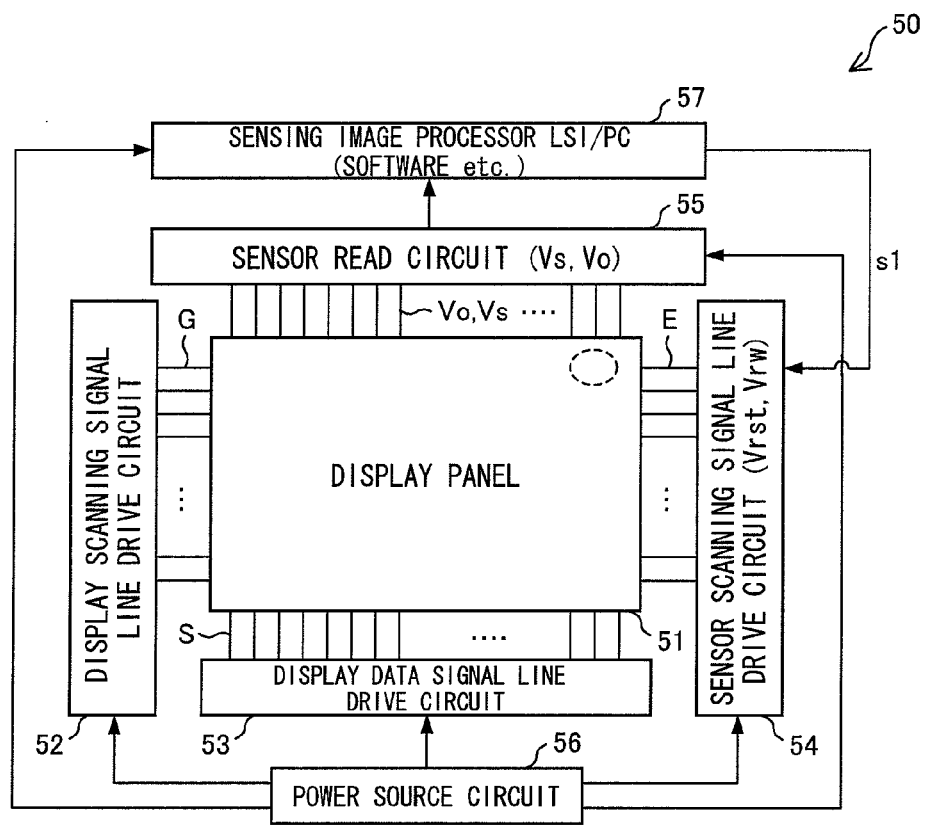
FIG. 14 is a block diagram showing a structure of a display device including the display region shown in FIG. 13.

FIG. 14 shows a configuration of a liquid crystal display device (display device) 50 in accordance with the present Embodiment.

The liquid crystal display device 50 is an active matrix display device including a display panel 51, a display scanning signal line drive circuit 52, a display data signal line drive circuit 53, a sensor scanning signal line drive circuit 54, a sensor read circuit 55, a power source circuit 56, and a sensing image processor 57.

The display panel 51 includes a plurality of gate lines G and a plurality of source lines S crossing the plurality of gate lines G, and a display region where picture elements PIX are positioned in a matrix manner so as to respectively correspond to intersections of the plurality of gate lines G and the plurality of source lines S.

The display scanning signal line drive circuit 52 drives the gate lines G by sequentially outputting, to the gate lines G, scanning signals for selecting picture elements PIX into which data signals are to be written. The display data signal line drive circuit 53 drives the source lines S by outputting data signals to the source lines S. The sensor scanning signal line drive circuit (drive circuit of first circuit) 54 line-sequentially drives sensor scanning signal lines E by sequentially outputting, to the sensor scanning signal lines E, scanning signals (voltage Vrst, voltage Vrw) for causing sensor circuits to operate. The sensor read circuit 55 reads, from sensor output lines Vo, sensor output voltages Vo (for convenience of explanation, the sensor output lines and the sensor output voltages are given the same reference sign), and supplies power source voltages to sensor power source lines Vs. The power source circuit 56 supplies power sources required for operations of the display scanning signal line drive circuit 52, the display data signal line drive circuit 53, the sensor scanning signal line drive circuit 54, the sensor read circuit 55, and the sensing image processor 57. The sensing image processor 57 analyzes distribution of the results of detections by sensors in a panel plane, based on the sensor output voltages Vo read by the sensor read circuit 55.

The functions of the sensor scanning signal line drive circuit 54 and the sensor read circuit 55 may be included in other circuits such as the display scanning signal line drive circuit 52 and the display data signal line drive circuit 53. Further, the function of the sensor read circuit 55 may be included in the sensing image processor 57. Further, the sensing image processor 57 may be provided in the liquid crystal display device 50 in such a manner that the sensing image processor 57 is an LSI, a part of a computer etc. Alternatively, the sensing image processor 57 may be provided outside the liquid crystal display device 50. Similarly, the sensor read circuit 55 may be provided outside the liquid crystal display device 50. Note here that the sensing image processor 57 supplies a mode control signal s1 to the sensor scanning signal line drive circuit 54. The mode control signal s1 is explained later.

Figure 13:
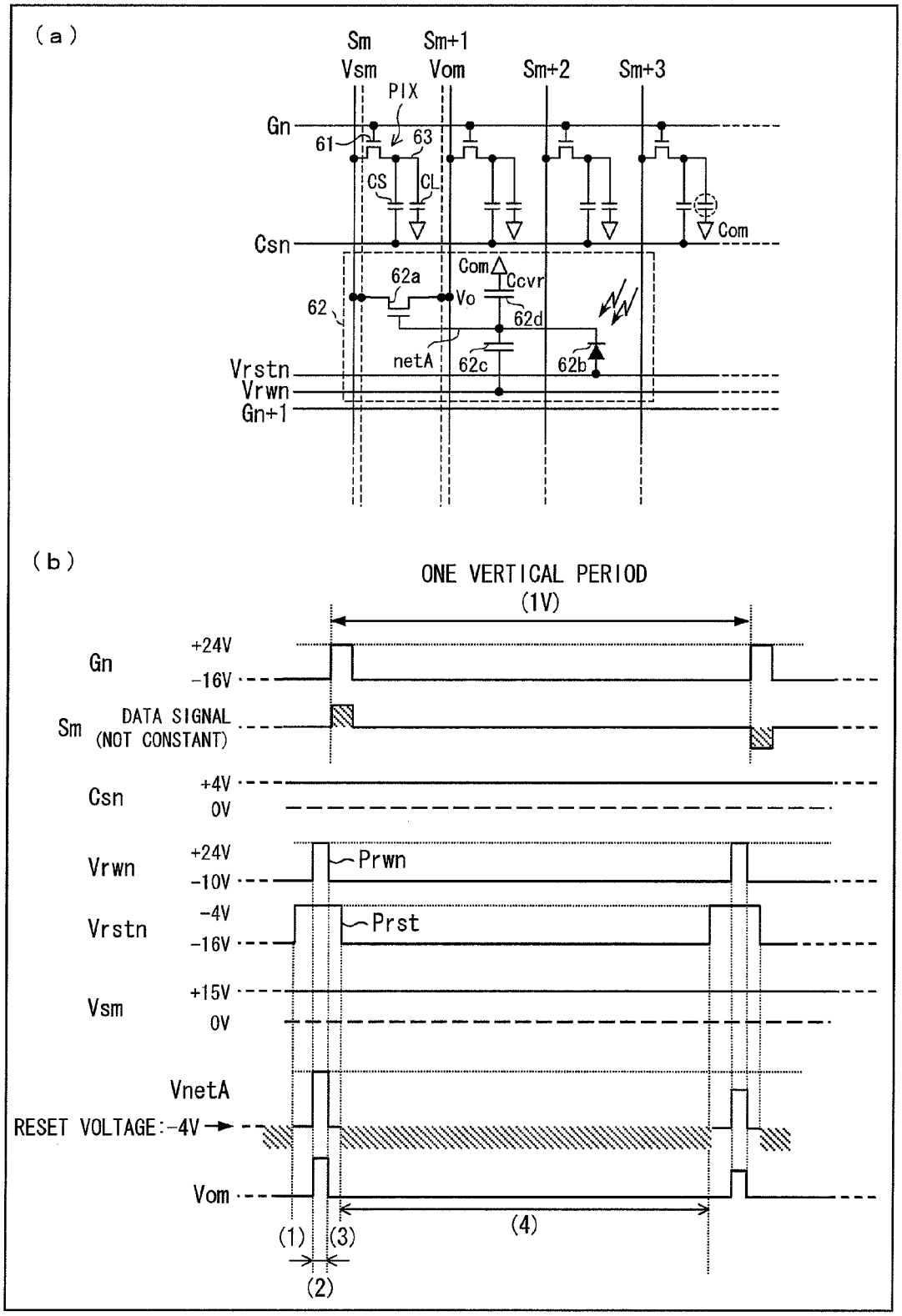
FIG. 13 is a drawing showing a structure and an operation of a display region in accordance with the embodiment of the present invention. (a) of FIG. 13 is a circuit diagram showing the structure of the display region. (b) of FIG. 13 is a waveform chart showing the operation of the display region shown in (a) of FIG. 13.

Next, (a) of FIG. 13 shows a detailed configuration of the display region.

(a) of FIG. 13 shows a configuration of an n-th row in the display region. The configuration of the n-th row includes a plurality of picture elements PIX comparted by a gate line Gn, source lines S (in the drawing, Sm to Sm+3 are shown) and a retention capacitor line Csn, and at least one sensor circuit 62 connected with a reset line Vrstn and a read control line Vrwn which are two kinds of sensor scanning signal lines E. "n" and "m" at the end of a sign indicate a row number and a column number, respectively. The retention capacitor line Csn, the reset line Vrstn, and the read control line Vrwn are positioned to be parallel to the gate line Gn.

Each picture element PIX includes a TFT 61 serving as a selection element, a liquid crystal capacitor CL, and a retention capacitor CS. A gate of the TFT 61 is connected with the gate line Gn, a source of the TFT 61 is connected with the source line S, and a drain of the TFT 61 is connected with a picture element electrode 63. The liquid crystal capacitor CL is a capacitor formed by positioning a liquid crystal layer between the picture element electrode 63 and a common electrode Com. The retention capacitor CS is a capacitor formed by positioning an insulating film between the picture element electrode 63 or the drain electrode of the TFT 61 and the retention capacitor line Csn. Constant voltages for example are applied to the common electrode Com and the retention capacitor line Csn.

The sensor circuit (first circuit) 62 is provided in any number. For example, the sensor circuit 62 is provided with respect to one picture element PIX or one pixel (e.g. a set of picture elements PIX corresponding to R, G, B, respectively). The sensor circuit 62 includes a TFT 62a, a photodiode 62b, and capacitors 62c and 62d. A gate (input of output amplifier) of the TFT (output amplifier) 62a is connected with an electrode called a node (first node) netA, a drain of the TFT 62a is connected with one source line S (here, Sm), and a source (output of output amplifier) of the TFT 62a is connected with another one source line S (here, Sm+1). An anode of the photodiode (light-receiving element) 62b is connected with the reset line Vrstn and a cathode of the photodiode 62b is connected with the node netA. One end of the capacitor (first capacitor) 62c is connected with the node netA and the other end of the capacitor 62c is connected with the read control line Vrwn, so that a capacitor is formed between the node netA and the read control line Vrwn with a gate insulating film therebetween. One end of the capacitor (second capacitor) 62d is connected with the node netA and the other end of the capacitor 62d is connected with the common electrode Com, so that a capacitor with capacitance Ccvr is formed between the node netA and the common electrode Com with a liquid crystal layer therebetween.

The sensor circuit 62 carries out two operations (operation in a light detection mode and operation in a pressure detection mode). Thus, the sensor circuit 62 serves not only an optical sensor circuit but also as a touch sensor circuit (pressure detection circuit).

In the light detection mode, during a period other than a period in which data signals are written into picture elements PIX, a voltage appearing at the node netA in accordance with intensity of light incident to the photodiode 62b is outputted as a sensor output voltage Vom from the source of the TFT 62a to the sensor read circuit 55 outside the display region via the source line S (serving as a sensor output line Vom when detecting light) connected with the source of the TFT 62a. At that time, the TFT 62a serves as a source follower, and the sensor output line Vom gets electrically disconnected from the output of the display data signal line drive circuit 53. The source line S connected with the drain of the TFT 62a gets electrically disconnected from the output of the display data signal line drive circuit 53 when light is detected, and the source line S serves as a power source line Vsm to which a constant voltage is applied from the sensor read circuit 55. Alternatively, the sensor output line Vom and the power source line Vsm may be provided independently of the source lines S as shown by broken lines close to the source lines S. The operation in the light detection mode is similar to the operation explained with reference to FIG. 36, and explained again below with reference to FIG. 36.

When a reset pulse (first pulse) Prst is applied to the anode of the photodiode 62b, the photodiode 62b gets conductive in a forward direction, and the voltage at the node netA is determined by the voltage of the reset pulse Prstn and capacitances of the capacitors 62c and 62d. When a period in which the reset pulse Prstn is applied ends, a reverse biased voltage is applied to the photodiode 62b. After a predetermined period (2), the voltage at the node netA corresponds to leakage in accordance with intensity of light incident to the photodiode 62b. In this state, a read pulse (second pulse) Prwn is applied to the other end of the capacitor 62c, and a voltage VnetA is changed to be capable of being outputted from the source of the TFT 62a. Then, while the read pulse Prwn is applied, the output of the TFT 62a is obtained. Thus, intensity of light incident to the photodiode 62b can be detected.

The following explains the operation in the pressure detection mode.

Since the sensor circuit 62 includes the capacitor 62d, the distance between the other end of the capacitor 62d (i.e. the common electrode Com positioned oppositely to the node netA) and one end of the capacitor 62d (i.e. the electrode at the node netA) changes in accordance with a change in a panel thickness direction which is caused by pressure applied to a display surface of a display panel by a user. Accordingly, the sensor circuit 62 can detect the pressure applied to the display surface by detecting a change in capacitance Ccvr of the capacitor 62d due to this change. Therefore, the sensor circuit 62 serves as a touch sensor.

Detailed plane view and detailed cross sectional view of the picture element PIX and the sensor circuit 62 are explained later. Here, an explanation is made as to the operation in the pressure detection mode with reference to schematic cross sectional views of FIGS. 15 and 16.

Figure 15:
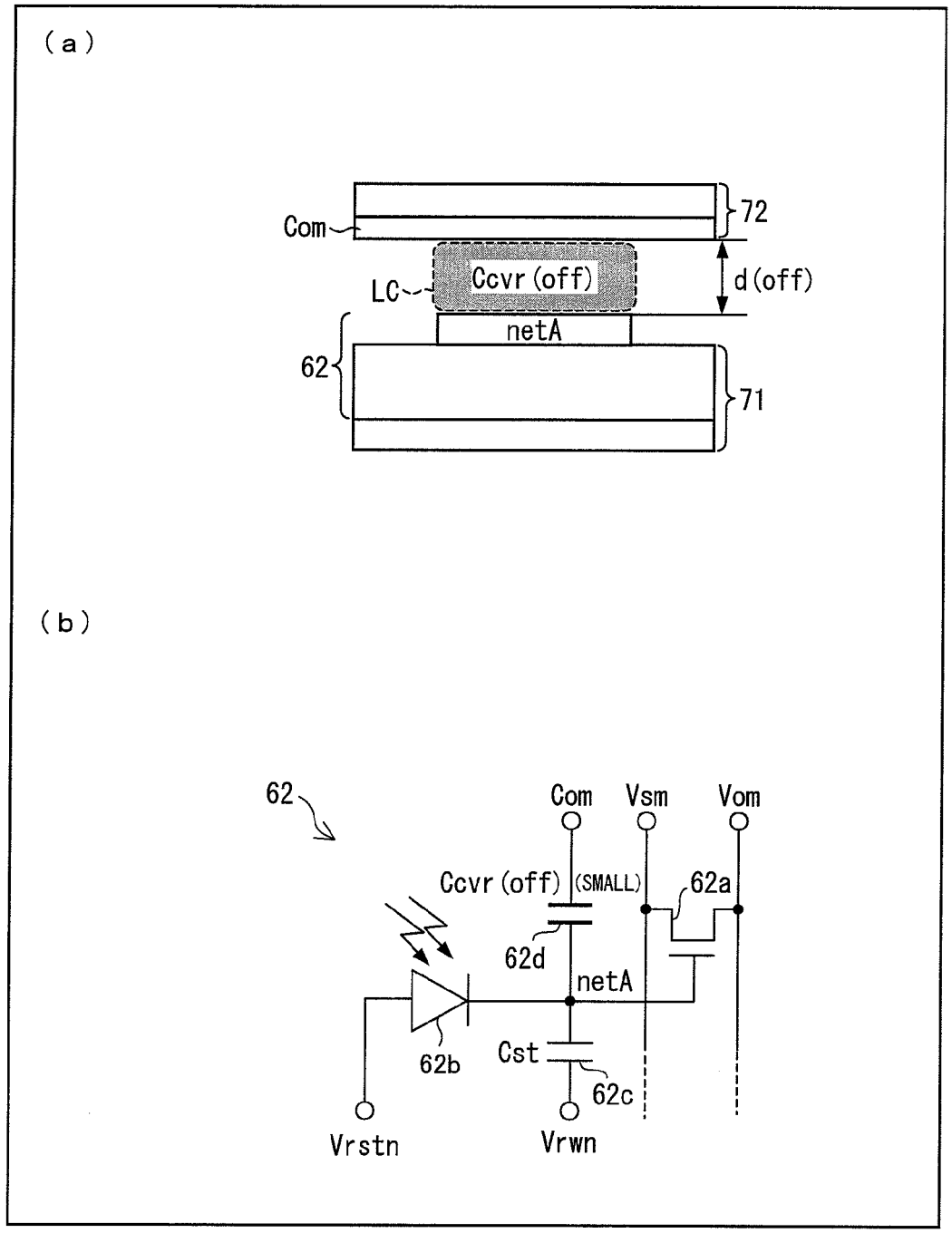
FIG. 15 is a drawing showing a cross section of a sensor circuit region where no pressure is applied and the sensor circuit in the display region shown in FIG. 13. (a) of FIG. 15 is a cross sectional view showing the sensor circuit region where no pressure is applied in the display region shown in FIG. 13. (b) of FIG. 15 is a circuit diagram showing the sensor circuit shown in (a) of FIG. 15.

(a) of FIG. 15 is a cross sectional view of a panel when no pressure is applied to a panel surface. The panel is designed such that a liquid crystal layer LC is provided between a TFT substrate (matrix substrate) 71 and a counter substrate (substrate having display surface) 72, and a capacitor 62d is formed between the node netA on the upper plane of the TFT substrate 71 and the common electrode Com. In this state, since the counter substrate 72 is not pressed, the common electrode Com does not change and a distance d (off) between the node netA and the common electrode Com is large. Accordingly, capacitance Ccvr (off) of the capacitor 62d is small. Consequently, as shown in (b) of FIG. 15, the voltage at the node netA is based on charge sharing by the capacitor 62c having constant capacitance Cst and the capacitor 62d having small capacitance Ccvr (off).

Figure 16:
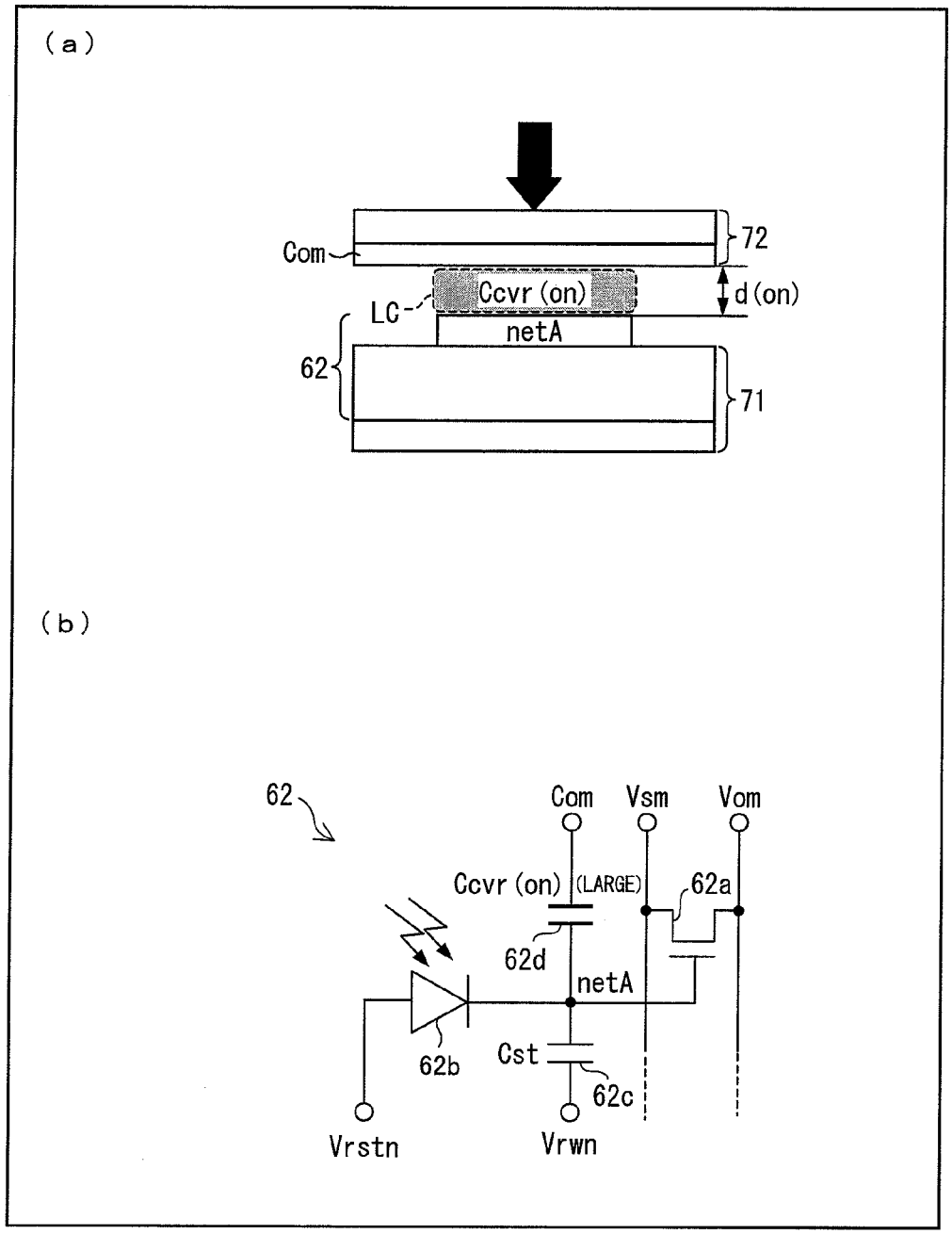
FIG. 16 is a drawing showing a cross section of a sensor circuit region where a pressure is applied and the sensor circuit in the display region shown in FIG. 13. (a) of FIG. 16 is a cross sectional view showing the sensor circuit region where a pressure is applied in the display region shown in FIG. 13. (b) of FIG. 16 is a circuit diagram showing the sensor circuit shown in (a) of FIG. 16.

(a) of FIG. 16 shows a cross sectional view of the panel when a pressure is applied to the panel surface. In this state, since the counter substrate 72 is pressed, the common electrode Com changes and a distance d (on) between the node netA and the common electrode Com is small. Accordingly, capacitance Ccvr (on) of the capacitor 62d is large. Consequently, as shown in (b) of FIG. 16, the voltage at the node netA is based on charge sharing by the capacitor 62c having constant capacitance Cst and the capacitor 62d having large capacitance Ccvr (on).

The voltage VnetA at the node netA is represented by $$VnetA = Vinti + (Cst/Ctotal) \times \Delta Vrw$$

wherein Vinit indicates a reset voltage for the node netA before detecting application of a pressure, Ctotal indicates whole capacitances of capacitors connected with the node netA, and ΔVrw indicates a stepwise change in voltage applied to the read control line Vrwn.

Here, Ctotal includes capacitances of Cst, Ccvr, and other parasitic capacitors.

The sensor output voltage Vo represented by the source voltage of the TFT 62a is larger as the voltage VnetA is larger. Accordingly, the sensor output voltage Vo is larger as α=Cst/Ctotal is larger, i.e. as Ctotal is smaller. Since Ccvr (off)<Ccvr (on), the sensor output voltage Vo is smaller when a pressure is applied than when no pressure is applied. Therefore, by the sensor read circuit 55 reading out the sensor output voltage Vo and determining whether the sensor output voltage Vo is larger or smaller, it is possible to distinguish whether a pressure is applied or not.

With reference to (b) of FIG. 13, the following details the operation of the sensor circuit 62 in the pressure detection mode. In the present embodiment, when the operation in the pressure detection mode is carried out, the light detection operation is stopped, and when the operation in the light detection mode is carried out, the pressure detection mode is stopped. Note that, in (b) of FIG. 13, "n" and "m" at the end of a sign indicate a row number and a column number, respectively.

During a writing period in which a data signal is written, a gate pulse consisting of +24V High level and −16V Low level for example is outputted as a scanning signal to the gate line Gn, and data signals are outputted to the source lines S. A constant voltage (e.g. +4V) is applied to the retention capacitor line Csn. This operation is repeated with respect to picture elements PIX in each row per one vertical period (1V). Other than the writing period, the result Vo of pressure detection by the sensor circuit 62 can be outputted to the sensor read circuit 55.

At a time (1), when a reset pulse (third pulse) Prstn consisting of −4V High level and −16V Low level for example is applied from the sensor scanning signal line drive circuit to the reset line Vrstn, the photodiode 62b gets conductive in a forward direction, and the voltage VnetA at the node netA is reset. At that time, the voltage Vnet is substantially reset to a High level voltage of the reset pulse Prstn. Thereafter, during a period (2) in which the reset pulse Prstn is applied, a read pulse (fourth pulse) Prwn consisting of +24V High level and −10V Low level for example is applied from the sensor scanning signal line drive circuit 54 to the read control line Vrwn, so that the voltage VnetA at the node netA increases. At that time, the voltage VnetA is set so that a voltage between the gate and the source of the TFT 62a goes beyond a threshold voltage. Application of the read pulse Prwn puts the voltage VnetA in a state where a reverse biased voltage is applied to the photodiode 62b and in a state where the output from the source of the TFT 62a is possible.

The sensor output voltage Vo outputted from the source of the TFT 62a while the read pulse Prwn is applied corresponds to the voltage VnetA, i.e. corresponds to the degree of the applied pressure. Therefore, by the sensor read circuit 55 reading the sensor output voltage Vo via the sensor output line Vom and comparing the sensor output voltage Vo with a threshold value to determine whether the sensor output voltage Vo is larger or smaller than the threshold value, it is possible to determine whether a pressure is applied or not. When the reset pulse Prstn falls at a time (3) after falling of the read pulse Prwn, the sensor circuit 62 stops its operation during a period (4) before the next reset operation.

During the period (4), the photodiode 62b which has been put in a revere biased state due to fall of the reset pulse Prstn suffers leakage according to intensity of light incident to the photodiode 62b. Accordingly, the voltage VnetA changes in accordance with the light intensity. However, since detection of application of a pressure is carried out during the period (2), it is possible to prevent incident light from being a noise which changes the voltage VnetA in the pressure detection operation.

Figure 17:
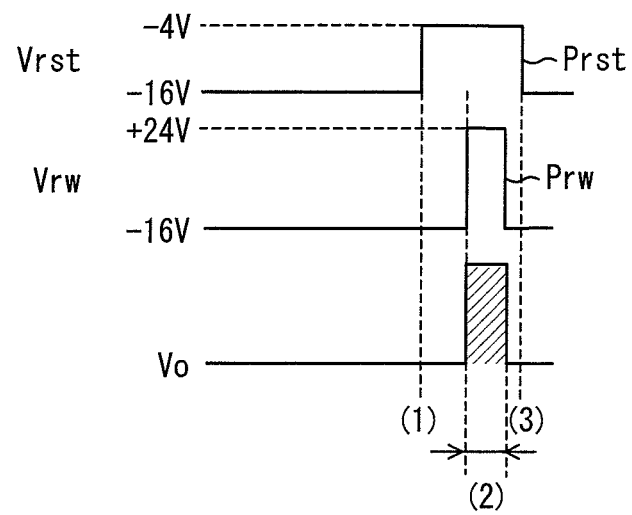
FIG. 17 is a waveform chart showing a first operation of a sensor circuit in accordance with the embodiment of the present invention.

In the above example, as shown in FIG. 17, a period of the read pulse Prwn, i.e. a period in which the sensor read circuit 55 reads out the sensor output voltage Vo, is set to be within a period of the reset pulse Prstn. In this case, a reverse biased voltage applied to the photodiode 62b during the period (2) is relatively small, so that a difference in internal conductivity due to a difference in intensity of light incident to the photodiode 62 is small. Accordingly, a noise due to incident light in the pressure detection operation is reduced to the minimum, achieving a very high accuracy in detection of an applied pressure.

Figure 18:
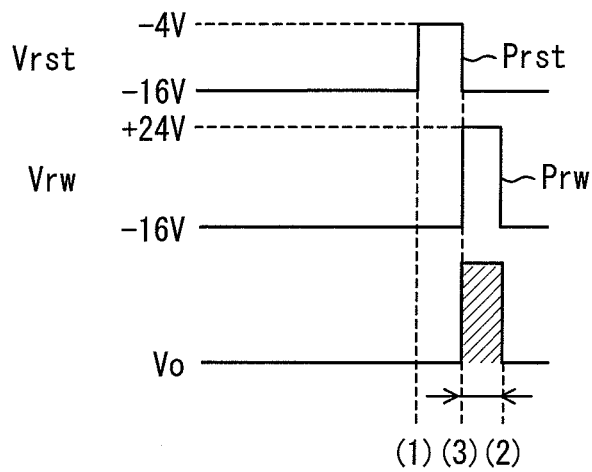
FIG. 18 is a waveform chart showing a first operation of a sensor circuit in accordance with the embodiment of the present invention.

However, the present invention is not limited to the above. Alternatively, as shown in FIG. 18, the period of the read pulse Prw, i.e. a period in which the sensor read circuit 55 reads out the sensor output voltage Vo is set to follow the reset pulse Prst. The timing of FIG. 18 may be understood as, in FIG. 17, the period (2) of the read pulse Prw starting at the time (3) at which the reset pulse Prst whose pulse period ranges from the time (1) to the time (3) falls. Also in the configuration of FIG. 18, the sensor output voltage Vo is read out right after the voltage Vnet is reset. Accordingly, even if light with any intensity is incident to the photodiode 62b, the node netA does not go through a floating state where the voltage VnetA is susceptible to a change in voltage before reading the sensor output voltage Vo. Accordingly, it is possible to prevent incident light from being a noise which changes the voltage VnetA in the pressure detection operation.

According to the process shown in FIG. 18, the fall timing of the reset pulse Prw is equal to the rise timing of the read pulse Prw, and so timing setting is easy. Further, since detection of an applied pressure is made right after resetting, a noise due to incident light is not problematic. Besides, since the period of the reset pulse Prw can be shorter, a noise due to light incident to the photodiode 62b in a forwardly conductive state during a reset period can be reduced to the minimum. This enables further increasing accuracy in detection of an applied pressure.

In the examples in FIGS. 17 and 18, application of a voltage to the reset line Vrst is made by a pulse. Alternatively, the application of a voltage to the reset line Vrst may be made by a DC voltage (first direct current voltage). A specific example thereof is a DC voltage of −4V. Specific arrangement is as follows: the first direct voltage is always applied to the anode of the photodiode 62b. Application of the first direct voltage to the anode during a first period (corresponding to a period prior to the timing to start the period (2) in FIGS. 17 and 18) makes the photodiode 62b conductive in a forward direction. During a second period following the first period (the second period corresponds to the period (2) in FIGS. 17 and 18), while the first direct voltage is applied to the anode, a read pulse (second pulse) Prw is applied to the other end of the capacitor 62c to change the voltage VnetA at the node netA so that a reverse biased voltage is applied to the photodiode 62b. While the read pulse Prw is applied, an output from the TFT 62a is obtained.

With the arrangement, it is unnecessary to specify timing of pulse to be applied to the reset line Vrst. Accordingly, timing setting is further easier than the methods of FIGS. 17 and 18.

The following description specifically discusses an effect achieved by providing the sensor circuit 62.

A conventional display device including an optical sensor circuit in a display region suffers various problems when the display device is designed to include a touch sensor function as well.

For example, if such a conventional display device is designed to optically distinguish a pressed state of a display surface from a non-pressed state of the display surface based on shadows or reflections detected by a light detection function of the optical sensor circuit, even approaching fingers or styluses make shadows on the display surface, which deteriorates the accuracy in distinguishing the pressed state from the non-pressed state. Further, outside light is likely to cause malfunctions.

Further, if such a conventional display device is designed such that an electrostatic capacitor touch panel or a resistive film touch panel is externally added, another panel is layered on a display surface of a liquid crystal panel etc., so that display luminance drops or the panel as a whole is thickened. Further, the externally added touch panel increases the cost.

Further, if such a conventional display device is designed such that the electrostatic capacitor touch panel or the resistive film touch panel is provided adjacently in an in-plane direction to a region where the optical sensor circuit is provided, the cost for LSI to provide panels with different circuit configurations in the same layer increases, and an open area ratio in the display region drops.

As described above, a conventional display device including an optical sensor circuit in a display region suffers problems such as the display device cannot be designed to include a low-priced and highly reliable touch panel function without deteriorating a display function.

According to the present invention, since the sensor circuit 62 is provided, it is possible to realize a display device including a low-priced, downsized, and highly reliable touch panel function without deteriorating a display function and to realize a method for driving the display device.

The following description discusses, with reference to FIGS. 1 through 12, Examples of alternative use of the operation in the light detection mode and the operation in the pressure detection mode of the liquid crystal display device 50 of the present embodiment.

First Example

The following explains Examples of alternative use of the operation in the light detection mode and the operation in the pressure detection mode of the optical sensor circuit 62.

In the present Example, when using software for the operation in the light detection mode or software for the operation in the pressure detection mode as shown in FIG. 2, execution of individual software is detected so as to determine which mode the sensor circuit 62 is operated in. For convenience of explanation, the software for the operation in the light detection mode and the software for the operation in the pressure detection mode are different application software. Alternatively, the two software may be included in single application software.

It is assumed in FIG. 2 for example that scanner software and music-playing software are used in the liquid crystal display device 50. These software are stored in an external computer including the sensing image processor 57. Initially, in (1), when execution of the scanner software is started, the scanner software instructs the sensor scanning signal line drive circuit 54 to perform light detection drive. Consequently, the sensor scanning signal line drive circuit 54 outputs to the sensor circuit 62 a reset pulse Prst and a read pulse Prwn according to a sequence for the light detection mode. In the light detection mode, when a visiting card is put above a screen as shown in (2) in order to scan the visiting card, the sensor circuit 62 reads an image of the visiting card as shown in (2') by using reflection of backlight. When the visiting card is removed from the screen as shown in (3), the image of the visiting card is not recognized as shown in (3').

Subsequently, when execution of the scanner software is finished and execution of the music-playing software is started in (4), the music-playing software instructs the sensor scanning signal line driving circuit 54 to perform pressure detection drive. Consequently, the sensor scanning signal line drive circuit 54 outputs to the sensor circuit 62 a reset pulse Prst and a read pulse Prwn according to a sequence for the pressure detection mode. In the pressure detection mode, when a predetermined touch sensing area displayed on a screen is pressed by a finger, a stylus etc. as shown in (5), coordinates of the pressed area are detected as shown in (5') and the sound corresponding to the pressed area is emitted from a speaker. Further, when pressing a plurality of touch sensing areas as shown in (6), it is possible to simultaneously emit sounds corresponding to the pressed areas, respectively, as shown in (6').

FIG. 1 is a signal waveform chart showing the operation of the sensor circuit 62 switching between the light detection drive and the pressure detection drive.

Switching instruction is made by for example a mode control signal s1 supplied from the sensing image processor 57 to the sensor scanning signal line drive circuit 54. The mode control signal s1 is a pulse signal as shown in FIG. 1 for example. The mode control signal s1 is generated in a computer when switching between the light detection drive and the pressure detection drive in response to start of execution of the scanner software or the music-playing software. The mode control signal s1 for instructing the sensor scanning signal line drive circuit 54 to perform the light detection drive is referred to as a first control signal, and the mode control signal s1 for instructing the sensor scanning signal line drive circuit 54 to perform the pressure detection drive is referred to as a second control signal. When the mode control signal s1 is supplied to the sensor scanning signal line drive circuit 54, one of the first control signal and the second control signal is selected and supplied. In the present Example, generally, with respect to a screen to be displayed next to the currently displayed screen, which of the first control signal and the second control signal is to be supplied to the sensor scanning signal line drive circuit 54 is determined based on data of the screen to be displayed next. The currently displayed screen includes a screen at the time when the power of the display device is OFF.

FIG. 1 shows an example in which one of the light detection drive and the pressure detection drive is once started in response to the mode control signal s1, the sensor circuit 62 repeats, with respect to every one vertical period (1V), the operation in the light detection mode when the light detection drive is performed, and the operation in the pressure detection mode when the pressure detection drive is performed, until the mode control signal s1 for switching the present detection drive to the other detection drive is generated. In the case of the light detection drive, a difference in the sensor output voltage Vo of D.R.1 occurs depending on whether light is incident to the photodiode 62b or not, thereby determining whether light is detected or not. In the case of the pressure detection drive, a difference in the sensor output voltage of D.R.2 occurs depending on whether pressure is applied or not, thereby determining whether pressure is detected or not.

The mode control signal s1 may be a pulse which is supplied at timing of transition from a light detection drive period to a pressure detection drive period or vice versa as shown in the second graph from the bottom of FIG. 1 and which instructs the sensor scanning signal line drive circuit 54 to switch between the light detection drive and the pressure detection drive. For example, assume that there are provided the mode control signal s1 for the light detection drive and the mode control signal s1 for the pressure detection drive. The sensor scanning signal line drive circuit 54 receives the mode control signal s1 and performs logical operation of a start pulse and the mode control signal s1 to generate a shift pulse for the light detection drive or a shift pulse for the pressure detection drive, and inputs the generated pulse into a shift register in the sensor scanning signal line drive circuit 54. By differentiating the mode control signal s1 for the light detection drive and the mode control signal s1 for the pressure detection drive from each other in terms of a pulse width, a pulse polarity, phase difference with respect to a predetermined timing signal etc., logical operation with the same start pulse generates different pulses in terms of timing, a pulse width, amplitude, polarity etc. Accordingly, it is possible to generate a reset pulse Prst1 for the light detection drive, a reset pulse Prst2 for the pressure detection drive, and the read pulse Prwn. The same can be applied to other Examples.

Alternatively, the sensor scanning signal line drive circuit 54 may be arranged such that on reception of the mode control signal s1, the sensor scanning signal line drive circuit 54 switches between input of a start pulse into a shift register for the light detection drive and input of a start pulse into a shift register for the pressure detection drive by use of a switch for determining an input route. The shift register for the light detection drive and the shift register for the pressure detection drive are included in the sensor scanning signal line drive circuit 54. The switch may be designed to switch shift registers to which a start pulse is to be inputted depending on whether the mode control signal s1 is for the light detection drive or the pressure detection drive, or may be designed such that every time a pulse of the mode control signal s1 with the single pulse polarity is inputted, the switch switches between input of a start pulse into the shift register for the light detection drive and input of a start pulse into the shift register for the pressure detection drive. Timing, pulse width, and amplitude of the reset pulses Prst1 and Prst2 and the read pulse Prwn can be set individually. Further, as shown in FIG. 1, if the read pulse Prwn has constant timing and constant waveform, only the reset pulses Prst1 and Prst2 may be generated separately for the light detection drive and the pressure detection drive.

Further, as shown in the graph at the bottom of FIG. 1, the mode control signal s1 may be an enable signal which determines the output period of a High voltage of the reset pulse Prst in order to give instruction to set the pulse width of the reset pulse Prst for the light detection drive (Prst1) or for the pressure detection drive (Prst2) at timing of the reset pulse Prst.

Figure 3:
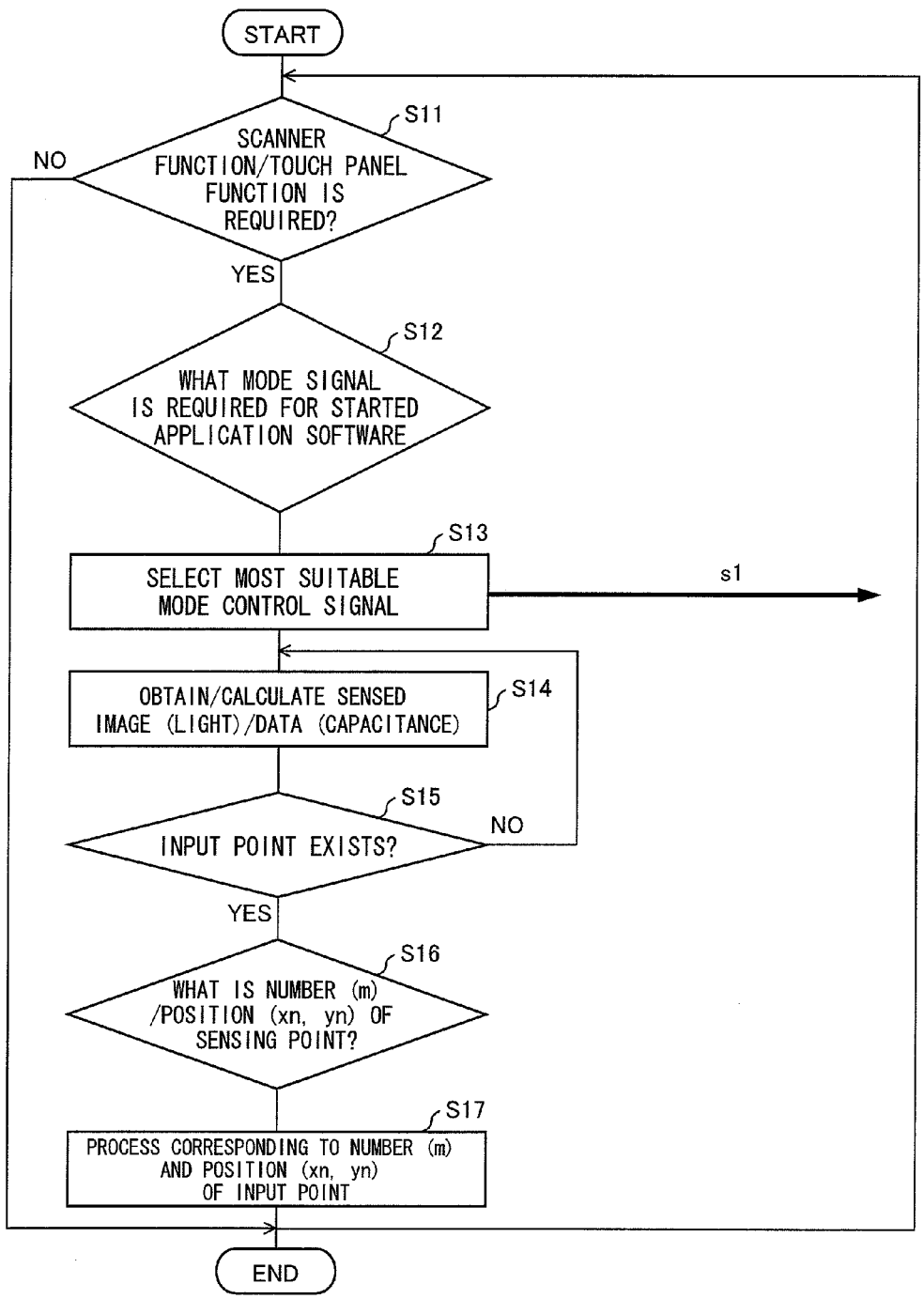
FIG. 3 is a flowchart showing a method for driving the display device shown in FIGS. 1 and 2.

FIG. 3 is a flowchart for carrying out the operations in FIGS. 1 and 2. Here, as an example, the subject of the operation is the sensing image processor 57 in a computer. Alternatively, the subject of the operation may be a control section (e.g. normal liquid crystal controller) provided at any position (inside or outside position) of the liquid crystal display device 50. The same can be applied to other Examples.

Initially, in step S11, when certain application software is started, it is determined whether the scanner function (i.e. light detection mode) or the touch panel function (i.e. pressure detection mode) is required or not. When it is determined that the scanner function or the touch panel function is required in step S11, the process goes to step S12, and it is determined whether a mode control signal s1 required for the started application software is for the light detection drive or for the pressure detection drive. When it is determined that the scanner function or the touch panel function is required in step S11, the process is finished.

Subsequently, the process goes to step S13. The required mode control signal s1 for which determination was made in step S12 is selected and set. Consequently, the mode control signal s1 is supplied from the sensing image processor 57 for example to the sensor scanning signal line drive circuit 54. Subsequently, the process goes to step S14, and the sensor scanning signal line drive circuit 54 is caused to perform the light detection drive or the pressure detection drive, so that the sensor read circuit 55 is caused to read an optically sensed image or data corresponding to a change in capacitance, and the sensing image processor 57 performs calculation, based on the result of detection obtained from the sensor read circuit 55, to determine whether an input point exists or not on the screen.

In the next step S15, based on the result of the calculation, it is determined whether the input point exists or not on the screen. When the input point exists, the process goes to step S16. When the input point does not exist on the screen, the process goes back to step S14. In step 16, it is determined to which one of predetermined patterns the number of sensing points constituting the input point and coordinates of the input point on the screen correspond. Step S17 diverges into individual processes corresponding to the patterns corresponding to the number of the input points and the coordinates of the input points, and the processes are carried out.

When step S17 is finished, the process goes back to the first step. When the application software is ended, the whole process is finished.

Second Example

The present Example is based on switching between the light detection drive and the pressure detection drive in response to the mode control signal s1 described in First Example. An explanation will be made as to an operation of starting the light detection drive with a trigger of detection of a pressure by the sensor circuit 62 in the pressure detection mode.

Figure 5:
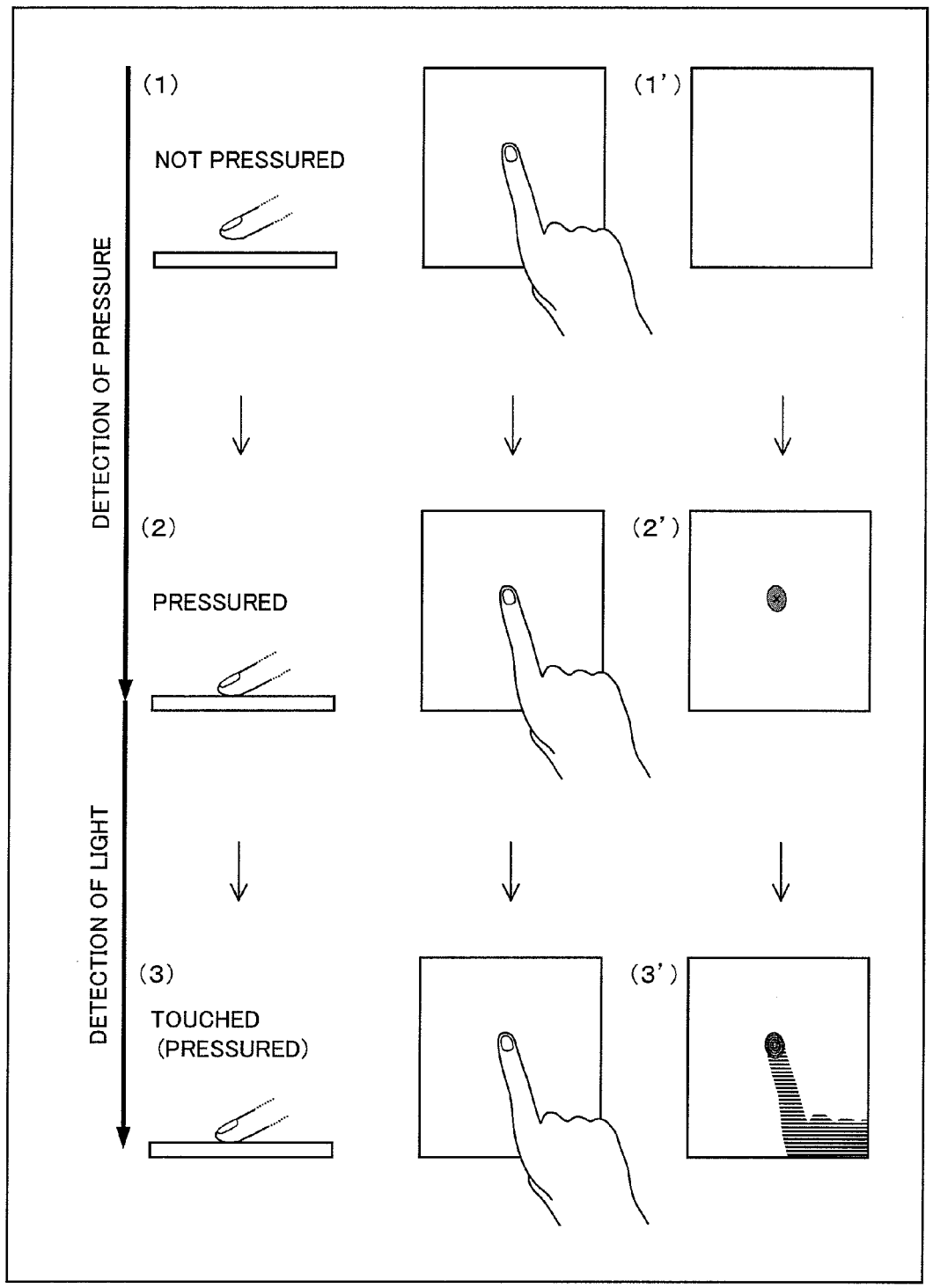
FIG. 5 is a drawing showing a method for using a display device driven according to the method shown in FIG. 4.

In the present Example, as shown in FIG. 5, application of a pressure on an area of the sensor circuit 62 operating in the pressure detection mode causes transition to the light detection drive. The area of the sensor circuit 62 operating in the pressure detection mode is designed to be displayed as a default menu area on the screen when, for example, certain application software is started. The area of the sensor circuit 62 may be an area spreading over the whole screen instead of the menu area. (1) indicates a state where no pressure is applied to the area, and detection of an applied pressure or detection of light is not made when a finger comes close to the area as shown in (1').

Subsequently, as shown in (2), when a user wants to cause the application software to carry out the scanner function, the user applies by a finger a pressure to an operation area of the pressure detection mode which is displayed as the menu area. At that time, where the pressure is applied is detected as shown in (2'). As a result of the detection of the pressure, the liquid crystal display device 50 recognizes necessity to transit to the light detection drive, and starts the light detection drive. In the light detection mode, when a finger touches the screen (or a finger presses the screen) so that the finger is scanned as shown in (3), data of a fingerprint is obtained as shown in (3'). Further, data of the shadow of an approaching hand may be simultaneously obtained as shown in (3') so that detection different from detection of an applied pressure is made. The area on the screen to be touched by a finger to obtain a fingerprint may be a one changed from the menu area of the sensor circuit 62 operating in the pressure detection mode in advance, or may be a one different from the menu area.

Release of the light detection mode may be made in such a manner that leaving the mode for a predetermined time leads to the release, or pressing the same menu area again leads to the release, or pressing other menu area leads to the release etc.

In the present Example as well as in First example, the mode control signal s1 for instructing the sensor scanning signal line drive circuit 54 to perform the light detection drive is referred to as a first control signal, and the mode control signal s1 for instructing the sensor scanning signal line drive circuit 54 to perform the pressure detection drive is referred to as a second control signal. When the mode control signal s1 is supplied to the sensor scanning signal line drive circuit 54, one of the first control signal and the second control signal is selected and supplied. In the present Example, which of the first control signal and the second control signal is to be supplied to the sensor scanning signal line drive circuit 54 is determined based on whether or not a pressure is applied to a predetermined area of a display surface for which the sensor circuit 62 operates as a pressure detection circuit on the currently displayed screen. The currently displayed screen includes a screen at the time when the power of the display device is OFF.

Figure 4:
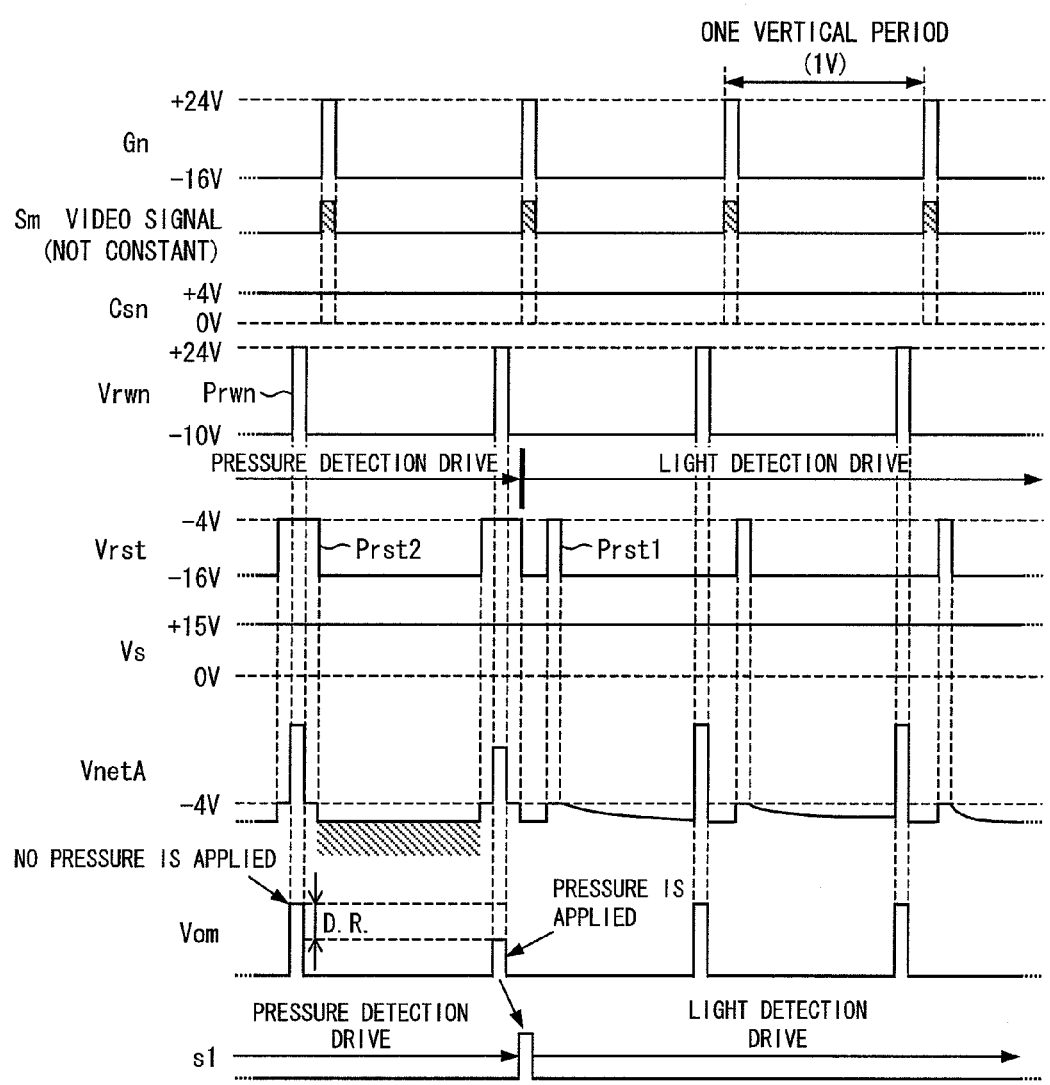
FIG. 4 is a signal waveform chart showing a method for driving a display device of a second Example in accordance with the embodiment of the present invention.

FIG. 4 is a signal waveform chart showing the operation of causing the sensor circuit 62 to start the light detection drive.

The sensor scanning signal line drive circuit 54 outputs beforehand a reset pulse Prst2 and a read pulse Prwn each for the pressure detection drive. For example, when a sensor output voltage Vom drops by D.R compared with a case when no pressure is applied, the sensing image processor 57 recognizes that a pressure is applied, and supplies to the sensor scanning signal line drive circuit 54 the mode control signal s1 for causing the sensor scanning signal line drive circuit 54 to start the light detection drive. Consequently, the sensor scanning signal line drive circuit 54 starts the light detection drive, and the target sensor circuit 62 operates in the light detection mode.

Figure 6:
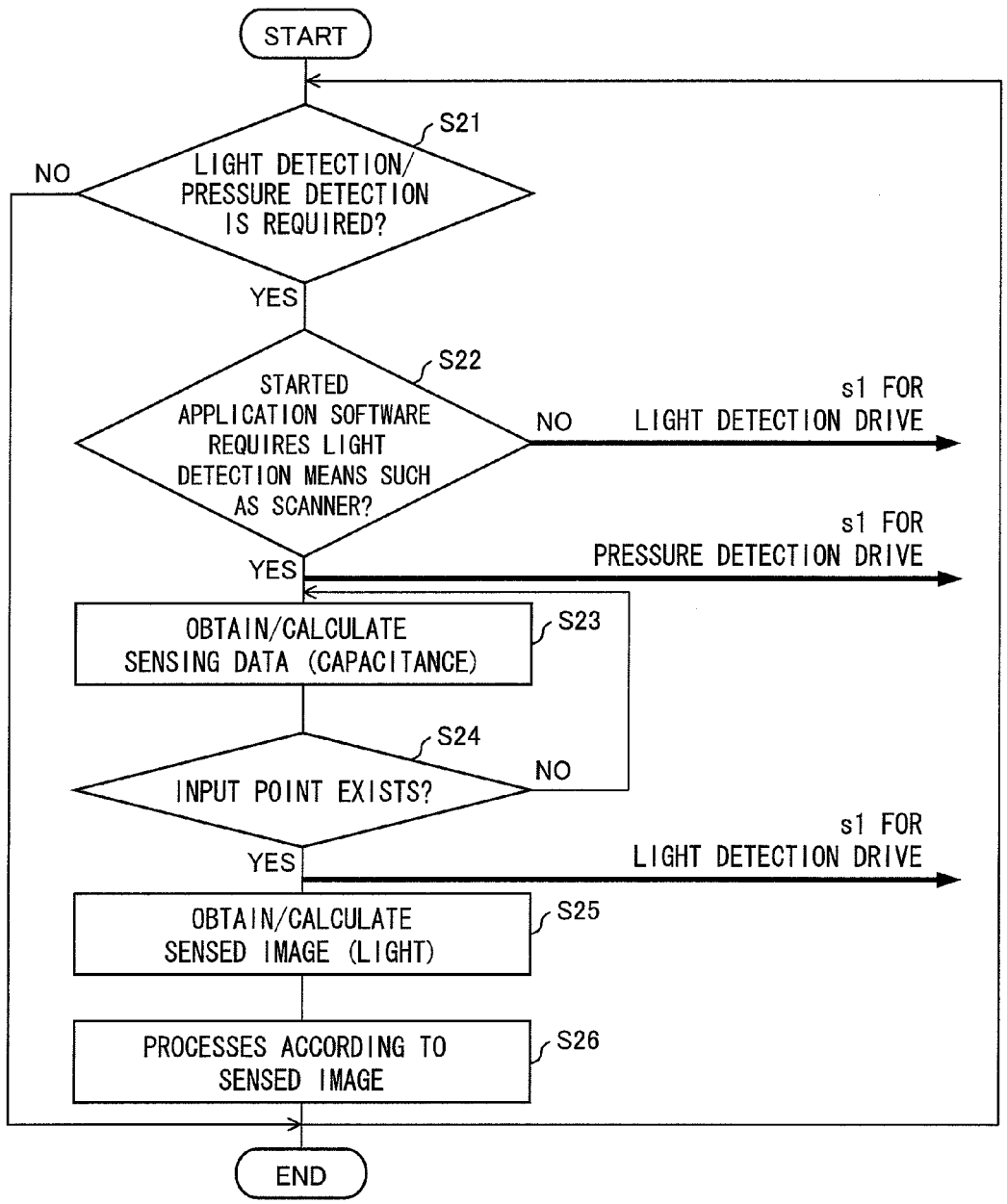
FIG. 6 is a flowchart showing a method for driving the display device shown in FIGS. 4 and 5.

FIG. 6 is a flowchart for the operations in FIGS. 4 and 5.

Initially, in step S21, when certain application software is started, it is determined whether one of light detection and pressure detection is necessary or not. When it is determined that one of light detection and pressure detection is necessary, the process goes to step S22, and when it is determined that none of light detection and pressure detection is necessary, the process is finished. In step S22, it is determined whether the started software requires light detection means such as a scanner or not. When the started software requires the light detection means, the mode control signal s1 for the light detection drive is outputted, steps S14 to S17 in FIG. 3 are carried out and then the process is finished. When the started software does not require the light detection means, the mode control signal s1 for the pressure detection is outputted and the process goes to step S23.

In step S23, the sensor read circuit 55 is caused to obtain sensing data corresponding to a change in capacitance, and the sensing image processor 57 makes calculation, based on the result of detection obtained from the sensor read circuit 55, to determine whether an input point exists or not on the screen. In the next step S24, it is determined whether the input point exists or not on the screen based on the result of the calculation. When the input point exists, the process goes to step S25. When the input point does not exist, the process goes back to step S23.

In step S25, the sensor read circuit 55 is caused to obtain an optically sensed image and the sensing image processor 57 calculates coordinates of the input point based on the result of the detection obtained from the sensor read circuit 55. In the next step S26, processes according to the sensed image are carried out based on the result in step S25.

When step S26 is finished, the process goes back to the first step, and when execution of the application software is finished, the whole process is finished.

Third Example

The present Example is based on switching between the light detection drive and the pressure detection drive in response to the mode control signal s1 described in First Example. An explanation will be made as to an operation of switching, according to time, between (i) causing the sensor circuit 62 to operate in the light detection mode and (ii) causing the sensor circuit 62 to operate in the pressure detection mode. With this switching operation, it is possible to improve accuracy in detection of applied pressure.

Figure 8:
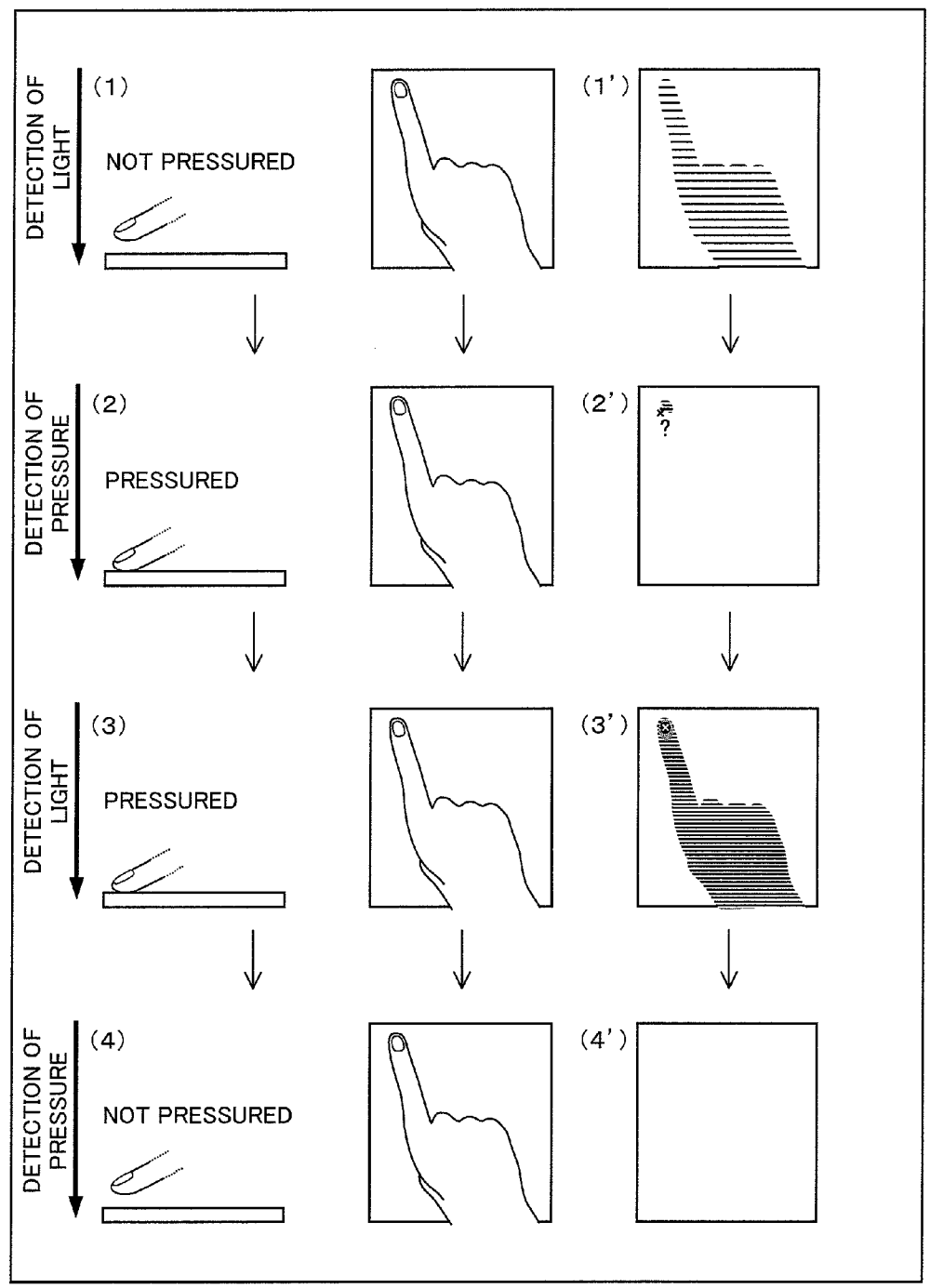
FIG. 8 is a drawing showing a method for using a display device driven according to the method shown in FIG. 7.

In the present Example, as shown in FIG. 8, an operation of switching between the light detection drive and the pressure detection drive for every predetermined period is carried out with respect to pressure applied to an area on a screen. In (1), the light detection drive is performed, and data of a shadow of a hand and finger which is about to press a touch sensing area is detected as shown in (1') before the finger presses the touch sensing area. The light detection drive of (1) is switched over to the pressure detection drive after being performed for a certain period, and data corresponding to a pressed area as shown in (2') is obtained with respect to the finger in a pressing state as shown in (2). The pressure detection drive of (2) is again switched over to the light detection drive after being performed for a certain period, and data corresponding to the pressed area and data of the shadow of the hand as shown in (3') are obtained with respect to the finger in the pressing state as shown in (3). There is a difference in detection intensity between an image of the finger which is pressing the screen and an image of the hand which is other than the finger and is not pressing the screen. This makes it possible to discriminate an area pressed by the finger. The light detection drive of (3) is again switched over to the pressure detection drive after being performed for a certain period. The data of (2') and (3') are obtained over a vertical period(s) during which pressure is being applied by the finger. When the finger stops pressing the screen and is released from the screen as shown in (4), no pressure is detected as shown in (4').

If an area close to an edge of the display region is pressed when the above operation is carried out, it is difficult to obtain a change in a substrate which change is large enough to accurately determine a pressed area. This is because the change in the substrate caused by pressure tends to be inhibited by a junction of substrates combined with use of a sealing material. If this is the case, it may be impossible to accurately detect the pressed area shown in (2'), although it is possible to detect by the pressure detection drive a state where pressure is applied. Note however that, even in this case, it is possible to detect an area pressed by a finger by the light detection drive as shown in (3'). That is, on the basis of the data obtained in (2') and (3'), it is possible to (i) detect a state where pressure is definitely applied and (ii) accurately detect a pressed area.

FIG. 7 is a signal waveform chart showing how the operation of switching between the light detection drive and the pressure detection drive is carried out with respect to the sensor circuit 62.

The sensor scanning signal line drive circuit 54 switches between the light detection drive and the pressure detection drive for every one vertical period (1V) serving as the foregoing certain period, for example. The mode control signal s1 is supplied as for example an enable signal which determines a period of a High voltage of the reset pulse Prst in accordance with a pulse width of the reset pulse Prst1 for the light detection drive or of the reset pulse Prst2 for the pressure detection drive.

Figure 9:
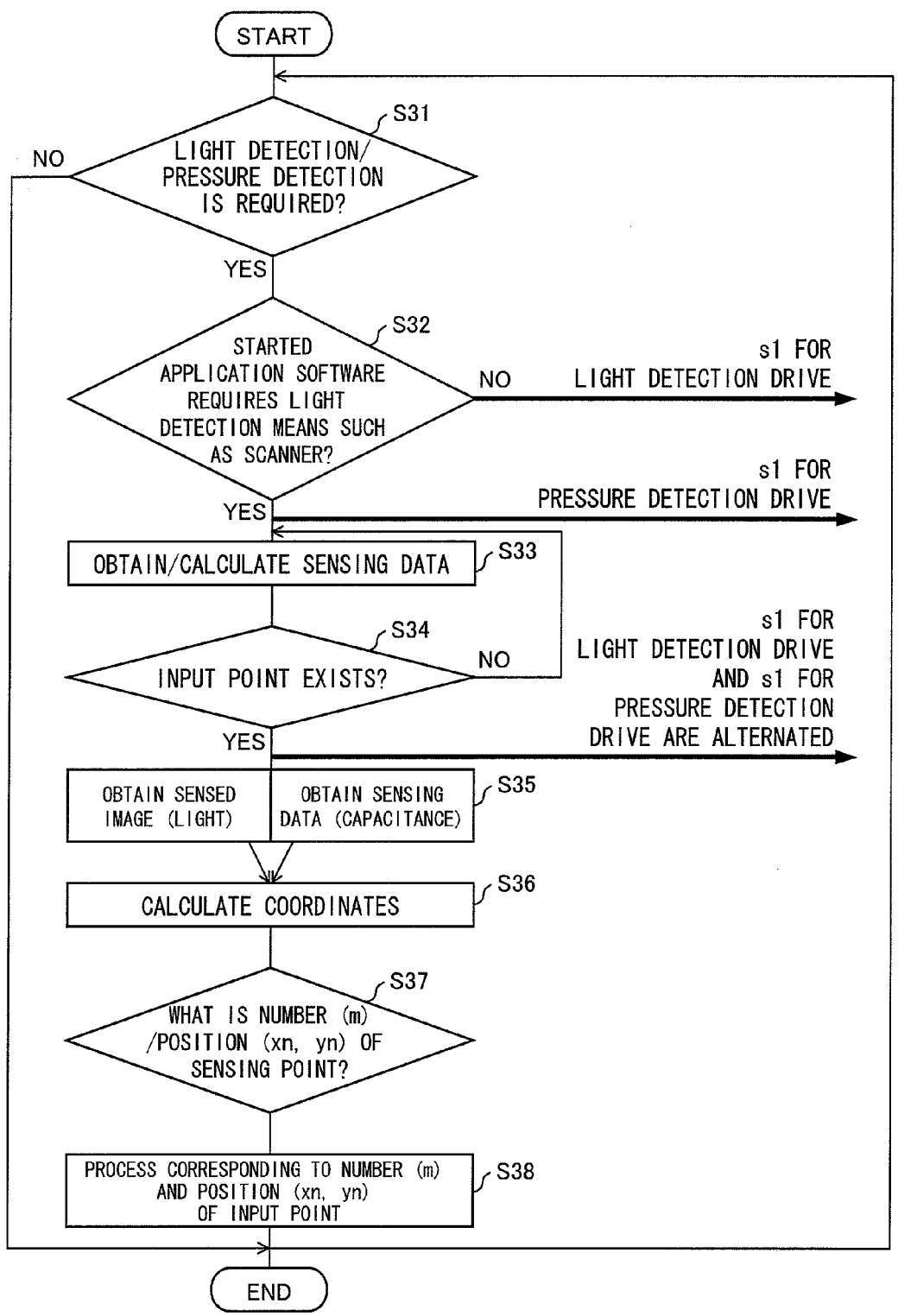
FIG. 9 is a flowchart showing a method for driving the display device shown in FIGS. 7 and 8.

FIG. 9 is a flowchart for carrying out the operations in FIGS. 7 and 8.

Initially, in step S31, under a certain phase while certain application software is used, it is determined whether one of the light detection and the pressure detection is necessary or not. When it is determined that one of the light detection and the pressure detection is necessary for a user input to be made when the application software is started or after the application software is started etc., the process goes to step S32. When it is determined that none of the light detection and pressure detection is necessary, the process is finished. In step S32, it is determined whether started application software requires light detection means such as a scanner or not. When it is determined that the started application software requires the light detection means, the mode control signal s1 for the light detection drive is outputted, steps S14 to S17 in FIG. 3 are carried out and then the process is finished. When it is determined that the started application software does not require the light detection means, the mode control signal 1 for the pressure detection is outputted and the process goes to step S33.

In step S33, in order to determine whether or not pressure is applied to a predetermined menu area on the basis of a result of the operation in the pressure detection mode as described for example in Second Example, the sensor read circuit 55 is caused to obtain sensing data corresponding to a change in capacitance, and the sensing image processor 57 makes calculation, based on the result of detection obtained from the sensor read circuit 55, to determine whether an input point exists or not on the screen. In the next step S34, it is determined whether the input point exists or not on the screen based on the result of the calculation. When it is determined that the input point exists, the operation of switching between the mode control signal s1 for the light detection drive and the mode control signal s1 for the pressure detection drive for every one vertical period is started and then the process goes to step S35. When it is determined that the input point does not exist, the process goes back to step S33.

In step S35, the sensor read circuit 55 is caused to obtain (i) an image optically sensed during the light detection drive and (ii) sensing output of the pressure in the pressure detection drive. Subsequently, in step S36, the sensing image processor 57 calculates coordinates of the input point of the pressure based on the results of light and pressure detections obtained from the sensor read circuit 55. In the next step S37, it is determined which process corresponds to the coordinates of the input point obtained in step S36. In the next step S38, the process thus determined is carried out. The process can be any process, and is for example a process of executing the scanner software described in Second Example.

When step S38 is finished, the process goes back to the first step, and when execution of the application software is finished, the whole process is finished.

As so far described, according to the present example, it is possible to carry out, with respect to an area where applied pressure is to be detected and with respect to the operations of (1) to (4) in FIG. 8, both the pressure detection operation by the pressure detection circuit and the light intensity detection operation by the optical sensor circuit within a period allocated to acquisition of detection data regarding pressure applied to the display region. The period comes after step S34 in FIG. 9, and the mode control signal s1 for the light detection drive and the mode control signal s1 for the pressure detection drive are alternated during the period.

The pressure detection circuit has a touch sensor function. Since both the pressure detection operation by the pressure detection circuit and the light intensity detection operation by the optical sensor circuit are carried out within the period allocated to acquisition of detection data regarding pressure applied to the display region, it is possible to detect not only a state where pressure is applied but also intensity of light irradiation, with respect to an object that applies pressure to a display surface. Accordingly, even if a change in the display surface in a panel thickness direction caused by pressure applied to the display surface in the vicinity of an edge of the display region is different from such a change caused in the vicinity of the center of the display region and therefore it is difficult to accurately detect a pressed area, it is possible to accurately detect the pressed area on the basis of the result of detection obtained by the optical sensor circuit.

As such, it is possible to realize a display device having a touch sensor function with very high accuracy in detection and including an optical sensor circuit in a display region.

Fourth Example

The present Example is based on switching between the light detection drive and the pressure detection drive in response to the mode control signal s1 described in First Example. An explanation will be made as to an operation of switching, according not only to position but also to time, between (i) causing the sensor circuit 62 to operate in the light detection mode and (ii) causing the sensor circuit 62 to operate in the pressure detection mode. With this switching operation, it is possible to improve accuracy in detection of applied pressure.

In the present Example, as shown in FIG. 11, an operation of switching between the light detection drive and the pressure detection drive for every row, i.e., for every one horizontal period (1H), is carried out with respect to pressure applied to an area on a screen. To this end, in the display region, for each vertical period, (i) a sensor circuit 62 that operates as an optical sensor circuit and a sensor circuit 62 that operates as a pressure detection circuit are arranged in respective different rows of a display matrix and (ii) a row of the optical sensor circuit and a row of the pressure detection circuit are alternately arranged in a column direction of the display matrix so as to correspond to respective rows of picture elements.

Note here that pressure detection with respect to an identical row, i.e., an identical sensor circuit 62 is carried out over a period corresponding to a plurality of vertical periods. Further, switching between the light detection drive and the pressure detection drive is carried out for every one vertical period (1V). In (1), the switching between the light detection drive and the pressure detection drive is carried out for every one horizontal period, and data of a shadow of a hand and finger which is about to press a touch sensing area is detected as shown in (1') before the finger presses the touch sensing area. When the touch sensing area is pressed by the finger as shown in (2), (i) data of an optically sensed image is obtained from the sensor circuit 62 of a row in which the light detection drive is performed and (ii) data indicative of whether or not pressure is applied is obtained from the sensor circuit 62 of a row in which the pressure detection drive is performed, as shown in (2'). In the next vertical period, the row in which the light detection drive is performed and the row in which the pressure detection drive is performed are exchanged as shown in (3). Accordingly, as shown in (3'), (i) data of an optically sensed image is obtained from the sensor circuit 62 of a row in which the light detection drive is performed and (ii) data indicative of whether or not pressure is applied is obtained from the sensor circuit 62 of a row in which the pressure detection drive is performed. The data of (2') and (3') are obtained over a vertical period(s) during which pressure is being applied by the finger. When the finger stops pressing the screen and is released from the screen as shown in (4), no pressure is detected as shown in (4').

If an area close to an edge of the display region is pressed when the above operation is carried out, it is difficult to obtain a change in a substrate which change is large enough to accurately determine a pressed area. This is because the change in the substrate caused by pressure tends to be inhibited by a junction of substrates combined with use of a sealing material. If this is the case, it may be impossible to accurately detect the pressed area, although it is possible to detect by the pressure detection drive a state where pressure is applied. Note however that, even in this case, it is possible to detect an area pressed by a finger by the light detection drive. That is, on the basis of the data obtained through both the light detection drive and the pressure detection drive, it is possible to (i) detect a state where pressure is definitely applied and (ii) accurately detect a pressed area.

In this case, according to an example of FIG. 11, the row in which the light detection drive is performed and the row in which the pressure detection drive is performed are exchanged for every one vertical period. This makes it possible to obtain both the data of the light detection drive and the data of the pressure detection drive in any area where the sensor circuit 62 is provided. Accordingly, it is possible to carry out pressure detection with very high accuracy. In a case where the row in which the light detection drive is performed and the row in which the pressure detection drive is performed are fixed unlike FIG. 11, each sensor circuit 62 is capable of obtaining only the data of either the light detection drive or the pressure detection drive. Note, however, that adjacent sensor circuits 62 are capable of obtaining results of sensing which are close to each other. Therefore, it is possible to carry out a simple mode control by carrying out the pressure detection based only on such results.

Figure 10:
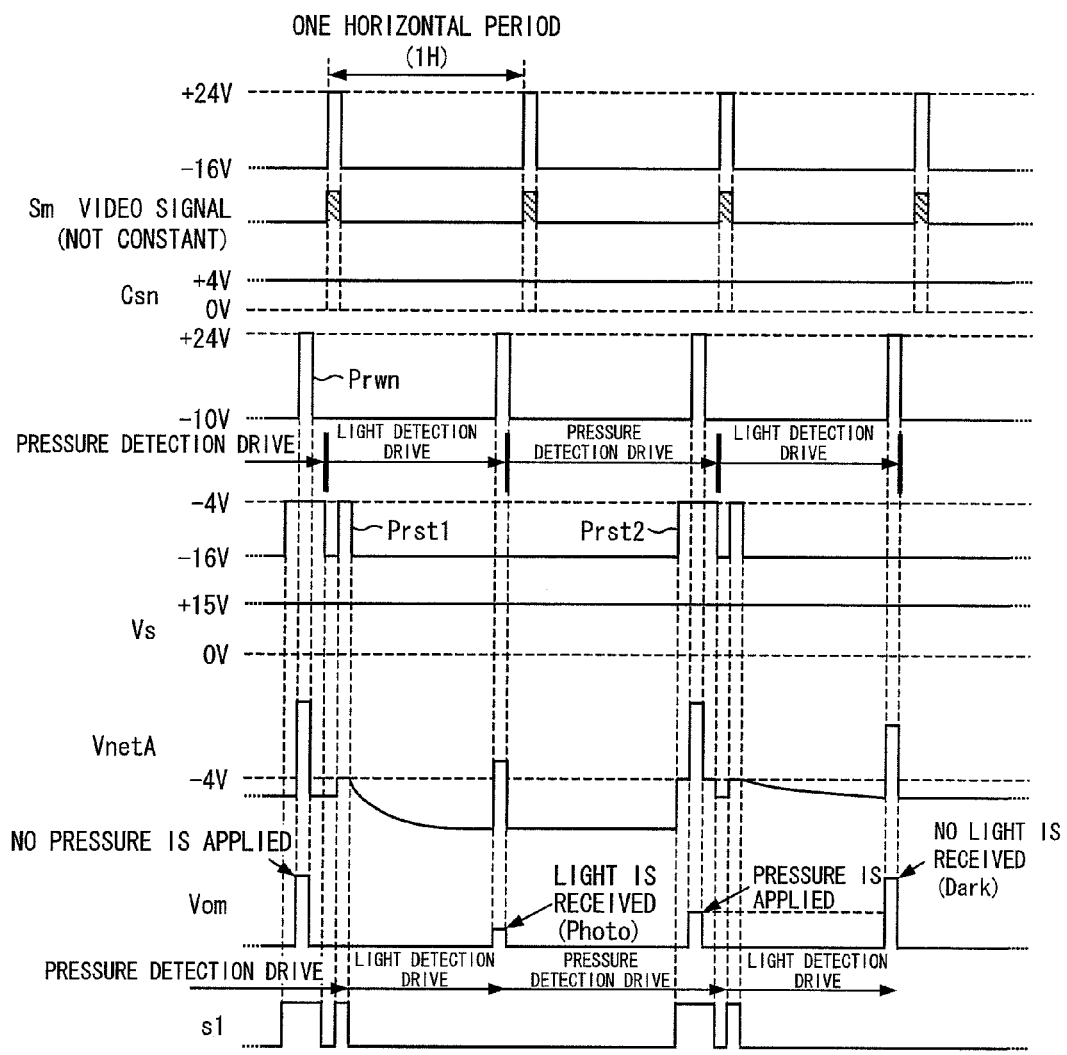
FIG. 10 is a signal waveform chart showing a method for driving a display device of a fourth Example in accordance with the embodiment of the present invention.

FIG. 10 is a signal waveform chart showing how the operation of switching between the light detection drive and the pressure detection drive is carried out with respect to the sensor circuit 62.

The sensor scanning signal line drive circuit 54 switches between the light detection drive and the pressure detection drive for every row, i.e., for every one horizontal period, for example. The mode control signal s1 is supplied as for example an enable signal which determines a period of a High voltage of the reset pulse Prst in accordance with a pulse width of the reset pulse Prst1 for the light detection drive or of the reset pulse Prst2 for the pressure detection drive.

Figure 12:
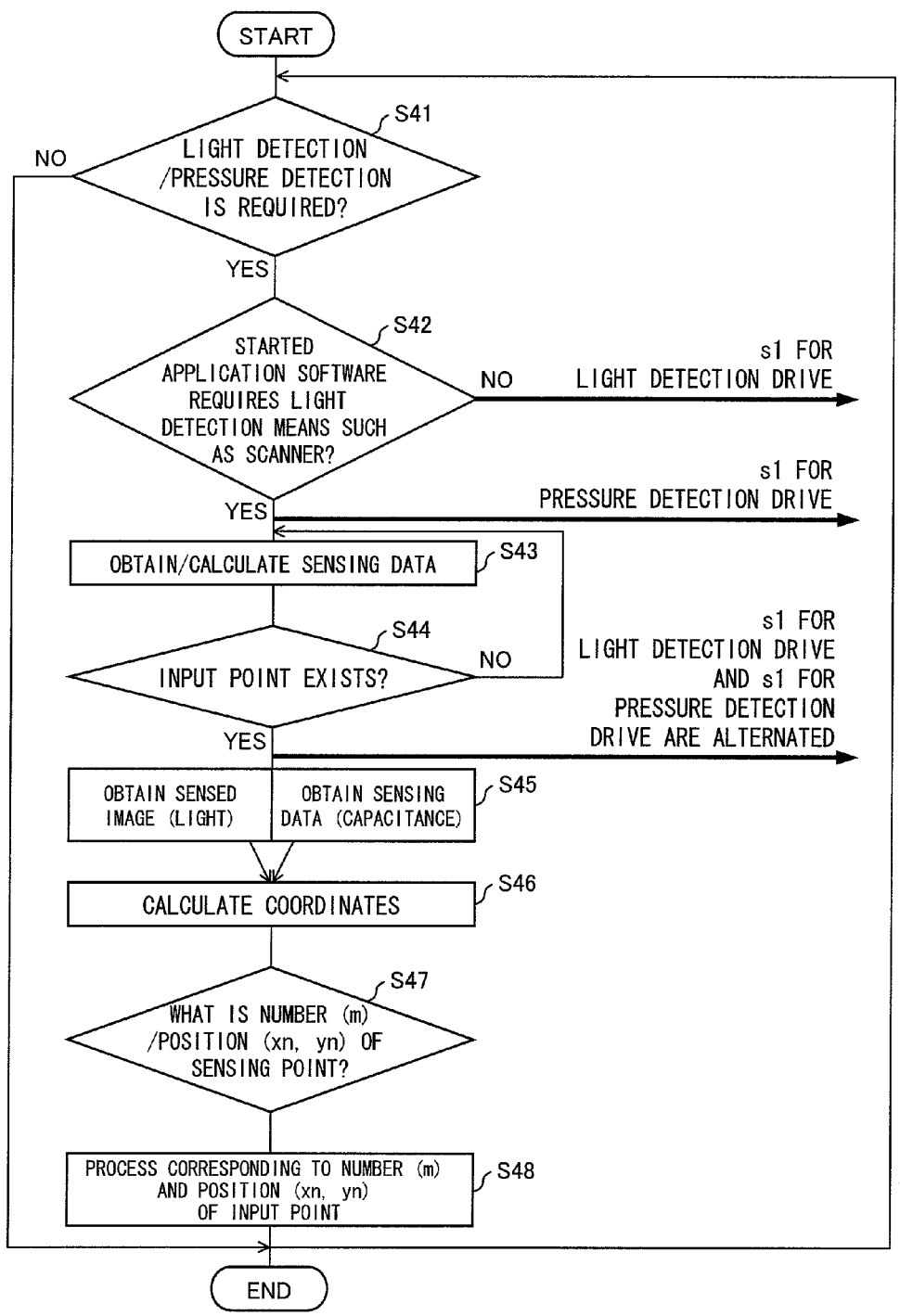
FIG. 12 is a flowchart showing a method for driving the display device shown in FIGS. 10 and 11.

FIG. 12 is a flowchart for carrying out the operations in FIGS. 10 and 11.

Initially, in step S41, under a certain phase while certain application software is used, it is determined whether one of the light detection and the pressure detection is necessary or not. When it is determined that one of the light detection and the pressure detection is necessary for a user input to be made when the application software is started or after the application software is started etc., the process goes to step S42. When it is determined that none of the light detection and the pressure detection is necessary, the process is finished. In step S42, it is determined whether started software requires light detection means such as a scanner or not. When it is determined that the started software requires the light detection means, the mode control signal s1 for the light detection drive is outputted, steps S14 to S17 in FIG. 3 are carried out and then the process is finished. When it is determined that the started application software does not require the light detection means, the mode control signal 1 for the pressure detection is outputted and the process goes to step S43.

In step S43, in order to determine whether or not pressure is applied to a predetermined menu area on the basis of a result of the operation in the pressure detection mode as described for example in Second Example, the sensor read circuit 55 is caused to obtain sensing data corresponding to a change in capacitance, and the sensing image processor 57 makes calculation, based on the result of detection obtained from the sensor read circuit 55, to determine whether an input point exists or not on the screen. In the next step S44, it is determined whether the input point exists or not on the screen based on the result of the calculation. When it is determined that the input point exists, the operation of switching between the mode control signal s1 for the light detection drive and the mode control signal s1 for the pressure detection drive for every one horizontal period is started and then the process goes to step S45. When it is determined that the input point does not exist, the process goes back to step S43.

In step S45, the sensor read circuit 55 is caused to obtain (i) an image optically sensed during the light detection drive and (ii) sensing output of the pressure in the pressure detection drive. Subsequently, in step S46, the sensing image processor 57 calculates coordinates of the input point of the pressure on the basis of the results of light and pressure detections obtained from the sensor read circuit 55. In the next step S47, it is determined to which process the coordinates of the input point obtained in step S46 correspond. In the next step S48, the process thus determined is carried out. The process can be any process, and is for example a process of executing the scanner software described in Second Example.

When step S48 is finished, the process goes back to the first step, and when execution of the application software is finished, the whole process is finished.

As so far described, according to the present example, it is possible to carry out, with respect to an area where applied pressure is to be detected and with respect to the operations of (1) to (4) in FIG. 11, both the pressure detection operation by the pressure detection circuit and the light intensity detection operation by the optical sensor circuit within a period allocated to acquisition of detection data regarding pressure applied to the display region. The period comes after step S44 in FIG. 12, and the mode control signal s1 for the light detection drive and the mode control signal s1 for the pressure detection drive are alternated during the period.

The pressure detection circuit has a touch sensor function. Since both the pressure detection operation by the pressure detection circuit and the light intensity detection operation by the optical sensor circuit are carried out within the period allocated to acquisition of the detection data regarding pressure applied to the display region, it is possible to detect not only a state where pressure is applied but also intensity of light irradiation, with respect to an object that applies pressure to a display surface. Accordingly, even if a change in the display surface in a panel thickness direction caused by pressure applied to the display surface in the vicinity of an edge of the display region is different from such a change caused in the vicinity of the center of the display region and therefore it is difficult to accurately detect a pressed area, it is possible to accurately detect the pressed area on the basis of the result of detection obtained by the optical sensor circuit.

As such, it is possible to realize a display device having a touch sensor function with very high accuracy in detection and including an optical sensor circuit in a display region.

The Examples have been explained as above.

According to Third and Fourth Examples, the light detection drive and the pressure detection drive with respect to the sensor circuit 62 are performed in a switched-over manner. Note, however, that the present example is not limited to the above. Alternatively, the present example may be arranged such that (i) an optical sensor circuit and a touch sensor circuit (pressure detection circuit) are provided independently of each other and (ii) the light detection drive (i.e., light detection mode) with respect to the optical sensor circuit and the pressure detection drive (i.e., pressure detection mode) with respect to the touch sensor circuit are performed in a switched-over manner. In this case, the touch sensor circuit can be any circuit such as a capacitance change detection circuit or a resistive film type circuit.

In a case where the optical sensor circuit and the touch sensor circuit are provided independently of each other, (i) a signal for driving the optical sensor circuit is supplied to the optical sensor circuit when the mode control signal s1 instructing to perform the light detection drive is generated and (ii) a signal for driving the touch sensor circuit is supplied to the touch sensor circuit when the mode control signal s1 instructing to perform the pressure detection drive is generated.

Switching between the pressure detection operation by the pressure detection circuit and the light intensity detection operation by the optical sensor circuit is carried out (i) for every one vertical period in Third Example and (ii) for every one horizontal period in Fourth Example. Note, however, that the examples are not limited to the above. Since where the sensor circuit 62 is provided and how the optical sensor circuit and the pressure detection circuit are arranged may be determined as needed, the switching may be carried out for every certain period according to the arrangement. For example, the switching can be carried out for every integer multiple of a vertical period or for every integer multiple of a horizontal period. For example, the light detection drive (or the pressure detection drive) may be switched over to the pressure detection drive (or the light detection drive) after being continuously performed for a plurality of rows. It is not necessary that (i) the sensor circuits 62 or (ii) the optical sensor circuits and the pressure detection circuits be provided to respective rows of picture elements. Therefore, (i) the sensor circuits 62 or (ii) the optical sensor circuits and the pressure detection circuits may be provided only to some of the rows.

The following explains detailed pattern positioning of a display region in accordance with the present embodiment.

Figure 19:
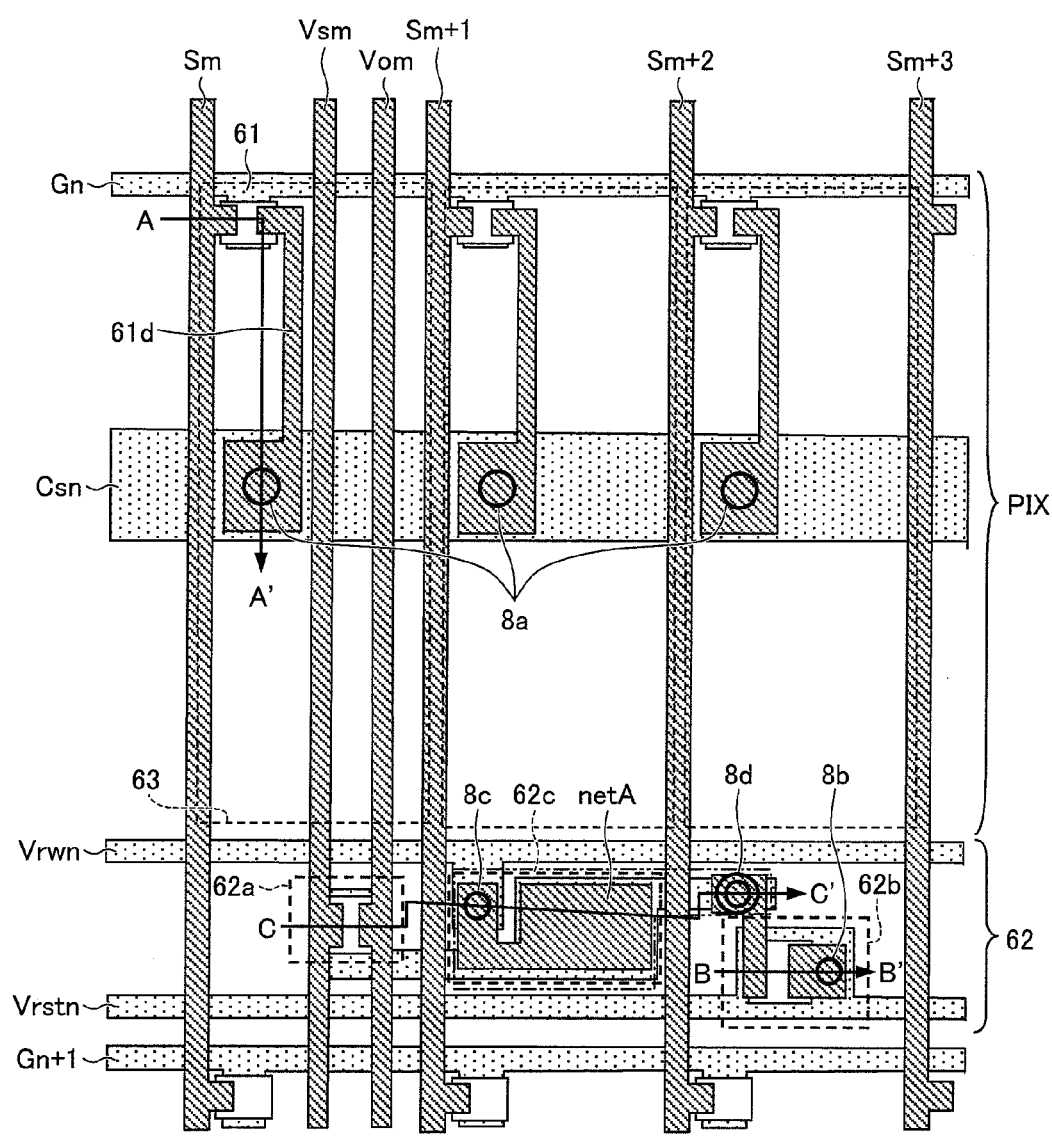
FIG. 19 is a plan view showing a first pattern positioning example of a display region in accordance with the embodiment of the present invention.

FIG. 19 is a plan view of a part of a display region which is a first pattern positioning example in accordance with the present embodiment. This is a pattern view corresponding to the circuit diagram of (a) of FIG. 13. Further, FIG. 20 is a cross sectional view of a picture element PIX taken along a line A-A' of FIG. 19, FIG. 21 is a cross sectional view of the photodiode 62b taken along a line B-B' of FIG. 19, and FIG. 22 is a cross sectional view of the TFT 62a and the capacitors 62c and 62d taken along a line C-C' of FIG. 19.

It should be noted that FIG. 19 shows a case where the sensor output line Vom and the power source line Vsm are provided independently of the source line S.

Figure 20:
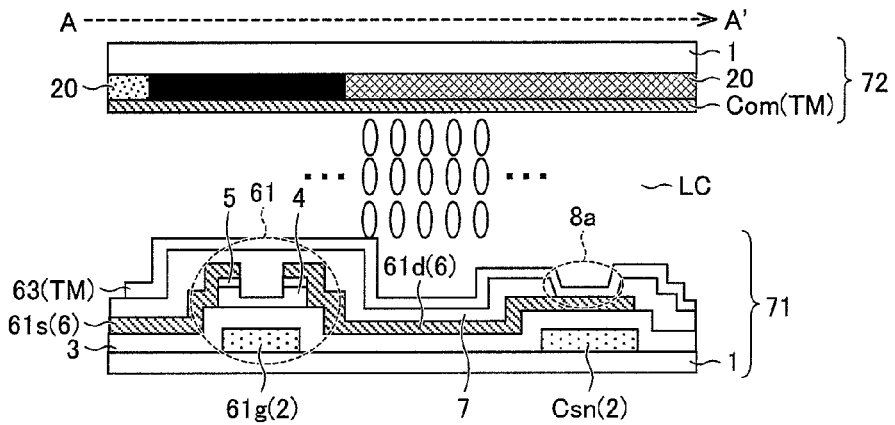
FIG. 20 is a cross sectional view taken along a line A-A' of FIG. 19.
Figure 21:
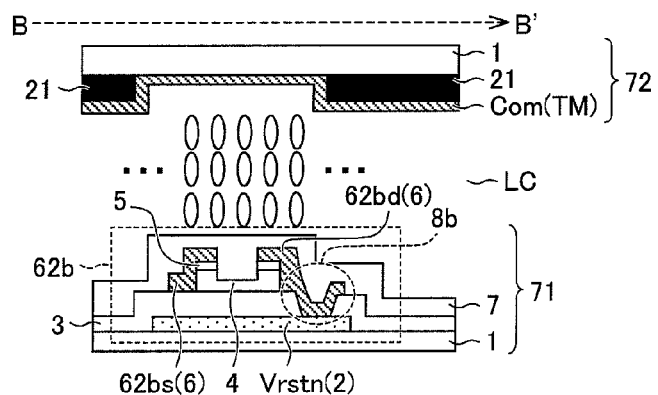
FIG. 21 is a cross sectional view taken along a line B-B' of FIG. 19.
Figure 22:
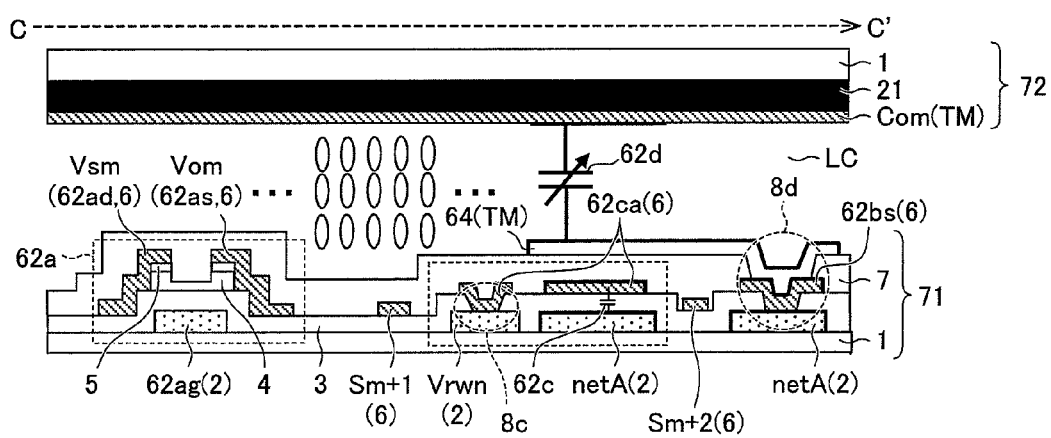
FIG. 22 is a cross sectional view taken along a line C-C' of FIG. 19.

In the first pattern positioning example, as shown in FIGS. 20-22, the node netA is positioned to be the lowest layer in conductive layers on an insulating substrate 1 of a TFT substrate 71.

The TFT substrate 71 includes the insulating substrate 1, a gate metal 2, a gate insulating film 3, an amorphous silicon semiconductor layer 4, an n+ amorphous silicon contact layer 5, a source metal 6, a passivation film 7, and a transparent electrode TM which are layered in this order. An alignment film may be provided on a picture element electrode 63. Further, a phototransistor 62b is formed by connecting a gate and a drain of a TFT.

A gate electrode 61g of a TFT 61, a retention capacitor line Csn, a reset line Vrstn, a read control line Vrwn, a gate electrode 62ag of the TFT 62a, and a node netA are made of the gate metal 2. Source lines S (Sm, Sm+1, ... ), a source electrode 61s of the TFT 61, a drain electrode 61d of the TFT 61, a source electrode 62bs of a photodiode 62b, a drain electrode 62bd of the photodiode 62b, a sensor output line Vom doubling as a source electrode 62as of the TFT 62a, a power source line Vsm doubling as a drain electrode 62ad of the TFT 62a, and an electrode 62ca positioned oppositely to the node netA of the capacitor 62c are made of the source metal 6. The picture element electrode 63 and an electrode 64 of the capacitor 62d which electrode is closer to the node netA (electrode at one end of a second capacitor) are made of a transparent electrode TM.

Further, the picture element electrode 63 and the drain electrode 61d of the TFT 61 are connected with each other via a contact hole 8a in the passivation film 7. The drain electrode 62bd of the photodiode 62b and the reset line Vrstn are connected with each other via a contact hole 8b in the gate insulating film 3. The electrode 62ca of the capacitor 62c and the read control line Vrwn are connected with each other via a contact hole 8c in the gate insulating film 3. A connection between the electrode 64 of the capacitor 62d and the source electrode 62bs of the photodiode 62b, and a connection between the source electrode 62bs and the node netA are each made via a contact hole portion 8d consisting of a contact hole in the passivation film 7 and a contact hole in the gate insulating film 3.

The counter substrate 72 includes an insulating substrate 1, a color filter 20, a black matrix 21, and a counter electrode Com which are layered in this order. An alignment film may be provided on the counter electrode Com. The counter electrode Com is made of a transparent electrode TM. Further, an area of the sensor circuit 62 is totally covered by the black matrix 21 in order to block external light other than backlight used in the light detection operation.

As described above, the electrode 64 is made of a layer of the TFT substrate 71 which layer is closer to the common electrode (electrode at the other end of second capacitor) Com than the passivation film 7 is.

In the first pattern positioning example, since the distance between electrodes of the capacitor 62d is small, capacitance Ccvr of the capacitor 62d can be large. This enables improving sensitivity in detecting an applied pressure and improving resistivity against a noise caused by incident light. That is, this enables improving accuracy in detecting an applied pressure. Further, since the distance between the electrodes of the capacitor 62d is small, the capacitance Ccvr can be large even if the area of the electrode of the capacitor 62d is small. This enables improving sensitivity in detecting an applied pressure even if the area occupied by the sensor circuit 62 is small, thereby making the sensor circuit 62 highly integrated and improving an open area ratio of the display region. Further, since the node netA is made of the gate metal 2, a connection between the node netA and the gate electrode 62ag of the TFT 62a can be made easily.

Figure 23:
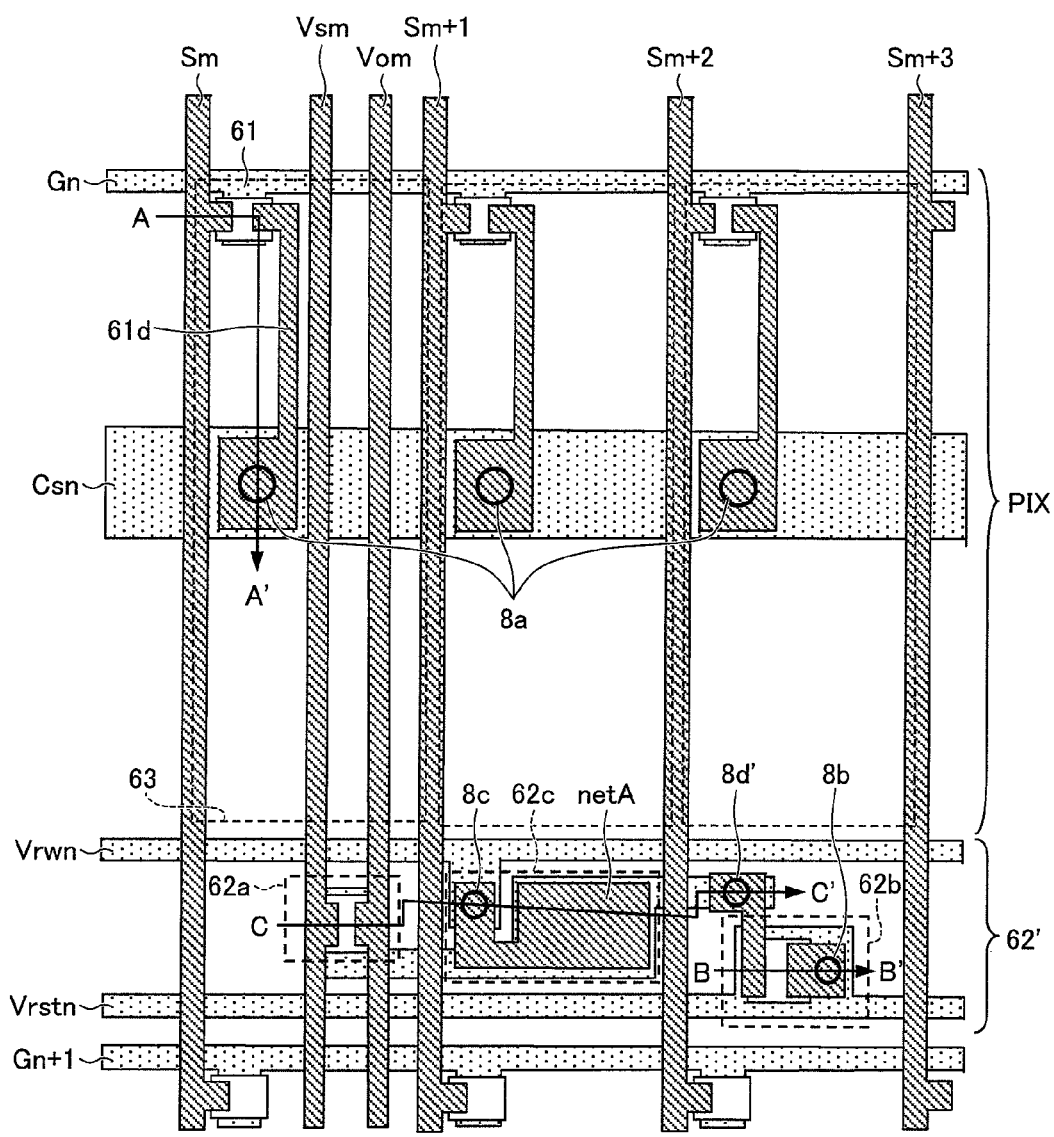
FIG. 23 is a plan view showing a second pattern positioning example of a display region in accordance with the embodiment of the present invention.
Figure 24:
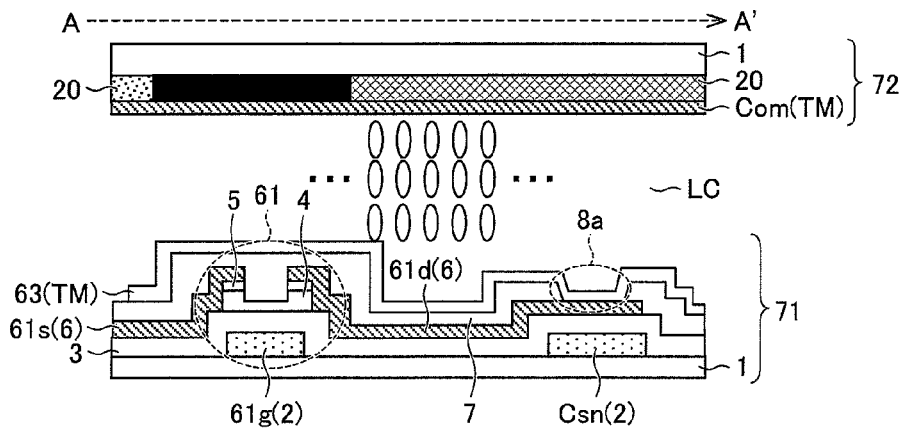
FIG. 24 is a cross sectional view taken along a line A-A' of FIG. 23.
Figure 25:
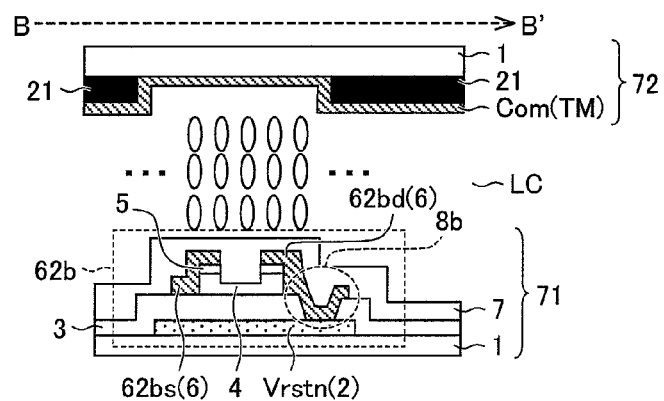
FIG. 25 is a cross sectional view taken along a line B-B' of FIG. 23.
Figure 26:
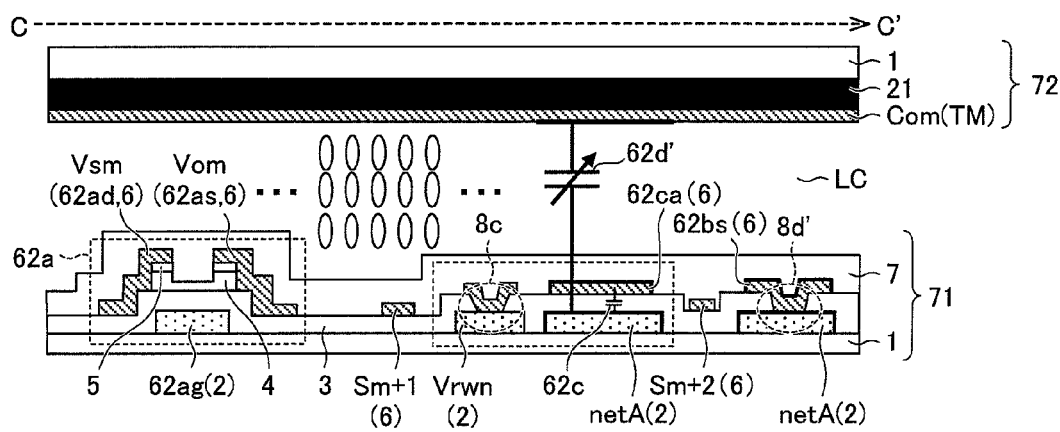
FIG. 26 is a cross sectional view taken along a line C-C' of FIG. 23.

FIGS. 23-26 show a second pattern positioning example in accordance with the present embodiment. FIG. 23 is a plan view. FIG. 24 is a cross sectional view taken along a line A-A' of FIG. 23. FIG. 25 is a cross sectional view taken along a line B-B' of FIG. 23. FIG. 26 is a cross sectional view taken along a line C-C' of FIG. 23. Members similar to those in FIGS. 19-22 are given the same reference signs. A sensor circuit (first circuit) 62' is formed instead of the sensor circuit 62. A node netA is positioned to be the lowest layer in conductive layers on an insulating substrate 1 of a TFT substrate 71. It should be noted that unlike the first pattern positioning example, the electrode 64 for forming the capacitor 62d is not provided. Instead, a capacitor (second capacitor) 62d' is formed between a common electrode Com and a layer of a node netA (electrode at one end of second capacitor). A connection between a source electrode 62bs of a photodiode 62b and the node netA is made via a contact hole 8d' in a gate insulating film 3.

As described above, the node netA serving as an electrode at one end of the second capacitor is made of a layer of the TFT substrate 71 which layer is positioned to be farther from the common electrode Com than the passivation layer 7 is.

Further, an area of the sensor circuit 62' is totally covered by a black matrix 21 in order to block external light other than backlight used in the light detection operation.

In the second pattern positioning example, the capacitor 62d' having small capacitance is formed between the common electrode Com and the node netA which is positioned away from the common electrode Com. Accordingly, if the area of the electrode of the capacitor 62d' is the same as that of the capacitor 62d in the first pattern positioning example, capacitance Ccvr of the capacitor 62d' is smaller than that of the capacitor 62d in the first pattern example. However, by designing the sensor circuit 62 to occupy a larger area, the area of the electrode can be larger, so that the capacitance Ccvr of the capacitor 62d' can be large enough not to deteriorate sensitivity in detecting an applied pressure. In this case, it is unnecessary to form an electrode of the capacitor 62d on the passivation film 7, and accordingly pattern processing of the sensor circuit 62 can be made easily. Further, since the node netA is made of the gate metal 2, a connection between the node netA and a gate electrode 62ag of a TFT 62a can be made easily.

FIG. 27 is a plan view of a part of a display region which is a third pattern positioning example in accordance with the present embodiment. This is a pattern view corresponding to the circuit diagram of (a) of FIG. 13. Further, FIG. 28 is a cross sectional view of a picture element PIX taken along a line A-A' of FIG. 27, FIG. 29 is a cross sectional view of the photodiode 62b taken along a line B-B' of FIG. 27, and FIG. 30 is a cross sectional view of a TFT 62a and capacitors 62c and 62d taken along a line C-C' of FIG. 27.

It should be noted that FIG. 27 shows a case where the sensor output line Vom and the power source line Vsm are provided independently of the source line S.

Figure 28:
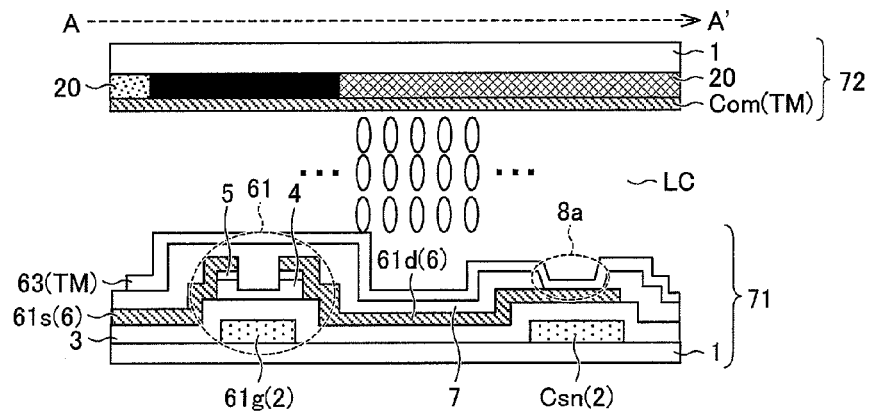
FIG. 28 is a cross sectional view taken along a line A-A' of FIG. 27.
Figure 29:
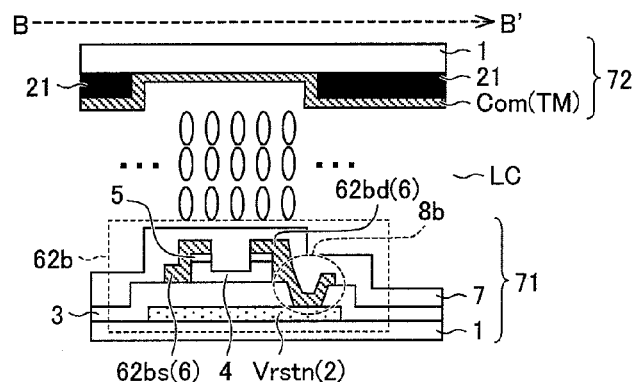
FIG. 29 is a cross sectional view taken along a line B-B' of FIG. 27.
Figure 30:
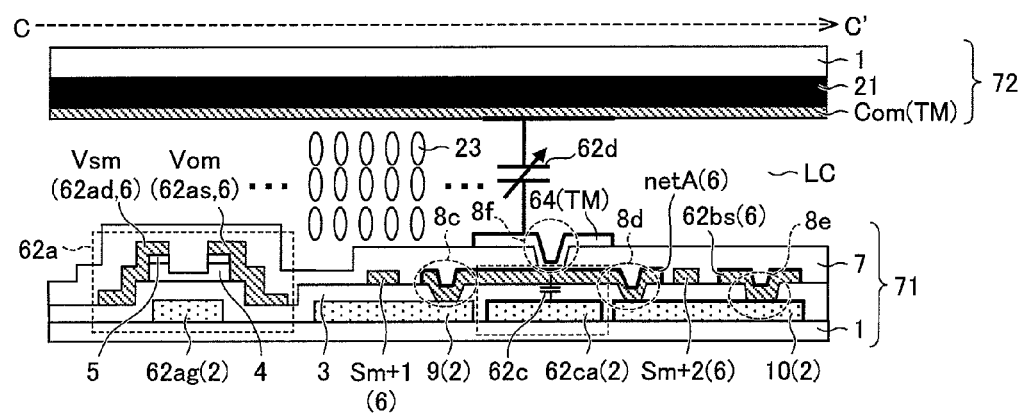
FIG. 30 is a cross sectional view taken along a line C-C' of FIG. 27.

In the third pattern positioning example, as shown in FIGS. 28-30, the node netA is one of conductive layers on an insulating substrate 1 of the TFT substrate 71 which one is positioned above the bottom layer of the conductive layers and is positioned between a gate insulating film 3 and a passivation film 7.

The TFT substrate 71 includes an insulating substrate 1, a gate metal 2, a gate insulating film 3, an amorphous silicon semiconductor layer 4, an n+ amorphous silicon contact layer 5, a source metal 6, a passivation film 7, and a transparent electrode TM which are layered in this order. An alignment film may be provided on a picture element electrode 63. Further, a phototransistor 62b is formed by connecting a gate and a drain of a TFT.

A gate electrode 61g of a TFT 61, a retention capacitor line Csn, a reset line Vrstn, a gate electrode 62ag of a TFT 62a, a read control line Vrwn, an electrode 62ca of a capacitor 62c which electrode is closer to the read control line Vrwn, and connection pad layers 9 and 10 are made of the gate metal 2. The connection pad 9 is wiring via which the node netA and the gate electrode 62ag of the TFT 62a are connected with each other. The connection pad layer 10 is wiring via which a source electrode 62bs of a photodiode 62b and the node netA are connected with each other. Source lines S (Sm, Sm+1, . . . ), a source electrode 61s of the TFT 61, a drain electrode 61d of the TFT 61, a source electrode 62bs of a photodiode 62b, a drain electrode 62bd of the photodiode 62b, a sensor output line Vom doubling as a source electrode 62as of the TFT 62a, a power source line Vsm doubling as a drain electrode 62ad of the TFT 62a, and the node netA are made of the source metal 6. The picture element electrode 63 and an electrode 64 of the capacitor 62d which electrode is closer to the node netA (electrode at one end of a second capacitor) are made of the transparent electrode TM.

Further, the picture element electrode 63 and the drain electrode 61d of the TFT 61 are connected with each other via a contact hole 8a in the passivation film 7. The drain electrode 62bd of the photodiode 62b and the reset line Vrstn are connected with each other via a contact hole 8b in the gate insulating film 3. The node netA and the connection pad 9 are connected with each other via a contact hole 8c in the gate insulating film 3. The node netA and the connection pad 10 are connected with each other via a contact hole 8d in the gate insulating film 3. The source electrode 62bs of the photodiode 62b and the connection pad 10 are connected with each other via a contact hole 8e in the gate insulating film 3. The electrode 64 of the capacitor 62d which electrode is closer to the node netA and the node net A are connected with each other via a contact hole 8f in the passivation film 7.

The counter substrate 72 includes an insulating substrate 1, a color filter 20, a black matrix 21, and a counter electrode Com which are layered in this order. An alignment film may be provided on the counter electrode Com. The counter electrode Com is made of a transparent electrode TM. Further, an area of the sensor circuit 62 is totally covered by the black matrix 21 in order to block external light other than backlight used in the light detection operation.

As described above, the electrode 64 is made of a layer of the TFT substrate 71 which layer is closer to the common electrode (electrode at the other end of second capacitor) Com than the passivation film 7 is.

In the third pattern positioning example, since the distance between electrodes of the capacitor 62d is small, capacitance Ccvr of the capacitor 62d can be large. This enables improving sensitivity in detecting an applied pressure and improving resistivity against a noise caused by incident light. That is, this enables improving accuracy in detecting an applied pressure. Further, since the distance between the electrodes of the capacitor 62d is small, the capacitance Ccvr can be large even if the area of the electrode of the capacitor 62d is small. This enables improving sensitivity in detecting an applied pressure even if the area occupied by the sensor circuit 62 is small, thereby making the sensor circuit 62 highly integrated and improving an open area ratio of the display region. Further, since the node netA is made of the source metal 6, a connection between the node netA and the electrode 64 of the capacitor 62d and a connection between the node netA and the source electrode 62bs of the photodiode 62b can be made easily.

Figure 31:
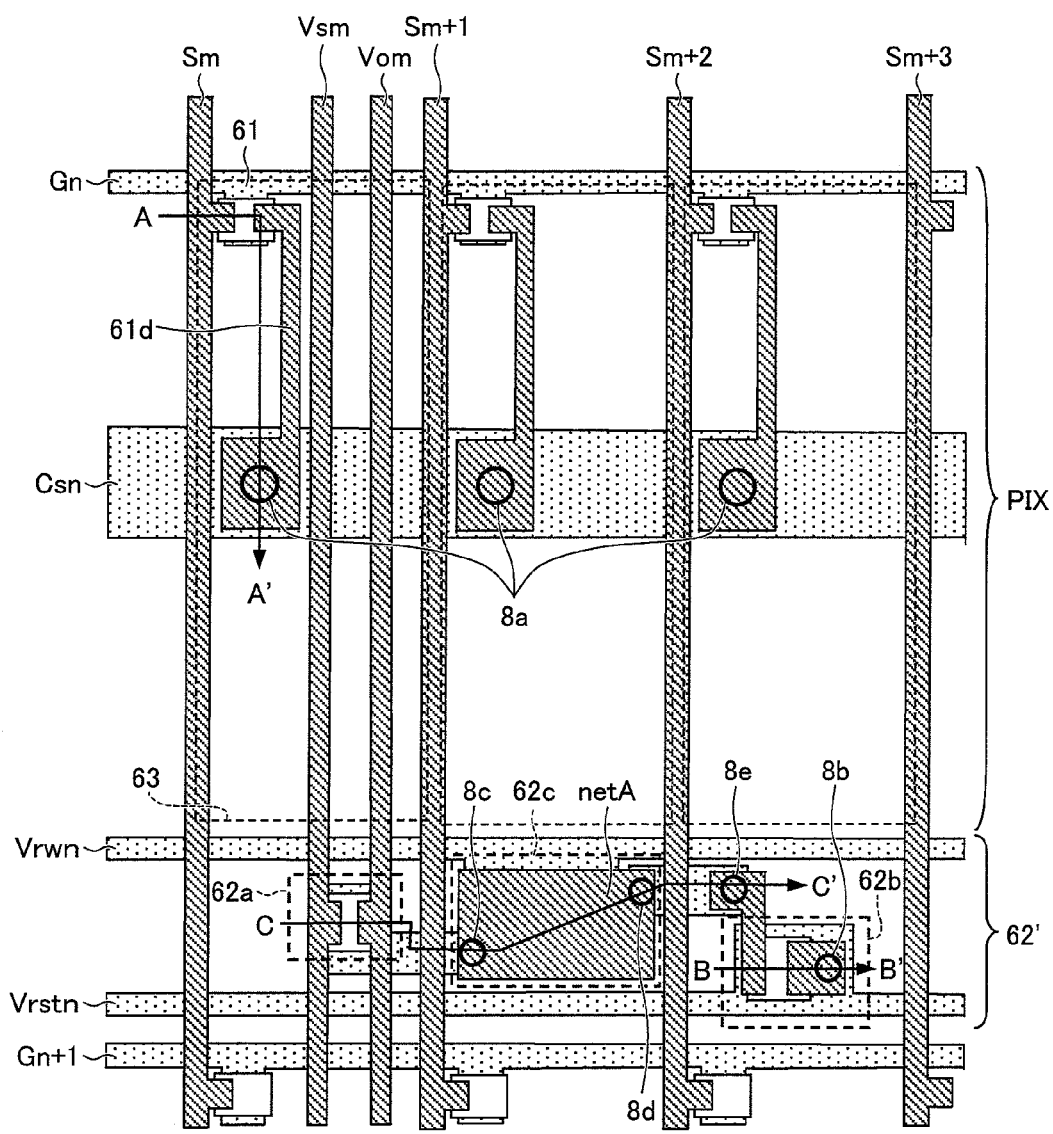
FIG. 31 is a plan view showing a fourth pattern positioning example of a display region in accordance with the embodiment of the present invention.
Figure 32:
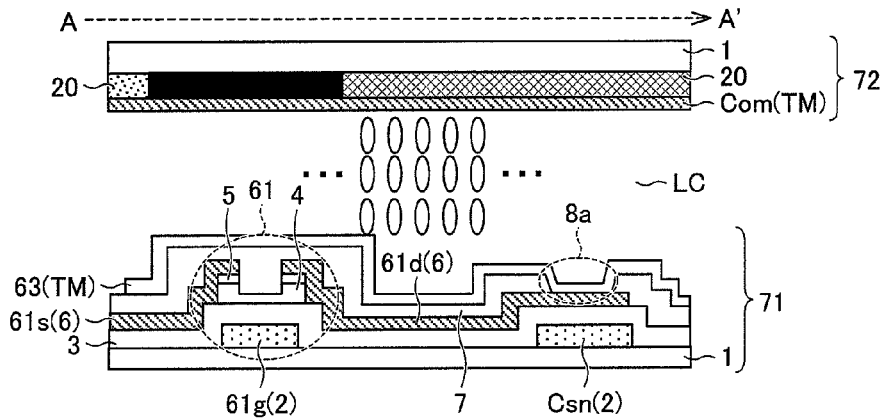
FIG. 32 is a cross sectional view taken along a line A-A' of FIG. 31.
Figure 33:
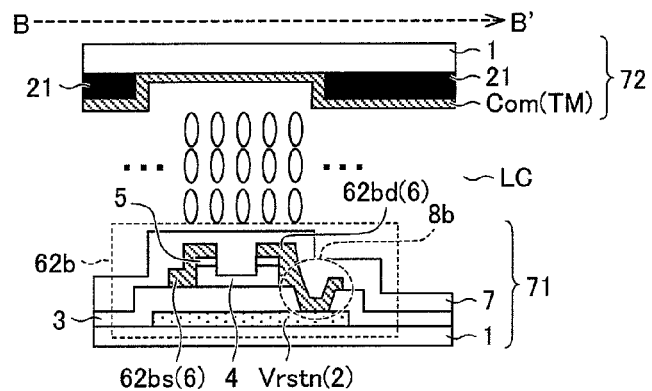
FIG. 33 is a cross sectional view taken along a line B-B' of FIG. 31.
Figure 34:
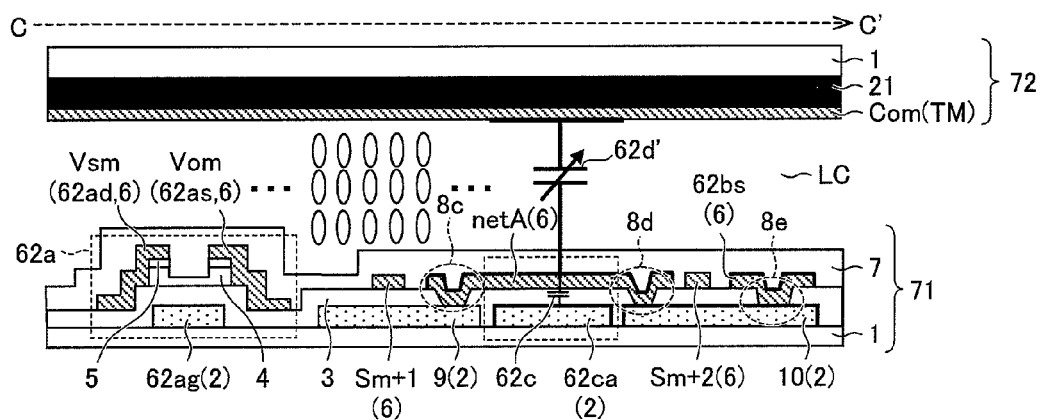
FIG. 34 is a cross sectional view taken along a line C-C' of FIG. 31.
Figure 35:
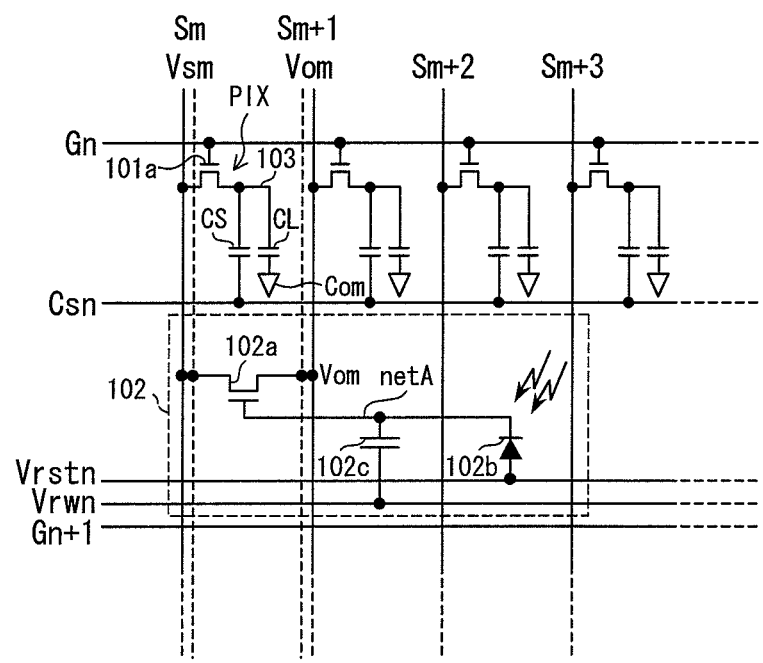
FIG. 35 is a circuit diagram showing a structure of a display region in a conventional art.

FIGS. 31-34 show a comparative example of the fourth pattern positioning example. FIG. 31 is a plan view, FIG. 32 is a cross sectional view taken along a line A-A' of FIG. 31, FIG. 33 is a cross sectional view taken along a line B-B' of FIG. 31, and FIG. 34 is a cross sectional view taken along a line C-C' of FIG. 31. Members similar to those in FIGS. 27-30 are given the same reference signs. A sensor circuit (first circuit) 62' is provided instead of the sensor circuit 62. The node netA is one of conductive layers on an insulating substrate 1 of the TFT substrate 71 which one is positioned above the bottom layer of the conductive layers and is positioned between a gate insulating film 3 and a passivation film 7. However, unlike the third pattern positioning example, the electrode 64 for forming the capacitor 62d is not provided, and instead a capacitor (second capacitor) 62d' is formed between the common electrode Com and the node (electrode at one end of second capacitor) netA.

As described above, the node netA serving as an electrode at one end of the second capacitor is made of a layer of the TFT substrate 71 which layer is positioned to be farther from the common electrode Com than the passivation layer 7 is.

Further, an area of the sensor circuit 62' is totally covered by a black matrix 21 in order to block external light other than backlight used in the light detection operation.

In the fourth pattern positioning example, the capacitor 62d' having small capacitance is formed between the common electrode Com and the node netA which is positioned away from the common electrode Com. Accordingly, if the area of the electrode of the capacitor 62d' is the same as that of the capacitor 62d in the third pattern positioning example, capacitance Ccvr of the capacitor 62d' is smaller than that of the third capacitor 62d in the third pattern positioning example. However, by designing the sensor circuit 62 to occupy a larger area, the area of the electrode can be larger, so that the capacitance Ccvr of the capacitor 62d' can be large enough not to deteriorate sensitivity in detecting an applied pressure. In this case, it is unnecessary to form an electrode of the capacitor 62d on the passivation film 7, and accordingly pattern processing of the sensor circuit 62' can be made easily. Further, since the node netA is made of the source metal 6, a connection between the node netA and a source electrode 62bs of a photodiode 62b can be made easily.

The present Embodiment has been explained as above. Examples of the photodiode used in the present invention are not limited to the transistors mentioned in the first to fourth pattern positioning examples, such as field-effect transistors and bipolar transistors (including phototransistors) which are diode-connected. Examples of the photodiode used in the present invention also include photodiodes having normal diode laminate structures, such as pin-photodiodes. That is, the photodiode used in the present invention may be any device whose current-voltage properties have diode properties and whose internal conductivity changes due to irradiation with light.

In order to attain the above object, a display device of the present invention includes: an optical sensor circuit provided in a display region, the optical sensor circuit including a light-receiving element and detecting intensity of light incident to the light-receiving element; and a pressure detection circuit which detects pressure applied to a display surface of a display panel on a basis of a change of the display surface in a panel thickness direction which change is caused by the pressure, with respect to a region in which the pressure is to be detected, both of the detection of the pressure by the pressure detection circuit and the detection of the intensity of the light by the optical sensor circuit being carried out within a period allocated to acquisition of detection data concerning the pressure in the display region.

According to the invention, the pressure detection circuit has a touch sensor function, and within a period allocated to acquisition of detection data regarding the pressure in the display region, both of the detection of the pressure by the pressure detection circuit and the detection of the intensity of the light are carried out. This makes it possible to detect not only application of pressure to the display surface, but also the intensity of light, with respect to an object that applies pressure to a display surface. Accordingly, even if a change in the display surface in a panel thickness direction caused by pressure applied to the display surface in the vicinity of an edge of the display region is different from such a change caused in the vicinity of the center of the display region and therefore it is difficult to accurately detect a pressed position, it is possible to accurately detect the pressed position on the basis of the result of detection obtained by the optical sensor circuit.

This produces an effect that it is possible to provide display device that has a touch sensor function with high detection accuracy and that includes, in a display region, an optical sensor circuit.

In order to attain the above object, the display device of the present invention is arranged such that with respect to the region in which the pressure is to be detected, the detection of the pressure by the pressure detection circuit and the detection of the intensity of the light by the optical sensor circuit are alternated during the period.

According to the invention, the detection of the pressure by the pressure detection circuit and the detection of the intensity of light by the optical sensor circuit are alternately carried out. This produces an effect that the detection by the pressure detection circuit and the detection by the optical sensor circuit can be carried out in a manner suitable for a display matrix. Further, the result of the detection of the pressure and the result of the detection of the intensity of light can be separately acquired. This produces an effect that analysis and processing of the detection results become easy.

In order to attain the above object, the display device of the present invention is arranged such that with respect to the region in which the pressure is to be detected, the detection of the pressure by the pressure detection circuit and the detection of the intensity of the light by the optical sensor circuit are alternated for every one vertical period during the period.

According to the invention, the detection of the pressure by the pressure detection circuit and the detection of the intensity of the light by the optical sensor circuit are alternated for every one vertical period. This produces an effect that a switching operation can be carried out in a manner suitable for the display matrix.

In order to attain the above object, the display device of the present invention is arranged such that with respect to the region in which the pressure is to be detected, the detection of the pressure by the pressure detection circuit and the detection of the intensity of the light by the optical sensor circuit are alternated during the period by line-sequentially driving the optical sensor circuit and the pressure detection circuit that are disposed in different rows of a display matrix.

According to the invention, the optical sensor circuit and the pressure detection circuit that are disposed in different rows of the display matrix are line-sequentially driven. This produces an effect that the switching operation can be carried out in accordance with a scanning mode of the display matrix.

In order to attain the above object, the display device of the present invention is arranged such that in the region in which the pressure is to be detected, the optical sensor circuit and the pressure detection circuit that are disposed in the different rows of the display matrix are alternately disposed in a column direction of the display matrix.

According to the invention, the row of the optical sensor circuit and the row of the pressure detection circuit are alternately disposed in the column direction of the display matrix. This allows the switching between the operation of the row of the optical sensor circuit and the operation of the row of the pressure detection circuit to be carried out for every one row. Consequently, the optical sensor circuit and the pressure detection circuit that are disposed in adjacent rows can obtain, in adjacent areas, detection results concerning an object which applies a pressure. This produces an effect that a result of detection of intensity of light and a result of detection of pressure can be easily compared with each other. Further, it is possible to produce an effect that both of the result of detection of intensity of light and the result of detection of pressure can be acquired in an entire region in which pressure is to be detected.

In order to attain the above object, the display device of the present invention further includes a first circuit which serves as both of the optical sensor circuit and the pressure detection circuit.

According to the invention, the first circuit serves as both of the optical sensor circuit and the pressure detection circuit. This eliminates the need to separately provide the optical sensor circuit and the pressure detection circuit. This produces an effect that a configuration of the display device can be simplified and an effect that an open area ratio of a picture element can be improved.

In order to attain the above object, the display device of the present invention further includes a first circuit which serves as both of the optical sensor circuit and the pressure detection circuit, the period being a period corresponding to a plurality of vertical periods, and during the period, the first circuit switching, for every one vertical period, between the detection of the intensity of the light by the optical sensor circuit and the detection of the pressure by the pressure detection circuit.

According to the invention, the first circuit serves as both of the optical sensor circuit and the pressure detection circuit. This eliminates the need to separately provide the optical sensor circuit and the pressure detection circuit. This produces an effect that a configuration of the display device can be simplified and an effect that an open area ratio of a picture element can be improved. Further, the first circuit switches, for every one vertical period, between an operation as the optical sensor circuit, i.e., the detection of the intensity of the light and an operation as the pressure detection circuit, i.e., the detection of the pressure. This produces an effect that both of the detection result of the intensity of the light and the detection result of the pressure can be acquired for an identical area.

In order to attain the above object, the display device of the present invention is arranged such that a first control signal for causing the first circuit to operate as the optical sensor circuit and a second control signal for causing the first circuit to operate as the pressure detection circuit are selectively supplied to a driving circuit of the first circuit.

According to the invention, the first control signal instructs the driving circuit of the first circuit so that the first circuit operates as the optical sensor circuit, and the second control signal instructs the driving circuit of the first circuit so that the first circuit operates as the pressure detection circuit. This produces an effect that a mechanism for controlling switching between the detection of intensity of light and the detection of pressure can be simplified.

In order to attain the above object, the display device of the present invention is arranged such that with respect to a screen to be displayed next to a currently displayed screen, which of the first control signal and the second control signal is to be supplied to the driving circuit can be determined based on data of the screen to be displayed next.

According to the invention, it is possible to produce an effect that which of the first control signal and the second control signal is supplied to the driving circuit can be easily determined on the basis of data of the screen displayed next.

In order to attain the above object, the display device of the present invention is arranged such that with respect to a screen to be displayed next to a currently displayed screen, which of the first control signal and the second control signal is supplied to the driving circuit can be determined based on whether or not a pressure is applied to a predetermined area of the display surface for which the first circuit operates as a pressure detection circuit on the currently displayed screen.

According to the invention, which of the first control signal and the second control signal is supplied to the driving circuit can be easily determined on the basis of whether or not a pressure is applied to a predetermined area of the display surface for which the first circuit operates as the pressure detection circuit. This produces an effect that a user can easily select a detection operation on his own will.

In order to attain the above object, the display device of the present invention is arranged such that with respect to a screen to be displayed next to a currently displayed screen, the first control signal is supplied to the driving circuit in a case where the pressure is applied to the predetermined area on the currently displayed screen.

According to the invention, default display is carried out on a screen in a touch panel mode in which the pressure detection circuit operates, and the operation of the optical sensor circuit can be easily started by user's will.

In order to attain the above object, the display device of the present invention is arranged such that the first circuit includes a photodiode serving as the light-receiving element, a first capacitor, a second capacitor, and an output amplifier, a cathode of the photodiode, one end of the first capacitor, one end of the second capacitor, and an input of the output amplifier are connected with one another via a first node, an electrode at the other end of the second capacitor is provided on a substrate having the display surface of the display panel, an electrode at the one end of the second capacitor is positioned to be away from the display surface in a thickness direction of the display panel to face the electrode at the other end of the second capacitor, in a case where the first circuit operates as the optical sensor circuit, (i) a first pulse is applied to an anode of the photodiode so as to make the photodiode conductive in a forward direction, (ii) the application of the first pulse is finished so that a reverse biased voltage is applied to the photodiode, (iii) at a predetermined time after finishing the application of the first pulse, a second pulse is applied to the other end of the first capacitor to change the voltage at the first node so as to enable the output amplifier to output, and (iv) while the second pulse is applied, the output from the output amplifier is obtained, in a case where the first circuit operates as the pressure detection circuit, (i) a first direct voltage is applied to the anode of the photodiode, (ii) application of the first direct voltage to the anode during a first period makes the photodiode conductive in a forward direction, (iii) while the first direct voltage is applied to the anode during a second period following the first period, a fourth pulse is applied to the other end of the first capacitor to change a voltage at the first node so that a reverse biased voltage is applied to the photodiode, and (iv) while the fourth pulse is applied, an output from the output amplifier is obtained.

According to the invention, in a case where the first circuit operates as the optical sensor circuit, a first pulse is applied to an anode of the photodiode so as to make the photodiode conductive in a forward direction, and the voltage at the first node is determined by the voltage of the first pulse and capacitances of the first and second capacitors. When a period in which the first pulse is applied ends, a reverse biased voltage is applied to the photodiode. After a predetermined period, the voltage at the first node corresponds to leakage in accordance with intensity of light incident to the photodiode. In this state, a second pulse is applied to the other end of the first capacitor, and the voltage at the first node is changed to be capable of being outputted from the output amplifier. Then, while the second pulse is applied, the output of the output amplifier is obtained. Thus, intensity of light incident to the photodiode can be detected.

Meanwhile, in a case where the first circuit operates as the pressure detection circuit, capacitance of the second capacitor changes since application of a pressure to the display surface causes a change of the electrode at the other end of the second capacitor and the distance between the electrode at the one end and the electrode at the other end of the second capacitor changes. Consequently, the second capacitor serves as a detection element of a touch sensor, and the first circuit serves as a touch sensor. The first direct voltage is applied to the anode of the photodiode, and application of the first direct voltage during the first period makes the photodiode conductive in a forward direction, so that the voltage at the first node is substantially equal to the first direct voltage.

During the second period, while the first direct voltage is applied to the anode, the fourth pulse is applied to the other end of the first capacitor to change the voltage at the first node so that a reverse biased voltage is applied to the photodiode. At that time, the voltage at the first node is determined depending on a ratio in capacitance of the first capacitor to the second capacitor. Capacitance of the first capacitor is not changed by application of a pressure, but capacitance of the second capacitor is changed. Accordingly, the output voltage changes in accordance with capacitance of the second capacitor. Since the output of the output amplifier is obtained while the fourth pulse is applied, it is possible to detect whether a pressure is applied to the display surface or not.

The detection of the applied pressure is made while the fourth pulse is applied. Accordingly, even if light is incident to the photodiode, there is little possibility that leakage in the photodiode in a reverse biased state changes the voltage at the first node. Therefore, it is possible to prevent the incident light from being a noise which changes the voltage at the first node in the pressure detection operation.

Therefore, it is possible to realize a display device including a low-priced, downsized, and highly reliable touch panel function without deteriorating a display function.

In order to attain the above object, the display device of the present invention is arranged such that the first circuit includes a photodiode serving as the light-receiving element, a first capacitor, a second capacitor, and an output amplifier, a cathode of the photodiode, one end of the first capacitor, one end of the second capacitor, and an input of the output amplifier are connected with one another via a first node, an electrode at the other end of the second capacitor is provided on a substrate having the display surface of the display panel, an electrode at the one end of the second capacitor is positioned to be away from the display surface in a thickness direction of the display panel to face the electrode at the other end of the second capacitor, in a case where the first circuit operates as the optical sensor circuit, (i) a first pulse is applied to an anode of the photodiode so as to make the photodiode conductive in a forward direction, (ii) the application of the first pulse is finished so that a reverse biased voltage is applied to the photodiode, (iii) at a predetermined time after finishing the application of the first pulse, a second pulse is applied to the other end of the first capacitor to change the voltage at the first node so as to enable the output amplifier to output, and (iv) while the second pulse is applied, the output from the output amplifier is obtained, in a case where the first circuit operates as the pressure detection circuit, (i) a third pulse is applied to the anode of the photodiode so as to make the photodiode conductive in a forward direction, (ii) while the third pulse is applied, a fourth pulse is applied to the other end of the first capacitor to change a voltage at the first node so that a reverse biased voltage is applied to the photodiode and so as to enable the output amplifier to output, and (iii) while the fourth pulse is applied, an output from the output amplifier is obtained.

According to the invention, in a case where the first circuit operates as the optical sensor circuit, a first pulse is applied to an anode of the photodiode so as to make the photodiode conductive in a forward direction, and the voltage at the first node is determined by the voltage of the first pulse and capacitances of the first and second capacitors. When a period in which the first pulse is applied ends, a reverse biased voltage is applied to the photodiode. After a predetermined period, the voltage at the first node corresponds to leakage in accordance with intensity of light incident to the photodiode. In this state, a second pulse is applied to the other end of the first capacitor, and the voltage at the first node is changed to be capable of being outputted from the output amplifier. Then, while the second pulse is applied, the output of the output amplifier is obtained. Thus, intensity of light incident to the photodiode can be detected.

Meanwhile, in a case where the first circuit operates as the pressure detection circuit, capacitance of the second capacitor changes since application of a pressure to the display surface causes a change of the electrode at the other end of the second capacitor and the distance between the electrode at the one end and the electrode at the other end of the second capacitor changes. Consequently, the second capacitor serves as a detection element of a touch sensor, and the first circuit serves as a touch sensor. The third pulse is applied to the anode of the photodiode so as to make the photodiode conductive in a forward direction, and the voltage at the first node is determined depending on the voltage of the third pulse, and capacitances of the first and second capacitors, and therefore is a voltage determined in accordance with the second capacitor. In this state, a fourth pulse is applied to the other end of the first capacitor, and the voltage at the first node is changed so that a reverse biased voltage is applied to the photodiode and so as to be capable of being outputted from the output amplifier. The voltage at the first node at that time is also determined in accordance with the second capacitor. Since the output of the output amplifier is obtained while the fourth pulse is applied, it is possible to detect whether a pressure is applied to the display surface or not.

The detection of the applied pressure is made while the fourth pulse is applied. Accordingly, even if light is incident to the photodiode, there is little possibility that leakage in the photodiode in a reverse biased state changes the voltage at the first node. Therefore, it is possible to prevent the incident light from being a noise which changes the voltage at the first node in the pressure detection operation.

Therefore, it is possible to realize a display device including a low-priced, downsized, and highly reliable touch panel function without deteriorating a display function.

Further, a reverse biased voltage applied to the photodiode while the fourth pulse is applied is relatively small, so that a difference in internal conductivity due to a difference in intensity of light incident to the photodiode is small. Accordingly, a noise due to incident light in the pressure detection operation is reduced to the minimum, achieving a very high accuracy in detection of an applied pressure.

In order to attain the above object, the display device of the present invention is arranged such that the first circuit includes a photodiode serving as the light-receiving element, a first capacitor, a second capacitor, and an output amplifier, a cathode of the photodiode, one end of the first capacitor, one end of the second capacitor, and an input of the output amplifier are connected with one another via a first node, an electrode at the other end of the second capacitor is provided on a substrate having the display surface of the display panel, an electrode at the one end of the second capacitor is positioned to be away from the display surface in a thickness direction of the display panel to face the electrode at the other end of the second capacitor, in a case where the first circuit operates as the optical sensor circuit, (i) a first pulse is applied to an anode of the photodiode so as to make the photodiode conductive in a forward direction, (ii) the application of the first pulse is finished so that a reverse biased voltage is applied to the photodiode, (iii) at a predetermined time after finishing the application of the first pulse, a second pulse is applied to the other end of the first capacitor to change the voltage at the first node so as to enable the output amplifier to output, and (iv) while the second pulse is applied, the output from the output amplifier is obtained, in a case where the first circuit operates as the pressure detection circuit, (i) a third pulse is applied to the anode of the photodiode so as to make the photodiode conductive in a forward direction, (ii) during a period following a period in which the third pulse is applied, a fourth pulse is applied to the other end of the first capacitor to change a voltage at the first node so that a reverse biased voltage is applied to the photodiode and so as to enable the output amplifier to output, and (iii) while the fourth pulse is applied, an output from the output amplifier is obtained.

According to the invention, in a case where the first circuit operates as the optical sensor circuit, the first pulse is applied to the anode of the photodiode so as to make the photodiode conductive in a forward direction, and the voltage at the first node is determined by the voltage of the first pulse and capacitances of the first and second capacitors. When a period in which the first pulse is applied ends, a reverse biased voltage is applied to the photodiode. After a predetermined period, the voltage at the first node corresponds to leakage in accordance with intensity of light incident to the photodiode. In this state, a second pulse is applied to the other end of the first capacitor, and the voltage at the first node is changed to be capable of being outputted from the output amplifier. Then, while the second pulse is applied, the output of the output amplifier is obtained. Thus, intensity of light incident to the photodiode can be detected.

Meanwhile, in a case where the first circuit operates as the pressure detection circuit, capacitance of the second capacitor changes since application of a pressure to the display surface causes a change of the electrode at the one end of the second capacitor and the distance between the electrode at the one end and the electrode at the other end of the second capacitor changes. Consequently, the second capacitor serves as a detection element of a touch sensor, and the first circuit serves as a touch sensor. The third pulse is applied to the anode of the photodiode so as to make the photodiode conductive in a forward direction, and the voltage at the first node is determined depending on the voltage of the third pulse, and capacitances of the first and second capacitors, and therefore is a voltage determined in accordance with the second capacitor. In this state, a fourth pulse is applied to the other end of the first capacitor, and the voltage at the first node is changed so that a reverse biased voltage is applied to the photodiode and so as to be capable of being outputted from the output amplifier. The voltage at the first node at that time is also determined in accordance with the second capacitor. Since the output of the output amplifier is obtained while the fourth pulse is applied, it is possible to detect whether a pressure is applied to the display surface or not.

The detection of the applied pressure is made while the fourth pulse is applied. Accordingly, even if light is incident to the photodiode, there is little possibility that leakage in the photodiode in a reverse biased state changes the voltage at the first node. Therefore, it is possible to prevent the incident light from being a noise which changes the voltage at the first node in the pressure detection operation.

Therefore, it is possible to realize a display device including a low-priced, downsized, and highly reliable touch panel function without deteriorating a display function.

Further, it is possible to easily set timing of applying the fourth pulse by using end timing of the first pulse.

Further, since it is possible to shorten the period of the third pulse, a noise caused by light incident to the photodiode conductive in a forward direction during the period of the third pulse can be reduced to the minimum. Therefore, it is possible to further improve accuracy in detecting an applied pressure.

In order to attain the above object, the display device of the present invention is arranged such that the display device is a liquid crystal display device, and the electrode at the other end of the second capacitor is a common electrode.

According to the invention, the common electrode can be used for a touch sensor. Accordingly, it is unnecessary to separately provide an electrode at the other end of the second capacitor.

In order to attain the above object, the display device of the present invention is arranged such that the electrode at one end of the second capacitor is made of a layer in a matrix substrate which layer is positioned to be closer to the electrode at the other end of the second capacitor than a passivation film in the matrix substrate is.

According to the invention, the distance between the electrode at the one end of the second capacitor and the electrode at the other end is small, so that capacitance of the second capacitor can be large. Accordingly, it is possible to improve sensitivity in detecting an applied pressure and improve resistivity to a noise due to incident light, that is, it is possible to improve accuracy in detecting an applied pressure.

Further, since the distance between the electrodes of the second capacitor is small, capacitance of the second capacitor can be large even if the area of the electrode of the second capacitor is small. Accordingly, even if the area occupied by the first circuit is small, accuracy in detecting an applied pressure can be improved, so that it is possible to make the first circuit highly integrated and improve an open area ratio of the display region.

In order to attain the above object, the display device of the present invention is arranged such that the electrode at the one end of the second capacitor is a transparent electrode positioned at a same layer as a layer where picture element electrodes are positioned, and a liquid crystal layer is positioned between the electrode at the one end of the second capacitor and the electrode at the one end of the second capacitor.

According to the invention, the layer of the transparent electrode constituting the picture element electrode of the liquid crystal display device is used as the electrode at the one end of the second capacitor, and the liquid crystal layer is used as a main dielectric material of a capacitor. Accordingly, the second capacitor can be easily formed.

In order to attain the above object, the display device of the present invention is arranged such that the electrode at one end of the second capacitor is made of a layer in a matrix substrate which layer is positioned to be farther from the electrode at the other end of the second capacitor than a passivation film in the matrix substrate is.

According to the invention, the electrode at the one end of the second capacitor can be easily made of an existing layer of the matrix substrate.

In order to attain the above object, the display device of the present invention is arranged such that the electrode at the one end of the second capacitor is made of a gate metal.

According to the invention, the electrode at the one end of the second capacitor can be easily made of an existing gate metal of the matrix substrate.

In order to attain the above object, the display device of the present invention is arranged such that the electrode at the one end of the second capacitor is made of a source metal.

According to the invention, the electrode at the one end of the second capacitor can be easily made of an existing source metal of the matrix substrate.

In order to attain the above object, the display device of the present invention is arranged such that the first node is made of a gate metal.

According to the invention, the first node is made of a gate metal. Accordingly, it is easy to connect the first node with a gate electrode of a field effect transistor when used in the output amplifier.

In order to attain the above object, the display device of the present invention is arranged such that the first node is made of a source metal.

According to the invention, the first node is made of a source metal. Accordingly, it is easy to connect the first node with the electrode at the one end of the second capacitor or a source electrode of a photodiode constituted by field effect transistors which are diode-connected.

In order to attain the above object, a method of the present invention for driving a display device including (i) an optical sensor circuit provided in a display region, the optical sensor circuit including a light-receiving element and detecting intensity of light incident to the light-receiving element, and (ii) a pressure detection circuit which detects pressure applied to a display surface of a display panel on a basis of a change of the display surface in a panel thickness direction which change is caused by the pressure, is arranged such that with respect to a region in which the pressure is to be detected, both of the detection of the pressure by the pressure detection circuit and the detection of the intensity of the light by the optical sensor circuit being carried out within a period allocated to acquisition of detection data concerning the pressure in the display region.

According to the invention, the pressure detection circuit has a touch sensor function, and within a period allocated to acquisition of detection data regarding the pressure in the display region, both of the detection of the pressure by the pressure detection circuit and the detection of the intensity of the light are carried out. This makes it possible to detect not only application of pressure to the display surface, but also the intensity of light, with respect to an object that applies pressure to a display surface. Accordingly, even if a change in the display surface in a panel thickness direction caused by pressure applied to the display surface in the vicinity of an edge of the display region is different from such a change caused in the vicinity of the center of the display region and therefore it is difficult to accurately detect a pressed area, it is possible to accurately detect the pressed area on the basis of the result of detection obtained by the optical sensor circuit.

This produces an effect that it is possible to provide a method for displaying a display device that has a touch sensor function with high detection accuracy and that includes, in a display region, an optical sensor circuit.

In order to attain the above object, the method of the present invention is arranged such that with respect to the region in which the pressure is to be detected, the detection of the pressure by the pressure detection circuit and the detection of the intensity of the light by the optical sensor circuit are alternated during the period.

According to the invention, the detection of the pressure by the pressure detection circuit and the detection of the intensity of light by the optical sensor circuit are alternately carried out. This produces an effect that the detection by the pressure detection circuit and the detection by the optical sensor circuit can be carried out in a manner suitable for a display matrix. Further, the result of the detection of the pressure and the result of the detection of the intensity of light can be separately acquired. This produces an effect that analysis and processing of the detection results become easy.

In order to attain the above object, the method of the present invention is arranged such that with respect to the region in which the pressure is to be detected, the detection of the pressure by the pressure detection circuit and the detection of the intensity of the light by the optical sensor circuit are alternated for every one vertical period during the period.

According to the invention, the detection of the pressure by the pressure detection circuit and the detection of the intensity of the light by the optical sensor circuit are alternated for every one vertical period. This produces an effect that a switching operation can be carried out in a manner suitable for the display matrix.

In order to attain the above object, the method of the present invention is arranged such that with respect to the region in which the pressure is to be detected, the detection of the pressure by the pressure detection circuit and the detection of the intensity of the light by the optical sensor circuit are alternated during the period by line-sequentially driving the optical sensor circuit and the pressure detection circuit that are disposed in different rows of a display matrix.

According to the invention, the optical sensor circuit and the pressure detection circuit that are disposed in different rows of the display matrix are line-sequentially driven. This produces an effect that the switching operation can be carried out in accordance with a scanning mode of the display matrix.

In order to attain the above object, the method of the present invention is arranged such that in the region in which the pressure is to be detected, the optical sensor circuit and the pressure detection circuit that are disposed in the different rows of the display matrix are alternately disposed in a column direction of the display matrix.

According to the invention, the row of the optical sensor circuit and the row of the pressure detection circuit are alternately disposed in the column direction of the display matrix. This allows the switching between the operation of the row of the optical sensor circuit and the operation of the row of the pressure detection circuit to be carried out for every one row. Consequently, the optical sensor circuit and the pressure detection circuit that are disposed in adjacent rows can obtain, in adjacent areas, detection results concerning an object which applies a pressure. This produces an effect that a result of detection of intensity of light and a result of detection of pressure can be easily compared with each other. Further, it is possible to produce an effect that both of the result of detection of intensity of light and the result of detection of pressure can be acquired in an entire region in which pressure is to be detected.

In order to attain the above object, a method of the present invention is arranged such that the display device further includes a first circuit which serves as both of the optical sensor circuit and the pressure detection circuit.

According to the invention, the first circuit serves as both of the optical sensor circuit and the pressure detection circuit. This eliminates the need to separately provide the optical sensor circuit and the pressure detection circuit. This produces an effect that a configuration of the display device can be simplified and an effect that an open area ratio of a picture element can be improved.

In order to attain the above object, the method of the present invention is arranged such that the display device further includes a first circuit which serves as both of the optical sensor circuit and the pressure detection circuit, the period is a period corresponding to a plurality of vertical periods, and during the period, the first circuit switching, for every one vertical period, between the detection of the intensity of the light by the optical sensor circuit and the detection of the pressure by the pressure detection circuit.

According to the invention, the first circuit serves as both of the optical sensor circuit and the pressure detection circuit. This eliminates the need to separately provide the optical sensor circuit and the pressure detection circuit. This produces an effect that a configuration of the display device can be simplified and an effect that an open area ratio of a picture element can be improved. Further, the first circuit switches between an operation as the optical sensor circuit, i.e., the detection of the intensity of the light and an operation as the pressure detection circuit, i.e., the detection of the pressure for every one vertical period. This produces an effect that both of the detection result of the intensity of the light and the detection result of the pressure can be acquired for an identical area.

In order to attain the above object, the method of the present invention is arranged such that a first control signal for causing the first circuit to operate as the optical sensor circuit and a second control signal for causing the first circuit to operate as the pressure detection circuit are selectively supplied to a driving circuit of the first circuit.

According to the invention, the first control signal instructs the driving circuit of the first circuit so that the first circuit operates as the optical sensor circuit, and the second control signal instructs the driving circuit of the first circuit so that the first circuit operates as the pressure detection circuit. This produces an effect that a mechanism for controlling switching between the detection of intensity of light and the detection of pressure can be simplified.

In order to attain the above object, the method of the present invention is arranged such that with respect to a screen to be displayed next to a currently displayed screen, which of the first control signal and the second control signal is to be supplied to the driving circuit can be determined based on data of the screen to be displayed next.

According to the invention, it is possible to produce an effect that which of the first control signal and the second control signal is supplied to the driving circuit can be easily determined on the basis of data of the screen displayed next.

In order to attain the above object, the method of the present invention is arranged such that with respect to a screen to be displayed next to a currently displayed screen, which of the first control signal and the second control signal is supplied to the driving circuit can be determined based on whether or not a pressure is applied to a predetermined area of the display surface for which the first circuit operates as a pressure detection circuit on the currently displayed screen.

According to the invention, which of the first control signal and the second control signal is supplied to the driving circuit can be easily determined on the basis of whether or not a pressure is applied to a predetermined area of the display surface for which the first circuit operates as the pressure detection circuit. This produces an effect that a user can easily select a detection operation on his own will.

In order to attain the above object, the method of the present invention is arranged such that with respect to a screen to be displayed next to a currently displayed screen, the first control signal is supplied to the driving circuit in a case where the pressure is applied to the predetermined area on the currently displayed screen.

According to the invention, default display is carried out on a screen in a touch panel mode in which the pressure detection circuit operates, and the operation of the optical sensor circuit can be easily started by user's will.

In order to attain the above object, the method of the present invention is arranged such that the first circuit includes a photodiode serving as the light-receiving element, a first capacitor, a second capacitor, and an output amplifier, a cathode of the photodiode, one end of the first capacitor, one end of the second capacitor, and an input of the output amplifier are connected with one another via a first node, an electrode at the other end of the second capacitor is provided on a substrate having the display surface of the display panel, an electrode at the one end of the second capacitor is positioned to be away from the display surface in a thickness direction of the display panel to face the electrode at the other end of the second capacitor, in a case where the first circuit operates as the optical sensor circuit, (i) a first pulse is applied to an anode of the photodiode so as to make the photodiode conductive in a forward direction, (ii) the application of the first pulse is finished so that a reverse biased voltage is applied to the photodiode, (iii) at a predetermined time after finishing the application of the first pulse, a second pulse is applied to the other end of the first capacitor to change the voltage at the first node so as to enable the output amplifier to output, and (iv) while the second pulse is applied, the output from the output amplifier is obtained, in a case where the first circuit operates as the pressure detection circuit, (i) a third pulse is applied to the anode of the photodiode so as to make the photodiode conductive in a forward direction, (ii) while the third pulse is applied, a fourth pulse is applied to the other end of the first capacitor to change a voltage at the first node so that a reverse biased voltage is applied to the photodiode and so as to enable the output amplifier to output, and (iii) while the fourth pulse is applied, an output from the output amplifier is obtained.

According to the invention, in a case where the first circuit operates as the optical sensor circuit, a first pulse is applied to an anode of the photodiode so as to make the photodiode conductive in a forward direction, and the voltage at the first node is determined by the voltage of the first pulse and capacitances of the first and second capacitors. When a period in which the first pulse is applied ends, a reverse biased voltage is applied to the photodiode. After a predetermined period, the voltage at the first node corresponds to leakage in accordance with intensity of light incident to the photodiode. In this state, a second pulse is applied to the other end of the first capacitor, and the voltage at the first node is changed to be capable of being outputted from the output amplifier. Then, while the second pulse is applied, the output of the output amplifier is obtained. Thus, intensity of light incident to the photodiode can be detected.

Meanwhile, in a case where the first circuit operates as the pressure detection circuit, the third pulse is applied to the anode of the photodiode so as to make the photodiode conductive in a forward direction, and the voltage at the first node is determined depending on the voltage of the third pulse, and capacitances of the first and second capacitors, and therefore is a voltage determined in accordance with the second capacitor. In this state, a fourth pulse is applied to the other end of the first capacitor, and the voltage at the first node is changed so that a reverse biased voltage is applied to the photodiode and so as to be capable of being outputted from the output amplifier. The voltage at the first node at that time is also determined in accordance with the second capacitor. Since the output of the output amplifier is obtained while the fourth pulse is applied, it is possible to detect whether a pressure is applied to the display surface or not.

The detection of the applied pressure is made while the fourth pulse is applied. Accordingly, even if light is incident to the photodiode, there is little possibility that leakage in the photodiode in a reverse biased state changes the voltage at the first node. Therefore, it is possible to prevent the incident light from being a noise which changes the voltage at the first node in the pressure detection operation.

Therefore, it is possible to realize a method for driving a display device including a low-priced, downsized, and highly reliable touch panel function without deteriorating a display function.

Further, it is possible to easily set timing of applying the second pulse by using end timing of the third pulse.

Further, since it is possible to shorten the period of the third pulse, a noise caused by light incident to the photodiode conductive in a forward direction during the period of the third pulse can be reduced to the minimum. Therefore, it is possible to further improve accuracy in detecting an applied pressure.

In order to attain the above object, the method of the present invention is arranged such that the first circuit includes a photodiode serving as the light-receiving element, a first capacitor, a second capacitor, and an output amplifier, a cathode of the photodiode, one end of the first capacitor, one end of the second capacitor, and an input of the output amplifier are connected with one another via a first node, an electrode at the other end of the second capacitor is provided on a substrate having the display surface of the display panel, an electrode at the one end of the second capacitor is positioned to be away from the display surface in a thickness direction of the display panel to face the electrode at the other end of the second capacitor, in a case where the first circuit operates as the optical sensor circuit, (i) a first pulse is applied to an anode of the photodiode so as to make the photodiode conductive in a forward direction, (ii) the application of the first pulse is finished so that a reverse biased voltage is applied to the photodiode, (iii) at a predetermined time after finishing the application of the first pulse, a second pulse is applied to the other end of the first capacitor to change the voltage at the first node so as to enable the output amplifier to output, and (iv) while the second pulse is applied, the output from the output amplifier is obtained, in a case where the first circuit operates as the pressure detection circuit, (i) a first direct voltage is applied to the anode of the photodiode, (ii) application of the first direct voltage to the anode during a first period makes the photodiode conductive in a forward direction, (iii) while the first direct voltage is applied to the anode during a second period following the first period, a fourth pulse is applied to the other end of the first capacitor to change a voltage at the first node so that a reverse biased voltage is applied to the photodiode, and (iv) while the fourth pulse is applied, an output from the output amplifier is obtained.

According to the invention, in a case where the first circuit operates as the optical sensor circuit, a first pulse is applied to an anode of the photodiode so as to make the photodiode conductive in a forward direction, and the voltage at the first node is determined by the voltage of the first pulse and capacitances of the first and second capacitors. When a period in which the first pulse is applied ends, a reverse biased voltage is applied to the photodiode. After a predetermined period, the voltage at the first node corresponds to leakage in accordance with intensity of light incident to the photodiode. In this state, a second pulse is applied to the other end of the first capacitor, and the voltage at the first node is changed to be capable of being outputted from the output amplifier. Then, while the second pulse is applied, the output of the output amplifier is obtained. Thus, intensity of light incident to the photodiode can be detected.

Meanwhile, in a case where the first circuit operates as the pressure detection circuit, the first direct voltage is applied to the anode of the photodiode, and application of the first direct voltage during the first period makes the photodiode conductive in a forward direction, so that the voltage at the first node is substantially equal to the first direct voltage.

During the second period, while the first direct voltage is applied to the anode, the fourth pulse is applied to the other end of the first capacitor to change the voltage at the first node so that a reverse biased voltage is applied to the photodiode. At that time, the voltage at the first node is determined depending on a ratio in capacitance of the first capacitor to the second capacitor. Capacitance of the first capacitor is not changed by application of a pressure, but capacitance of the second capacitor is changed. Accordingly, the output voltage changes in accordance with capacitance of the second capacitor. Since the output of the output amplifier is obtained while the fourth pulse is applied, it is possible to detect whether a pressure is applied to the display surface or not.

The detection of the applied pressure is made while the fourth pulse is applied. Accordingly, even if light is incident to the photodiode, there is little possibility that leakage in the photodiode in a reverse biased state changes the voltage at the first node. Therefore, it is possible to prevent the incident light from being a noise which changes the voltage at the first node in the pressure detection operation.

Therefore, it is possible to realize a method for driving a display device including a low-priced, downsized, and highly reliable touch panel function without deteriorating a display function.

In order to attain the above object, the method of the present invention is arranged such that the first circuit includes a photodiode serving as the light-receiving element, a first capacitor, a second capacitor, and an output amplifier, a cathode of the photodiode, one end of the first capacitor, one end of the second capacitor, and an input of the output amplifier are connected with one another via a first node, an electrode at the other end of the second capacitor is provided on a substrate having the display surface of the display panel, an electrode at the one end of the second capacitor is positioned to be away from the display surface in a thickness direction of the display panel to face the electrode at the other end of the second capacitor, in a case where the first circuit operates as the optical sensor circuit, (i) a first pulse is applied to an anode of the photodiode so as to make the photodiode conductive in a forward direction, (ii) the application of the first pulse is finished so that a reverse biased voltage is applied to the photodiode, (iii) at a predetermined time after finishing the application of the first pulse, a second pulse is applied to the other end of the first capacitor to change the voltage at the first node so as to enable the output amplifier to output, and (iv) while the second pulse is applied, the output from the output amplifier is obtained, in a case where the first circuit operates as the pressure detection circuit, (i) a third pulse is applied to the anode of the photodiode so as to make the photodiode conductive in a forward direction, (ii) during a period following a period in which the third pulse is applied, a fourth pulse is applied to the other end of the first capacitor to change a voltage at the first node so that a reverse biased voltage is applied to the photodiode and so as to enable the output amplifier to output, and (iii) while the fourth pulse is applied, an output from the output amplifier is obtained.

According to the invention, in a case where the first circuit operates as the optical sensor circuit, the first pulse is applied to the anode of the photodiode so as to make the photodiode conductive in a forward direction, and the voltage at the first node is determined by the voltage of the first pulse and capacitances of the first and second capacitors. When a period in which the first pulse is applied ends, a reverse biased voltage is applied to the photodiode. After a predetermined period, the voltage at the first node corresponds to leakage in accordance with intensity of light incident to the photodiode. In this state, a second pulse is applied to the other end of the first capacitor, and the voltage at the first node is changed to be capable of being outputted from the output amplifier. Then, while the second pulse is applied, the output of the output amplifier is obtained. Thus, intensity of light incident to the photodiode can be detected.

Meanwhile, in a case where the first circuit operates as the pressure detection circuit, the third pulse is applied to the anode of the photodiode so as to make the photodiode conductive in a forward direction, and the voltage at the first node is determined depending on the voltage of the third pulse, and capacitances of the first and second capacitors, and therefore is a voltage determined in accordance with the second capacitor. In this state, a second pulse is applied to the other end of the first capacitor, and the voltage at the first node is changed so that a reverse biased voltage is applied to the photodiode and so as to be capable of being outputted from the output amplifier. The voltage at the first node at that time is also determined in accordance with the second capacitor. Since the output of the output amplifier is obtained while the fourth pulse is applied, it is possible to detect whether a pressure is applied to the display surface or not.

The detection of the applied pressure is made while the fourth pulse is applied. Accordingly, even if light is incident to the photodiode, there is little possibility that leakage in the photodiode in a reverse biased state changes the voltage at the first node. Therefore, it is possible to prevent the incident light from being a noise which changes the voltage at the first node in the pressure detection operation.

Therefore, it is possible to realize a display device including a low-priced, downsized, and highly reliable touch panel function without deteriorating a display function.

Further, it is possible to easily set timing of applying the fourth pulse by using end timing of the third pulse.

Further, since it is possible to shorten the period of the third pulse, a noise caused by light incident to the photodiode conductive in a forward direction during the period of the third pulse can be reduced to the minimum. Therefore, it is possible to further improve accuracy in detecting an applied pressure.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is preferably applicable to various display devices including liquid crystal display devices.

REFERENCE SIGNS LIST

2. Gate metal
6. Source metal
50. Liquid crystal display device (display device)
51. Display panel
62. Sensor circuit (first circuit, optical sensor circuit, pressure detection circuit)
62'. Sensor circuit (first circuit, optical sensor circuit, pressure detection circuit)
62a. TFT (output amplifier)
62b. Photodiode (light-receiving element)
62c. Capacitor (first capacitor, electrode at one end of second capacitor)
62d. Capacitor (second capacitor)
62d'. Capacitor (second capacitor)
64. Electrode (electrode at one end of second capacitor)
Com. Common electrode (electrode at the other end of second capacitor)
netA. Node (first node)
Prst1. Reset pulse (first pulse)
Prst2. Reset pulse (third pulse)
Prwn. Read pulse (second pulse, fourth pulse)

The invention claimed is:

1. A display device comprising:
an optical sensor circuit provided in a display region, the optical sensor circuit including a light-receiving element and detecting intensity of light incident to the light-receiving element;
a pressure detection circuit which detects pressure applied to a display surface of a display panel on a basis of a change of the display surface in a panel thickness direction which change is caused by the pressure,
with respect to a region in which the pressure is to be detected, both of the detection of the pressure by the pressure detection circuit and the detection of the intensity of the light by the optical sensor circuit being carried out within a period allocated to acquisition of detection data concerning the pressure in the display region, and
a first circuit which serves as both of the optical sensor circuit and the pressure detection circuit, wherein:
the first circuit includes a photodiode serving as the light-receiving element, a first capacitor, a second capacitor, and an output amplifier,
a cathode of the photodiode, one end of the first capacitor, one end of the second capacitor, and an input of the output amplifier are connected with one another via a first node,
an electrode at the other end of the second capacitor is provided on a substrate having the display surface of the display panel,
an electrode at the one end of the second capacitor is positioned to be away from the display surface in a thickness direction of the display panel to face the electrode at the other end of the second capacitor,
in a case where the first circuit operates as the optical sensor circuit, (i) a first pulse is applied to an anode of the photodiode so as to make the photodiode conductive in a forward direction, (ii) the application of the first pulse is finished so that a reverse biased voltage is applied to the photodiode, (iii) at a predetermined time after finishing the application of the first pulse, a second pulse is applied to the other end of the first capacitor to change the voltage at the first node so as to enable the output amplifier to output, and (iv) while the second pulse is applied, the output from the output amplifier is obtained,
in a case where the first circuit operates as the pressure detection circuit, (i) a first direct voltage is applied to the anode of the photodiode, (ii) application of the first direct voltage to the anode during a first period makes the photodiode conductive in a forward direction, (iii) while the first direct voltage is applied to the anode during a second period following the first period, a fourth pulse is applied to the other end of the first capacitor to change a voltage at the first node so that a reverse biased voltage is applied to the photodiode, and (iv) while the fourth pulse is applied, an output from the output amplifier is obtained.

2. The display device as set forth in claim 1, wherein:
with respect to the region in which the pressure is to be detected, the detection of the pressure by the pressure detection circuit and the detection of the intensity of the light by the optical sensor circuit are alternated during the period.

3. The display device as set forth in claim 2, wherein:
with respect to the region in which the pressure is to be detected, the detection of the pressure by the pressure detection circuit and the detection of the intensity of the light by the optical sensor circuit are alternated for every one vertical period during the period.

4. The display device as set forth in claim 2, wherein:
with respect to the region in which the pressure is to be detected, the detection of the pressure by the pressure detection circuit and the detection of the intensity of the light by the optical sensor circuit are alternated during the period by line-sequentially driving the optical sensor circuit and the pressure detection circuit that are disposed in different rows of a display matrix.

5. The display device as set forth in claim 4, wherein:
in the region in which the pressure is to be detected, the optical sensor circuit and the pressure detection circuit that are disposed in the different rows of the display matrix are alternately disposed in a column direction of the display matrix.

6. The display device as set forth in claim 5, further comprising a first circuit which serves as both of the optical sensor circuit and the pressure detection circuit,
the period being a period corresponding to a plurality of vertical periods, and
during the period, the first circuit switching, for every one vertical period, between the detection of the intensity of the light by the optical sensor circuit and the detection of the pressure by the pressure detection circuit.

7. The display device as set forth in claim 1, wherein the display device is a liquid crystal display device, and the electrode at the other end of the second capacitor is a common electrode.

8. The display device as set forth in claim 7, wherein the electrode at one end of the second capacitor is made of a layer in a matrix substrate which layer is positioned to be closer to the electrode at the other end of the second capacitor than a passivation film in the matrix substrate is.

9. The display device as set forth in claim 8, wherein
the electrode at the one end of the second capacitor is a transparent electrode positioned at a same layer as a layer where picture element electrodes are positioned, and
a liquid crystal layer is positioned between the electrode at the one end of the second capacitor and the electrode at the one end of the second capacitor.

10. The display device as set forth in claim 7, wherein
the electrode at one end of the second capacitor is made of a layer in a matrix substrate which layer is positioned to be farther from the electrode at the other end of the second capacitor than a passivation film in the matrix substrate is.

11. The display device as set forth in claim 10, wherein the electrode at the one end of the second capacitor is made of a gate metal.

12. The display device as set forth in claim 10, wherein the electrode at the one end of the second capacitor is made of a source metal.

13. The display device as set forth in claim 7, wherein the first node is made of a gate metal.

14. The display device as set forth in claim 7, wherein the first node is made of a source metal.

15. The display device as set forth in claim 1, wherein: a first control signal for causing the first circuit to operate as the optical sensor circuit and a second control signal for causing the first circuit to operate as the pressure detection circuit are selectively supplied to a driving circuit of the first circuit.

16. The display device as set forth in claim 15, wherein:
with respect to a screen to be displayed next to a currently displayed screen, which of the first control signal and the second control signal is to be supplied to the driving circuit can be determined based on data of the screen to be displayed next.

17. The display device as set forth in claim 15, wherein:
with respect to a screen to be displayed next to a currently displayed screen, which of the first control signal and the second control signal is supplied to the driving circuit can be determined based on whether or not a pressure is applied to a predetermined area of the display surface for which the first circuit operates as a pressure detection circuit on the currently displayed screen.

18. The display device as set forth in claim 17, wherein:
with respect to a screen to be displayed next to a currently displayed screen, the first control signal is supplied to the driving circuit in a case where the pressure is applied to the predetermined area on the currently displayed screen.

19. A method for driving a display device including (i) an optical sensor circuit provided in a display region, the optical sensor circuit including a light-receiving element and detecting intensity of light incident to the light-receiving element, and (ii) a pressure detection circuit which detects pressure applied to a display surface of a display panel on a basis of a change of the display surface in a panel thickness direction which change is caused by the pressure,
with respect to a region in which the pressure is to be detected, both of the detection of the pressure by the pressure detection circuit and the detection of the intensity of the light by the optical sensor circuit being carried out within a period allocated to acquisition of detection data concerning the pressure in the display region, and
a first circuit which serves as both of the optical sensor circuit and the pressure detection circuit, wherein:
the first circuit includes a photodiode serving as the light-receiving element, a first capacitor, a second capacitor, and an output amplifier,
a cathode of the photodiode, one end of the first capacitor, one end of the second capacitor, and an input of the output amplifier are connected with one another via a first node,
an electrode at the other end of the second capacitor is provided on a substrate having the display surface of the display panel,
an electrode at the one end of the second capacitor is positioned to be away from the display surface in a thickness direction of the display panel to face the electrode at the other end of the second capacitor,
in a case where the first circuit operates as the optical sensor circuit, (i) a first pulse is applied to an anode of the photodiode so as to make the photodiode conductive in a forward direction, (ii) the application of the first pulse is finished so that a reverse biased voltage is applied to the photodiode, (iii) at a predetermined time after finishing the application of the first pulse, a second pulse is applied to the other end of the first capacitor to change the voltage at the first node so as to enable the output amplifier to output, and (iv) while the second pulse is applied, the output from the output amplifier is obtained,
in a case where the first circuit operates as the pressure detection circuit, (i) a first direct voltage is applied to the anode of the photodiode, (ii) application of the first direct voltage to the anode during a first period makes the photodiode conductive in a forward direction, (iii) while the first direct voltage is applied to the anode during a second period following the first period, a fourth pulse is applied to the other end of the first capacitor to change a voltage at the first node so that a reverse biased voltage is applied to the photodiode, and (iv) while the fourth pulse is applied, an output from the output amplifier is obtained.

20. The method as set forth in claim 19, wherein:
with respect to the region in which the pressure is to be detected, the detection of the pressure by the pressure detection circuit and the detection of the intensity of the light by the optical sensor circuit are alternated during the period.

21. The method as set forth in claim 20, wherein:
with respect to the region in which the pressure is to be detected, the detection of the pressure by the pressure detection circuit and the detection of the intensity of the light by the optical sensor circuit are alternated for every one vertical period during the period.

22. The method as set forth in claim 20, wherein:
with respect to the region in which the pressure is to be detected, the detection of the pressure by the pressure detection circuit and the detection of the intensity of the light by the optical sensor circuit are alternated during the period by line-sequentially driving the optical sensor circuit and the pressure detection circuit that are disposed in different rows of a display matrix.

23. The method as set forth in claim 22, wherein:
in the region in which the pressure is to be detected, the optical sensor circuit and the pressure detection circuit that are disposed in the different rows of the display matrix are alternately disposed in a column direction of the display matrix.

24. The method as set forth in claim 23, wherein:
the display device further includes a first circuit which serves as both of the optical sensor circuit and the pressure detection circuit,
the period is a period corresponding to a plurality of vertical periods, and
during the period, the first circuit switching, for every one vertical period, between the detection of the intensity of the light by the optical sensor circuit and the detection of the pressure by the pressure detection circuit.

25. The method as set forth in claim 19, wherein: a first control signal for causing the first circuit to operate as the optical sensor circuit and a second control signal for causing the first circuit to operate as the pressure detection circuit are selectively supplied to a driving circuit of the first circuit.

26. The method as set forth in claim 25, wherein:
with respect to a screen to be displayed next to a currently displayed screen, which of the first control signal and the second control signal is to be supplied to the driving circuit can be determined based on data of the screen to be displayed next.

27. The method as set forth in claim 25, wherein:
with respect to a screen to be displayed next to a currently displayed screen, which of the first control signal and the second control signal is supplied to the driving circuit can be determined based on whether or not a pressure is applied to a predetermined area of the display surface for which the first circuit operates as a pressure detection circuit on the currently displayed screen.

28. The method as set forth in claim 27, wherein:
with respect to a screen to be displayed next to a currently displayed screen, the first control signal is supplied to the driving circuit in a case where the pressure is applied to the predetermined area on the currently displayed screen.

* * * * *